(12) United States Patent
Gross

(10) Patent No.: US 9,156,724 B2
(45) Date of Patent: *Oct. 13, 2015

(54) ION EXCHANGEABLE GLASS WITH HIGH CRACK INITIATION THRESHOLD

(71) Applicant: Corning Incorporated, Corning, NY (US)

(72) Inventor: Timothy Michael Gross, Corning, NY (US)

(73) Assignee: Corning Incorporated, Corning, NY (US)

(*) Notice: Subject to any disclaimer, the term of this patent is extended or adjusted under 35 U.S.C. 154(b) by 124 days.

This patent is subject to a terminal disclaimer.

(21) Appl. No.: 13/678,013

(22) Filed: Nov. 15, 2012

(65) Prior Publication Data

US 2013/0122284 A1 May 16, 2013

Related U.S. Application Data

(60) Provisional application No. 61/560,434, filed on Nov. 16, 2011.

(51) Int. Cl.
| | |
|---|---|
| *C03C 3/097* | (2006.01) |
| *C03C 3/091* | (2006.01) |
| *C03C 21/00* | (2006.01) |
| *C03C 3/04* | (2006.01) |
| *C03C 3/062* | (2006.01) |
| *C03C 3/064* | (2006.01) |
| *C03C 3/083* | (2006.01) |
| *C03C 3/085* | (2006.01) |
| *C03C 3/087* | (2006.01) |
| *C03C 3/093* | (2006.01) |

(52) U.S. Cl.
CPC . *C03C 3/091* (2013.01); *C03C 3/04* (2013.01); *C03C 3/062* (2013.01); *C03C 3/064* (2013.01); *C03C 3/083* (2013.01); *C03C 3/085* (2013.01); *C03C 3/087* (2013.01); *C03C 3/093* (2013.01); *C03C 3/097* (2013.01); *C03C 21/002* (2013.01); *Y10T 428/265* (2015.01); *Y10T 428/315* (2015.01)

(58) Field of Classification Search
CPC ........ C03C 3/097; C03C 3/083; C03C 3/085; C03C 3/087; C03C 3/091
USPC ................................... 501/63, 68, 69, 70, 66
See application file for complete search history.

(56) References Cited

U.S. PATENT DOCUMENTS

| | | | |
|---|---|---|---|
| 3,356,477 A | 12/1967 | Chisholm et al. | |
| 3,357,876 A | 12/1967 | Rinehart et al. | |
| 3,433,611 A | 3/1969 | Saunders et al. | |
| 3,464,880 A | 9/1969 | Rinehart et al. | |
| 3,485,647 A | 12/1969 | Harrington | |
| 3,495,963 A | 2/1970 | Buckley et al. | |
| 3,642,504 A * | 2/1972 | Petzold et al. | 501/63 |
| 3,728,095 A | 4/1973 | Grubb et al. | |
| 3,973,972 A * | 8/1976 | Muller | 501/4 |
| 3,998,617 A * | 12/1976 | Gliemeroth | 65/33.4 |
| 4,053,679 A * | 10/1977 | Rinehart | 428/410 |
| 4,055,703 A | 10/1977 | Rinehart | |
| 5,698,482 A * | 12/1997 | Frank et al. | 501/10 |
| 5,925,180 A * | 7/1999 | Frank et al. | 106/35 |
| 5,972,816 A | 10/1999 | Goto | |
| 6,165,923 A * | 12/2000 | Ando et al. | 501/63 |
| 6,300,264 B1 * | 10/2001 | Ohara | 501/64 |
| 6,387,509 B1 | 5/2002 | Goto et al. | |
| 7,665,330 B2 | 2/2010 | Nakajima | |
| 8,257,831 B2 | 9/2012 | Yagi | |
| 8,759,238 B2 * | 6/2014 | Chapman et al. | 501/63 |
| 2004/0187521 A1 | 9/2004 | Sato | |
| 2011/0081396 A1 | 4/2011 | Denry | |
| 2011/0201490 A1 | 8/2011 | Barefoot et al. | |
| 2011/0294648 A1 | 12/2011 | Chapman et al. | |
| 2012/0135226 A1 | 5/2012 | Bookbinder et al. | |
| 2012/0308827 A1 | 12/2012 | Boek et al. | |
| 2013/0045375 A1 | 2/2013 | Gross | |

FOREIGN PATENT DOCUMENTS

EP 0843304 5/1998

OTHER PUBLICATIONS

International Search Report and Written Opinion, dated Feb. 1, 2013, International Application No. PCT/US/12/65263, International filing date Nov. 15, 2012.

* cited by examiner

*Primary Examiner* — Anthony J Green
*Assistant Examiner* — Elizabeth A Bolden
(74) *Attorney, Agent, or Firm* — Jason A. Barron

(57) ABSTRACT

Alkali aluminosilicate glasses that are resistant to damage due to sharp impact and capable of fast ion exchange are provided. The glasses comprise at least 4 mol % $P_2O_5$ and, when ion exchanged, have a Vickers indentation crack initiation load of at least about 7 kgf.

21 Claims, 2 Drawing Sheets icate glass comprising at least about 4% $P_2O_5$, wherein the
ION EXCHANGEABLE GLASS WITH HIGH CRACK INITIATION THRESHOLD This application claims the benefit of priority under 35 USC §119 of U.S. Provisional Application Ser. No. 61/560,434 filed Nov. 16, 2011 the content of which is relied upon and incorporated herein by reference in its entirety.

BACKGROUND

The disclosure relates to damage resistant glasses. More particularly, the disclosure relates to damage resistant glasses that have optionally been strengthened by ion exchange. Even more particularly, the disclosure relates to damage resistant, phosphate containing glasses that have optionally been strengthened by ion exchange.

SUMMARY

Alkali aluminosilicate glasses which, when strengthened, are resistant to damage due to sharp impact and capable of fast ion exchange, are provided. The glasses comprise at least 4 mol % $P_2O_5$ and, when ion exchanged, have a Vickers indentation crack initiation load of at least about 7 kgf.

Accordingly, one aspect comprises an alkali aluminosilicate glass comprising at least about 4% $P_2O_5$, wherein the alkali aluminosilicate glass is ion exchanged to a depth of layer of at least about 10 µm, and wherein:

$0.6 < [M_2O_3(mol\%)/R_xO(mol\%)] < 1.4$; or      i.

$1.3 < [(P_2O_5 + R_2O)/M_2O_3] \leq 2.3$;      ii.

where $M_2O_3 = Al_2O_3 + B_2O_3$, $R_xO$ is the sum of monovalent and divalent cation oxides present in the alkali aluminosilicate glass, and $R_2O$ is the sum of monovalent cation oxides present in the alkali aluminosilicate glass. In some embodiments, the glass satisfies $0.6 < [M_2O_3(mol\%)/R_xO(mol\%)] < 1.4$. In some embodiments, the glass satisfies $0.6 < [M_2O_3(mol\%)/R_xO(mol\%)] < 1$. In some embodiments, the glass satisfies $1.3 < [(P_2O_5 + R_2O)/M_2O_3] \leq 2.3$. In some embodiments, the glass satisfies $1.5 < [(P_2O_5 + R_2O)/M_2O_3] \leq 2.0$. In some embodiments, the alkali aluminosilicate glass further comprises less than 1 mol % $K_2O$. In some embodiments, the alkali aluminosilicate glass further comprises less than 1 mol % $B_2O_3$. In some embodiments, the monovalent and divalent cation oxides are selected from the group consisting of $Li_2O$, $Na_2O$, $K_2O$, $Rb_2O$, $Cs_2O$, $MgO$, $CaO$, $SrO$, $BaO$, and $ZnO$. In some embodiments, the alkali aluminosilicate glass has a potassium/sodium interdiffusion coefficient of at least about $2.4 \times 10^{-10}$ cm$^2$/s at 410° C. In some embodiments, the potassium/sodium interdiffusion coefficient is in a range from about $2.4 \times 10^{-10}$ cm$^2$/s up to about $1.5 \times 10^{-9}$ cm$^2$/s at 410° C. In some embodiments, the glass has a compressive layer extending from a surface of the glass to the depth of layer, and wherein the compressive layer is under a compressive stress of at least about 300 MPa. In some embodiments, the glass has a Vickers indentation crack initiation load of at least about 7 kgf. In some embodiments, the glass has a Vickers indentation crack initiation load of at least about 12 kgf.

Another aspect comprises an alkali aluminosilicate glass comprising from about 40 mol % to about 70 mol % $SiO_2$; from about 11 mol % to about 25 mol % $Al_2O_3$; from about 4 mol % to about 15 mol % $P_2O_5$; and from about 13 mol % to about 25 mol % $Na_2O$. In some embodiments, the alkali aluminosilicate glass comprises from about 50 mol % to about 65 mol % $SiO_2$; from about 14 mol % to about 20 mol % $Al_2O_3$; from about 4 mol % to about 10 mol % $P_2O_5$; and from about 14 mol % to about 20 mol % $Na_2O$. In some embodiments, the alkali aluminosilicate glass further comprises less than 1 mol % $K_2O$. In some embodiments, the alkali aluminosilicate glass further comprises less than 1 mol % $B_2O_3$. In some embodiments, the monovalent and divalent cation oxides are selected from the group consisting of $Li_2O$, $Na_2O$, $K_2O$, $Rb_2O$, $Cs_2O$, $MgO$, $CaO$, $SrO$, $BaO$, and $ZnO$. In some embodiments, the alkali aluminosilicate glass has a potassium/sodium interdiffusion coefficient of at least about $2.4 \times 10^{-10}$ cm$^2$/s at 410° C. In some embodiments, the potassium/sodium interdiffusion coefficient is in a range from about $2.4 \times 10^{-10}$ cm$^2$/s up to about $1.5 \times 10^{-9}$ cm$^2$/s at 410° C. In some embodiments, the glass has a compressive layer extending from a surface of the glass to the depth of layer, and wherein the compressive layer is under a compressive stress of at least about 300 MPa. In some embodiments, the glass has a Vickers indentation crack initiation load of at least about 7 kgf. In some embodiments, the glass has a Vickers indentation crack initiation load of at least about 12 kgf.

Another aspect comprises a method of strengthening an alkali aluminosilicate glass, the method comprising providing the alkali aluminosilicate glass comprising at least about 4% $P_2O_5$, wherein:

$0.6 < [M_2O_3(mol\%)/R_xO(mol\%)] < 1.4$; or      i.

$1.3 < [(P_2O_5 + R_2O)/M_2O_3] \leq 2.3$;      ii.

where $M_2O_3 = Al_2O_3 + B_2O_3$, $R_xO$ is the sum of monovalent and divalent cation oxides present in the alkali aluminosilicate glass, and $R_2O$ is the sum of divalent cation oxides present in the alkali aluminosilicate glass, and immersing the alkali aluminosilicate glass in an ion exchange bath for a time period of up to about 24 hours to form a compressive layer extending from a surface of the alkali aluminosilicate glass to a depth of layer of at least 10 µm. In some embodiments, the glass satisfies $0.6 < [M_2O_3(mol\%)/R_xO(mol\%)] < 1.4$. In some embodiments, the glass satisfies $0.6 < [M_2O_3(mol\%)/R_xO(mol\%)] < 1$. In some embodiments, the glass satisfies $1.3 < [(P_2O_5 + R_2O)/M_2O_3] \leq 2.3$. In some embodiments, the glass satisfies $1.5 < [(P_2O_5 + R_2O)/M_2O_3] \leq 2.0$. In some embodiments, the alkali aluminosilicate glass comprises less than 1 mol % $K_2O$. In some embodiments, the alkali aluminosilicate glass comprises less than 1 mol % $B_2O_3$. In some embodiments, the compressive layer is under a compressive stress of at least about 300 MPa. In some embodiments, the ion exchanged glass has a Vickers indentation crack initiation load of at least about 7 kgf. In some embodiments, the ion exchanged glass has a Vickers indentation crack initiation load of at least about 12 kgf.

Another aspect comprises an alkali aluminosilicate glass comprising at least about 4 mol % $P_2O_5$, wherein $[M_2O_3(mol\%)/R_xO(mol\%)] < 1.4$, where $M_2O_3 = Al_2O_3 + B_2O_3$ and $R_xO$ is the sum of monovalent and divalent cation oxides present in the alkali aluminosilicate glass. In some embodiments, $[M_2O_3(mol\%)/R_xO(mol\%)] < 1.2$. In some embodiments, $[M_2O_3(mol\%)/R_xO(mol\%)] < 1$. In some embodiments, the monovalent and divalent cation oxides are selected from the group consisting of $Li_2O$, $Na_2O$, $K_2O$, $Rb_2O$, $Cs_2O$, $MgO$, $CaO$, $SrO$, $BaO$, and $ZnO$.

In some embodiments, the alkali aluminosilicate glass comprises from about 40 mol % to about 70 mol % $SiO_2$; from about 11 mol % to about 25 mol % $Al_2O_3$; from about 4 mol % to about 15 mol % $P_2O_5$; and from about 13 mol % to about 25 mol % $Na_2O$. In other embodiments, the alkali aluminosilicate glass comprises from about 50 mol % to about 65 mol % $SiO_2$; from about 14 mol % to about 20 mol % $Al_2O_3$; from about 4 mol % to about 10 mol % $P_2O_5$; and from about 14 mol % to about 20 mol % $Na_2O$.

In some embodiments, the composition further comprises less than 1 mol % $K_2O$. In some embodiments, the composition further comprises about 0 mol % $K_2O$. In some embodiments, the composition further comprises less than 1 mol % $B_2O_3$. In some embodiments, the composition further comprises about 0 mol % $B_2O_3$.

Embodiments may be ion exchanged. In some embodiments, the glass is ion exchanged to a depth of layer of at least about 10 μm. In some embodiments, the glass is ion exchanged to a depth of layer of at least about 20 μm. In other embodiments, the glass is ion exchanged to a depth of layer of at least about 40 μm. In some embodiments, the alkali aluminosilicate glass has a compressive layer extending from a surface of the glass to the depth of layer, and wherein the compressive layer is under a compressive stress of at least about 300 MPa. In other embodiments, the alkali aluminosilicate glass has a compressive layer extending from a surface of the glass to the depth of layer, and wherein the compressive layer is under a compressive stress of at least about 500 MPa. In other embodiments, the alkali aluminosilicate glass has a compressive layer extending from a surface of the glass to the depth of layer, and wherein the compressive layer is under a compressive stress of at least about 750 MPa. In some embodiments, the ion exchanged alkali aluminosilicate glass has a Vickers indentation crack initiation load of at least about 7 kgf. In still other embodiments, the ion exchanged alkali aluminosilicate glass has a Vickers indentation crack initiation load of at least about 15 kgf. In other embodiments, the ion exchanged alkali aluminosilicate glass has a Vickers indentation crack initiation load of at least about 20 kgf. In some embodiments, the alkali aluminosilicate glass has a potassium/sodium interdiffusion coefficient of at least about $2.4 \times 10^{-10}$ cm$^2$/s at 410° C. In some embodiments, the potassium/sodium interdiffusion coefficient is in a range from about $2.4 \times 10^{-10}$ cm$^2$/s up to about $1.5 \times 10^{-9}$ cm$^2$/s at 410° C.

Another aspect is to provide an alkali aluminosilicate glass comprising at least about 4 mol % $P_2O_5$. The alkali aluminosilicate glass is ion exchanged to a depth of layer of at least about 10 μm, wherein $0.6 < [M_2O_3(\text{mol}\%)/R_xO(\text{mol}\%)] < 1.4$, where $M_2O_3 = Al_2O_3 + B_2O_3$ and $R_xO$ is the sum of monovalent and divalent cation oxides present in the alkali aluminosilicate glass. In some embodiments, $0.6 < [M_2O_3(\text{mol}\%)/R_xO(\text{mol}\%)] < 1.2$. In some embodiments, $0.6 < [M_2O_3(\text{mol}\%)/R_xO(\text{mol}\%)] < 1$. In some embodiments, $0.8 < [M_2O_3(\text{mol}\%)/R_xO(\text{mol}\%)] < 1$. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO.

In some embodiments, the alkali aluminosilicate glass comprises from about 40 mol % to about 70 mol % $SiO_2$; from about 11 mol % to about 25 mol % $Al_2O_3$; from about 4 mol % to about 15 mol % $P_2O_5$; and from about 13 mol % to about 25 mol % $Na_2O$. In other embodiments, the alkali aluminosilicate glass comprises from about 50 mol % to about 65 mol % $SiO_2$; from about 14 mol % to about 20 mol % $Al_2O_3$; from about 4 mol % to about 10 mol % $P_2O_5$; and from about 14 mol % to about 20 mol % $Na_2O$.

In some embodiments, the composition further comprises less than 1 mol % $K_2O$. In some embodiments, the composition further comprises about 0 mol % $K_2O$. In some embodiments, the composition further comprises less than 1 mol % $B_2O_3$. In some embodiments, the composition further comprises about 0 mol % $B_2O_3$.

Embodiments of the aspect may be ion exchanged. In some embodiments, the glass is ion exchanged to a depth of layer of at least about 10 μm. In some embodiments, the glass is ion exchanged to a depth of layer of at least about 20 μm. In other embodiments, the glass is ion exchanged to a depth of layer of at least about 40 μm. In some embodiments, the alkali aluminosilicate glass has a compressive layer extending from a surface of the glass to the depth of layer, and wherein the compressive layer is under a compressive stress of at least about 300 MPa. In other embodiments, the alkali aluminosilicate glass has a compressive layer extending from a surface of the glass to the depth of layer, and wherein the compressive layer is under a compressive stress of at least about 500 MPa. In other embodiments, the alkali aluminosilicate glass has a compressive layer extending from a surface of the glass to the depth of layer, and wherein the compressive layer is under a compressive stress of at least about 750 MPa. In some embodiments, the ion exchanged alkali aluminosilicate glass has a Vickers indentation crack initiation load of at least about 7 kgf. In still other embodiments, the ion exchanged alkali aluminosilicate glass has a Vickers indentation crack initiation load of at least about 15 kgf. In other embodiments, the ion exchanged alkali aluminosilicate glass has a Vickers indentation crack initiation load of at least about 20 kgf. In some embodiments, the alkali aluminosilicate glass has a potassium/sodium interdiffusion coefficient of at least about $2.4 \times 10^{-10}$ cm$^2$/s at 410° C. In some embodiments, the potassium/sodium interdiffusion coefficient is in a range from about $2.4 \times 10^{-10}$ cm$^2$/s up to about $1.5 \times 10^{-9}$ cm$^2$/s at 410° C.

Another aspect of the disclosure is to provide a method of strengthening an alkali aluminosilicate glass. The method comprises: providing the alkali aluminosilicate glass, the alkali aluminosilicate glass comprising at least about 4 mol % $P_2O_5$, wherein:

$$0.6 < [M_2O_3(\text{mol}\%)/R_xO(\text{mol}\%)] < 1.4; \text{ or} \qquad \text{i.}$$

$$1.3 < [(P_2O_5 + R_2O)/M_2O_3] \leq 2.3; \qquad \text{ii.}$$

where $M_2O_3 = Al_2O_3 + B_2O_3$, $R_xO$ is the sum of monovalent and divalent cation oxides present in the alkali aluminosilicate glass, and $R_2O$ is the sum of divalent cation oxides present in the alkali aluminosilicate glass, and immersing the alkali aluminosilicate glass in an ion exchange bath for a time period of up to about 24 hours to form a compressive layer extending from a surface of the alkali aluminosilicate glass to a depth of layer of at least 10 μm. In some embodiments, the glass satisfies $0.6 < [M_2O_3(\text{mol}\%)/R_xO(\text{mol}\%)] < 1.4$. In some embodiments, the glass satisfies $0.6 < [M_2O_3(\text{mol}\%)/R_xO(\text{mol}\%)] < 1$. In some embodiments, the glass satisfies $1.3 < [(P_2O_5 + R_2O)/M_2O_3] \leq 2.3$. In some embodiments, the glass satisfies $1.5 < [(P_2O_5 + R_2O)/M_2O_3] \leq 2.0$. In some embodiments, the alkali aluminosilicate glass comprises less than 1 mol % $K_2O$. In some embodiments, the alkali aluminosilicate glass comprises less than 1 mol % $B_2O_3$. In some embodiments, the compressive layer is under a compressive stress of at least about 300 MPa. In some embodiments, the ion exchanged glass has a Vickers indentation crack initiation load of at least about 7 kgf. In some embodiments, the ion exchanged glass has a Vickers indentation crack initiation load of at least about 12 kgf. In some embodiments, the compressive layer extends from a surface to a depth of layer of at least 70 μm.

In some embodiments, the alkali aluminosilicate glass has a compressive layer extending from a surface of the glass to the depth of layer, and wherein the compressive layer is under a compressive stress of at least about 300 MPa. In other embodiments, the alkali aluminosilicate glass has a compressive layer extending from a surface of the glass to the depth of layer, and wherein the compressive layer is under a compressive stress of at least about 500 MPa. In other embodiments, the alkali aluminosilicate glass has a compressive layer extending from a surface of the glass to the depth of layer, and wherein the compressive layer is under a compressive stress of at least about 750 MPa. In some embodiments, the ion exchanged alkali aluminosilicate glass has a Vickers indentation crack initiation load of at least about 7 kgf. In still other embodiments, the ion exchanged alkali aluminosilicate glass has a Vickers indentation crack initiation load of at least about 15 kgf. In other embodiments, the ion exchanged alkali aluminosilicate glass has a Vickers indentation crack initiation load of at least about 20 kgf. In some embodiments, the alkali aluminosilicate glass has a potassium/sodium interdiffusion coefficient of at least about $2.4 \times 10^{-10}$ cm$^2$/s at 410° C. In some embodiments, the potassium/sodium interdiffusion coefficient is in a range from about $2.4 \times 10^{-10}$ cm$^2$/s up to about $1.5 \times 10^{-9}$ cm$^2$/s at 410° C.

In some embodiments, the alkali aluminosilicate glass used in the method comprises monovalent and divalent cation oxides selected from the group consisting of $Li_2O$, $Na_2O$, $K_2O$, $Rb_2O$, $Cs_2O$, MgO, CaO, SrO, BaO, and ZnO.

In some embodiments, the alkali aluminosilicate glass used in the method comprises from about 40 mol % to about 70 mol % $SiO_2$; from about 11 mol % to about 25 mol % $Al_2O_3$; from about 4 mol % to about 15 mol % $P_2O_5$; and from about 13 mol % to about 25 mol % $Na_2O$. In other embodiments, the alkali aluminosilicate glass used in the method comprises from about 50 mol % to about 65 mol % $SiO_2$; from about 14 mol % to about 20 mol % $Al_2O_3$; from about 4 mol % to about 10 mol % $P_2O_5$; and from about 14 mol % to about 20 mol % $Na_2O$.

In some embodiments, the composition used in the method further comprises less than 1 mol % $K_2O$. In some embodiments, the composition used in the method further comprises about 0 mol % $K_2O$. In some embodiments, the composition used in the method further comprises less than 1 mol % $B_2O_3$. In some embodiments, the composition used in the method further comprises about 0 mol % $B_2O_3$.

These and other aspects, advantages, and salient features will become apparent from the following detailed description, the accompanying drawings, and the appended claims.

DETAILED DESCRIPTION

Figure 1:
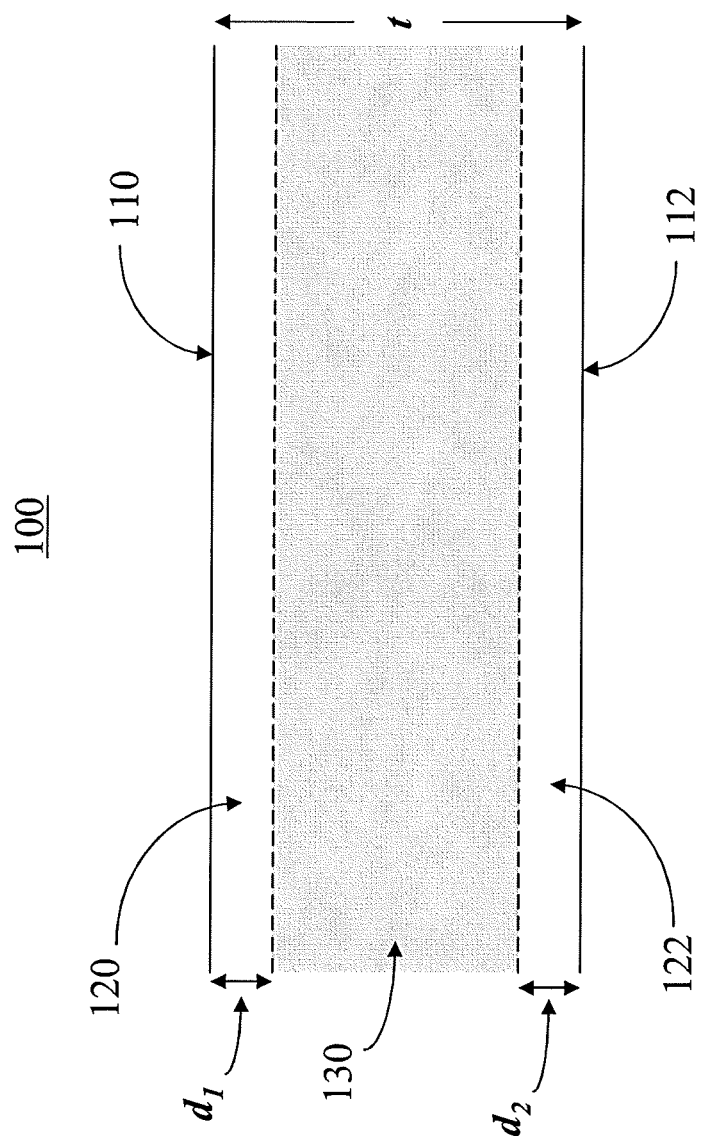
FIG. 1 is a schematic cross-sectional view of a glass sheet strengthened by ion exchange.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein.

Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other.

Moreover, where a range of numerical values is recited herein, comprising upper and lower values, unless otherwise stated in specific circumstances, the range is intended to include the endpoints thereof, and all integers and fractions within the range. It is not intended that the scope of the disclosure be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; more specifically, the phrase "A or B" means "A, B, or both A and B". Exclusive "or" is designated herein by terms such as "either A or B" and "one of A or B", for example.

The indefinite articles "a" and "an" are employed to describe elements and components of embodiments. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

For the purposes of describing the embodiments, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters. It is also understood that, unless otherwise specified, terms such as "top," "bottom," "outward," "inward," and the like are words of convenience and are not to be construed as limiting terms.

It is noted that terms like "preferably," "commonly," and "typically," when utilized herein, are not utilized to limit the scope or to imply that certain features are critical, essential, or even important to the structure or function of the embodiments described. Rather, these terms are merely intended to identify particular aspects of an embodiment or to emphasize alternative or additional features that may or may not be utilized in a particular embodiment.

For the purposes of describing and defining embodiments it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

It is noted that one or more of the claims may utilize the term "wherein" as a transitional phrase. For the purposes of defining embodiments, it is noted that this term is introduced in the claims as an open-ended transitional phrase that is used to introduce a recitation of a series of characteristics of the structure and should be interpreted in like manner as the more commonly used open-ended preamble term "comprising."

As a result of the raw materials and/or equipment used to produce the glass composition, certain impurities or components that are not intentionally added, can be present in the final glass composition. Such materials are present in the glass composition in minor amounts and are referred to herein as "tramp materials."

As used herein, a glass composition having 0 wt % or mol % of a compound is defined as meaning that the compound, molecule, or element was not purposefully added to the composition, but the composition may still comprise the compound, typically in tramp or trace amounts. Similarly, "sodium-free," "alkali-free," "potassium-free" or the like are defined to mean that the compound, molecule, or element was not purposefully added to the composition, but the composition may still comprise sodium, alkali, or potassium, but in approximately tramp or trace amounts. Unless otherwise specified, the concentrations of all constituents recited herein are expressed in terms of mole percent (mol %).

Vickers indentation cracking threshold measurements described herein are performed by applying and then removing an indentation load to the glass surface at a rate of 0.2 mm/min. The maximum indentation load is held for 10 seconds. The indentation cracking threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Chemically strengthened alkali aluminosilicate glasses having high damage resistance (i.e., having Vickers cracking thresholds of greater than 15 kilograms force (kgf), and, in some embodiments, greater than 20 kgf, typically have compositions that satisfy the rule $[(Al_2O_3(mol\%)+B_2O_3(mol\%))/(\Sigma modifier\ oxides(mol\%))] > 1$, where the modifier oxides include alkali and alkaline earth oxides. Such glasses have been previously described in U.S. patent application Ser. No. 12/858,490, filed Aug. 18, 2010, by Kristen L. Barefoot et al., entitled "Crack and Scratch Resistant Glass and Enclosures Made Therefrom."

The enhanced damage resistance of $P_2O_5$-containing alkali aluminosilicate glasses has been previously described in U.S. Provisional Patent Application No. 61/417,941, filed on Nov. 30, 2010, by Dana Craig Bookbinder et al., entitled "Ion Exchangeable Glass with Deep Compressive Layer and High Modulus." The glasses described therein contain phosphate batched with $Al_2O_3$ and $B_2O_3$ to form $AlPO_4$ and $BPO_4$, respectively, and follow the composition rule $$0.75 \leq [(P_2O_5(mol\%)+R_2O(mol\%))/M_2O_3(mol\%)] \leq 1.3,$$

where $M_2O_3 = Al_2O_3 + B_2O_3$.

Described herein are embodiments comprising $P_2O_5$-containing alkali aluminosilicate glasses and articles made therefrom which, when chemically strengthened by ion exchange, achieve Vickers cracking thresholds of at least about 7 kgf, 8, kgf, 9, kgf, 10, kgf, 11 kgf, 12 kgf, 13 kgf, 14 kgf, 15 kgf 16 kgf, 17 kgf, 18 kgf, 19 kgf, and, in some embodiments, at least about 20 kgf. The damage resistance of these glasses and glass articles is enhanced by the addition of at least about 4 mol % $P_2O_5$. In some embodiments, the damage resistance is enhanced by the addition of at least about 5 mol % $P_2O_5$. In some embodiments, the $P_2O_5$ concentration is in a range from about 4 mol % up to about 10 mol % and, in other embodiments in a range from about 4 mol % up to about 15 mol %.

Embodiments described herein generally fall outside the glasses and glass articles of the composition space described in U.S. Provisional Patent Application No. 61/417,941. In addition, the glasses described in the present disclosure nominally comprise primarily tetrahedrally coordinated phosphate ($PO_4^{3-}$) groups that contain one double-bonded oxygen per tetrahedral phosphorus structural unit.

In some embodiments, ratios of $M_2O_3$ to $\Sigma R_xO$ provide glasses that have advantageous melting temperatures, viscosities, and/or liquidus temperatures. Some embodiments may be described by the ratio $(M_2O_3(mol\%)/\Sigma R_xO(mol\%)) < 1.4$, where $M_2O_3 = Al_2O_3 + B_2O_3$, and wherein $\Sigma R_xO$ is the sum of monovalent and divalent cation oxides present in the alkali aluminosilicate glass. In some embodiments, the glasses and glass articles described herein comprise greater than 4 mol % $P_2O_5$, wherein the ratio $(M_2O_3(mol\%)/\Sigma R_xO(mol\%))$ is less than 1.4, where $M_2O_3 = Al_2O_3 + B_2O_3$, and wherein $\Sigma R_xO$ is the sum of monovalent and divalent cation oxides present in the alkali aluminosilicate glass. In some embodiments, the ratio of $(M_2O_3(mol\%)/\Sigma R_xO(mol\%))$ is less than 1.0. In some embodiments, the ratio of $(M_2O_3(mol\%)/\Sigma R_xO(mol\%))$ is less than 1.4, 1.35, 1.3, 1.25, 1.2, 1.15, 1.1, 1.05, 1.0, 0.95, 0.9, 0.85, 0.8, 0.75, or 0.7. In some embodiments, $0.6 < (M_2O_3(mol\%)/R_xO(mol\%)) < 1.4$. In some embodiments, $0.6 < (M_2O_3(mol\%)/R_xO(mol\%)) < 1.2$. In some embodiments, $0.6 < (M_2O_3(mol\%)/R_xO(mol\%)) < 1$.

In some embodiments, $0.8 < (M_2O_3(\text{mol }\%)/R_xO(\text{mol }\%)) < 1.4$. In some embodiments, $0.8 < (M_2O_3(\text{mol }\%)/R_xO(\text{mol }\%)) < 1.2$. In some embodiments, $0.8 < (M_2O_3(\text{mol }\%)/R_xO(\text{mol }\%)) < 1.0$. In some embodiments, $Y < (M_2O_3(\text{mol }\%)/R_xO(\text{mol }\%)) < Z$, wherein Y is about 0.6, 0.65, 0.7, 0.75, 0.8, 0.85, 0.9, 0.95, 1.0, 1.05, or 1.1 and X is independently about 1.4, 1.35, 1.3, 1.25, 1.2, 1.15, 1.1, 1.05, 1.0, 0.95, 0.9, 0.85, 0.8, and wherein X>Y. Such monovalent and divalent oxides include, but are not limited to, alkali metal oxides ($Li_2O$, $Na_2O$, $K_2O$, $Rb_2O$, $Cs_2O$), alkaline earth oxides (MgO, CaO, SrO, BaO), and transition metal oxides such as, but not limited to, ZnO.

In some embodiments, the glasses described herein satisfy the inequality $$[(Al_2O_3(\text{mol}\%) + B_2O_3(\text{mol}\%))/(\Sigma \text{modifier oxides (mol}\%))] < 1.0.$$

In some embodiments, the glasses can have sufficient $P_2O_5$ to allow for a glass structure wherein $P_2O_5$ is present in the structure rather, or in addition to, $MPO_4$. In some embodiments, such a structure may be described by the ratio $[(P_2O_5(\text{mol }\%) + R_2O(\text{mol }\%))/M_2O_3(\text{mol }\%)] > 1.24$, where $M_2O_3 = Al_2O_3 + B_2O_3$, $P_2O_5$ is 4 mol % or greater, and wherein $R_2O$ is the sum divalent cation oxides present in the alkali aluminosilicate glass. In some embodiments, the glasses described herein comprise greater than 4 mol % $P_2O_5$, wherein the ratio of $[(P_2O_5(\text{mol }\%) + R_2O(\text{mol }\%))/M_2O_3(\text{mol }\%)]$ is greater than 1.24, where $M_2O_3 = Al_2O_3 + B_2O_3$, and wherein $R_2O$ is the sum divalent cation oxides present in the alkali aluminosilicate glass. In some embodiments, the ratio of $[(P_2O_5(\text{mol }\%) + R_2O(\text{mol }\%))/M_2O_3(\text{mol }\%)]$ is greater than 1.3. In some embodiments, the ratio is $1.24 \leq [(P_2O_5(\text{mol }\%) + R_2O(\text{mol }\%))/M_2O_3(\text{mol }\%)] \leq 2.8$. In some embodiments, the glasses and glass articles described herein comprise greater than 4 mol % $P_2O_5$, and are described by the ratio $$S \leq [(P_2O_5(\text{mol}\%) + R_2O(\text{mol}\%))/M_2O_3(\text{mol}\%)] \leq V$$

wherein S is independently about 1.5, 1.45, 1.4, 1.35, 1.3, 1.25, 1.24, 1.2, or 1.15, and V is independently about 2.0, 2.05, 2.1, 2.15, 2.2, 2.25, 2.3, 2.35, 2.4, 2.45, 2.5, 2.55, 2.6, 2.65, 2.7, 2.75, or 2.8.

The alkli aluminosilicate glasses and articles described herein comprise a number of chemical components. $SiO_2$, an oxide involved in the formation of glass, functions to stabilize the networking structure of glass. In some embodiments, the glass composition can comprise from about 40 to about 70 mol % $SiO_2$. In some embodiments, the glass composition can comprise from about 50 to about 70 mol % $SiO_2$. In some embodiments, the glass composition can comprise from about 55 to about 65 mol % $SiO_2$. In some embodiments, the glass composition can comprise from about 40 to about 70 mol %, about 40 to about 65 mol %, about 40 to about 60 mol %, about 40 to about 55 mol %, about 40 to 50 mol %, about 40 to 45 mol %, 50 to about 70 mol %, about 50 to about 65 mol %, about 50 to about 60 mol %, about 50 to about 55 mol %, about 55 to about 70 mol %, about 60 to about 70 mol %, about 65 to about 70 mol %, about 55 to about 65 mol %, or about 55 to about 60 mol % $SiO_2$. In some embodiments, the glass composition comprises about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 mol % $SiO_2$.

$Al_2O_3$ may provide, among other benefits, for a) maintaining the lowest possible liquidus temperature, b) lowering the expansion coefficient, or c) enhancing the strain point. In some embodiments, the glass composition can comprise from about 11 to about 25 mol % $Al_2O_3$. In some embodiments, the glass composition can comprise from about 14 to about 20 mol % $Al_2O_3$. In some embodiments, the glass composition can comprise from about 11 to about 25 mol %, about 11 to about 20 mol %, about 11 to about 18 mol %, about 11 to about 15 mol %, about 12 to about 25 mol %, about 12 to about 20 mol %, about 12 to about 18 mol %, about 12 to about 15 mol %, about 14 to about 25 mol %, about 14 to about 20 mol %, about 14 to about 18 mol %, about 14 to about 15 mol %, about 18 to about 25 mol %, about 18 to about 20 mol %, or about 20 to about 25 mol % $Al_2O_3$. In some embodiments, the glass composition can comprise about 11, 12, 13, 14, 15, 16, 17, 18, 19, 20, 21, 22, 23, 24, or 25 mol % $Al_2O_3$.

The presence of $B_2O_3$ in embodiments can improve damage resistance, but may also be detrimental to compressive stress and diffusivity. The glasses described herein generally do not contain—or are free of—$B_2O_3$. In some embodiments, about 0.1, 0.2, 0.3, 0.4, 0.5, 0.6, 0.7, 0.8, 0.9, 1, 2, 3, or 4 mol % $B_2O_3$ may be present. In some embodiments, less than 4, 3, 2, or 1 mol % $B_2O_3$ may be present. In some embodiments, tramp $B_2O_3$ may be present. In some embodiments, the glass composition can comprise about 0 mol % $B_2O_3$. In some embodiments, the amount of $B_2O_3$ is 0.5 mol % or less, 0.25 mol % or less, 0.1 mol % or less, about 0.05 mol % or less, 0.001 mol % or less, 0.0005 mol % or less, or 0.0001 mol % or less. The glass compositions, according to some embodiments, are free of intentionally added $B_2O_3$.

It has been discovered that addition of phosphorous to the glass as $P_2O_5$ improves damage resistance and does not impede ion exchange. In some embodiments, the addition of phosphorous to the glass creates a structure in which silica ($SiO_2$ in the glass) is replaced by aluminum phosphate ($AlPO_4$), which consists of tetrahedrally coordinated aluminum and phosphorus and/or boron phosphate ($BPO_4$), which consists of tetrahedrally coordinated boron and phosphorus. The glasses described herein generally contain greater than 4 mol % $P_2O_5$. In some embodiments, the glass can comprise from about 4 to about 15 mol % $P_2O_5$. In some embodiments, the glass can comprise from about 4 to about 12 mol % $P_2O_5$. In some embodiments, the glass can comprise from about 4 to about 10 mol % $P_2O_5$. In some embodiments, the glass can comprise from about 6 to about 10 mol % $P_2O_5$. In some embodiments, the glass composition can comprise from about 4 to about 15 mol %, about 6 to about 15 mol %, about 8 to about 15 mol %, about 10 to about 15 mol %, about 12 to about 15 mol %, about 4 to about 12 mol %, about 4 to about 10 mol %, about 4 to about 8 mol %, about 4 to about 6 mol %, about 6 to about 12 mol %, about 6 to about 10 mol %, about 6 to about 8 mol %, about 8 to about 12 mol %, about 8 to about 10 mol %, about 10 to about 12 mol %. In some embodiments, the glass composition can comprise about 4, 5, 6, 7, 8, 9, 10, 11, 12, 13, 14, or mol % $P_2O_5$.

$Na_2O$ may be used for ion exchange in embodied glasses. In some embodiments, the glass can comprise from about 13 to about 25 mol % $Na_2O$. In other embodiments, the glass can comprise about 13 to about 20 mol % $Na_2O$. In some embodiments, the glass composition can comprise from about 13 to about 25 mol %, about 13 to about 20 mol %, about 13 to about 18 mol %, about 13 to about 15 mol %, about 15 to about 25 mol %, about 15 to about 20 mol %, about 15 to about 18 mol %, about 18 to about 25 mol %, about 18 to about 20 mol %, or about 20 to about 25 mol %. In some embodiments, the glass can comprise about 13, 14, 15, 16, 17, 18, 19, 20, 21, 22, 23, 24, or 25 mol % $Na_2O$.

$R_xO$ generally describes monovalent and divalent cation oxides present in the alkali aluminosilicate glass. The presence $R_xO$ may provide advantages for ion exchange of the glass. Such monovalent and divalent oxides include, but are not limited to, alkali metal oxides ($Li_2O$, $Na_2O$, $K_2O$, $Rb_2O$, $Cs_2O$), alkaline earth oxides (MgO, CaO, SrO, BaO), and transition metal oxides such as, but not limited to, ZnO. In some embodiments, the amount of $R_xO$ in the composition is described by the equation ($M_2O_3$(mol %)/$\Sigma R_xO$(mol %))<1.4. In some embodiments, the amount of $R_xO$ in the composition is described by the equation ($M_2O_3$(mol %)/$\Sigma R_xO$(mol %))<1.0. In some embodiments, the amount of $R_xO$ in the composition is described by the equation 0.6<($M_2O_3$(mol %)/$\Sigma R_xO$(mol %))<1.4. In some embodiments, the amount of $R_xO$ in the composition is described by the equation 0.6<($M_2O_3$(mol %)/$\Sigma R_xO$(mol %))<1.0. In some embodiments, the glass composition can comprise from about 7 to about 30 mol % $Al_2O_3$. In some embodiments, the glass composition can comprise from about 14 to about 25 mol % $Al_2O_3$. In some embodiments, the glass composition can comprise from about 7 to about 30 mol %, about 7 to about 25 mol %, about 7 to about 22 mol %, about 7 to about 20 mol %, about 7 to about 18 mol %, about 7 to about 15 mol %, about 7 to about 10 mol %, about 10 to about 30 mol %, about 10 to about 25 mol %, about 10 to about 22 mol %, about 10 to about 18 mol %, about 10 to about 15 mol %, about 15 to about 30 mol %, about 15 to about 25 mol %, about 15 to about 22 mol %, about 15 to about 18 mol %, about 18 to about 30 mol %, about 18 to about 25 mol %, about 18 to about 22 mol %, about 18 to about 20 mol %, about 20 to about 30 mol %, about 20 to about 25 mol %, about 20 to about 22 mol %, about 22 to about 30 mol %, about 22 to about 25 mol %, or about 25 to about 30 mol %. In some embodiments, the glass composition can comprise about 8, 9, 10, 11, 12, 13, 14, 15, 16, 17, 18, 19, 20, 21, 22, 23, 24, 25, 26, 27, 28, 29, or 30 mol % $R_xO$.

$M_2O_3$ describes the amount of $Al_2O_3$ and $B_2O_3$ in the composition. In some embodiments, the glass composition can comprise from about 11 to about 30 mol % $M_2O_3$. In some embodiments, the glass composition can comprise from about 14 to about 20 mol % $M_2O_3$. In some embodiments, the glass composition can comprise from about 11 to about 30 mol %, about 11 to about 25 mol %, about 11 to about 20 mol %, about 11 to about 18 mol %, about 11 to about 15 mol %, about 12 to about 30 mol %, about 12 to about 25 mol %, about 12 to about 20 mol %, about 12 to about 18 mol %, about 12 to about 15 mol %, about 14 to about 30 mol %, about 14 to about 25 mol %, about 14 to about 20 mol %, about 14 to about 18 mol %, about 14 to about 15 mol %, about 18 to about 25 mol %, about 18 to about 20 mol %, or about 20 to about 25 mol % $M_2O_3$. In some embodiments, the glass composition can comprise about 11, 12, 13, 14, 15, 16, 17, 18, 19, 20, 21, 22, 23, 24, 25, 26, 27, 28, 29, or 30 mol % $M_2O_3$.

$K_2O$ in some embodiments can be used for ion exchange, but can be detrimental to compressive stress. In some embodiments, the glass compositions are free of $K_2O$. The glass compositions are substantially $K_2O$-free, for example, when the content of $K_2O$ is 0.5 mol percent or less, 0.25 mol % or less, 0.1 mol % or less, about 0.05 mol % or less, 0.001 mol % or less, 0.0005 mol % or less, or 0.0001 mol % or less. The glass sheets, according to some embodiments, are free of intentionally added sodium. In some embodiments, the glass can comprise from 0 to about 1 mol % $K_2O$. In other embodiments, the glass can comprise greater than 0 to about 1 mol % $K_2O$. In some embodiments, the glass composition can comprise from 0 to about 2 mol %, 0 to about 1.5 mol %, 0 to about 1 mol %, 0 to about 0.9 mol %, 0 to about 0.8 mol % 0 to about 0.7 mol %, 0 to about 0.6 mol %, 0 to about 0.5 mol %, 0 to about 0.4 mol %, 0 to about 0.3 mol %, 0 to about 0.2 mol %, or 0 to about 0.1 mol %. In some embodiments, the glass can comprise about 0, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, or 1 mol % $K_2O$.

Additional components can be incorporated into the glass compositions to provide additional benefits. For example, additional components can be added as fining agents (e.g., to facilitate removal of gaseous inclusions from melted batch materials used to produce the glass) and/or for other purposes. In some embodiments, the glass may comprise one or more compounds useful as ultraviolet radiation absorbers. In some embodiments, the glass can comprise 3 mol % or less $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, Br, or combinations thereof. In some embodiments, the glass can comprise from 0 to about 3 mol %, 0 to about 2 mol %, 0 to about 1 mol %, 0 to 0.5 mol %, 0 to 0.1 mol %, 0 to 0.05 mol %, or 0 to 0.01 mol % $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, Br, or combinations thereof. In some embodiments, the glass can comprise from 0 to about 3 mol %, 0 to about 2 mol %, 0 to about 1 mol %, 0 to about 0.5 mol %, 0 to about 0.1 mol %, 0 to about 0.05 mol %, or 0 to about 0.01 mol % $TiO_2$, $CeO_2$, or $Fe_2O_3$, or combinations thereof.

The glass composition, according to some embodiments, (e.g., any of the glasses discussed above) can include F, Cl, or Br, for example, as in the case where the glasses comprise Cl and/or Br as fining agents.

The glass composition, according to some embodiments, can comprise BaO. In certain embodiments, the glasses can comprise less than about 5, less than about 4, less than about 3, less than about 2, less than about 1, less than 0.5, or less than 0.1 mol % of BaO.

In some embodiments, the glass can be substantially free of $Sb_2O_3$, $As_2O_3$, or combinations thereof. For example, the glass can comprise 0.05 mol % or less of $Sb_2O_3$ or $As_2O_3$ or a combination thereof, the glass may comprise zero mol % of $Sb_2O_3$ or $As_2O_3$ or a combination thereof, or the glass may be, for example, free of any intentionally added $Sb_2O_3$, $As_2O_3$, or combinations thereof.

The glasses, according to some embodiments, can further comprise contaminants typically found in commercially-prepared glass. In addition, or alternatively, a variety of other oxides (e.g., $TiO_2$, MnO, ZnO, $Nb_2O_5$, $MoO_3$, $Ta_2O_5$, $WO_3$, $ZrO_2$, $Y_2O_3$, $La_2O_3$, $P_2O_5$, and the like) may be added, albeit with adjustments to other glass components, without compromising the melting or forming characteristics of the glass composition. In those cases where the glasses, according to some embodiments, further include such other oxide(s), each of such other oxides are typically present in an amount not exceeding about 3 mol %, about 2 mol %, or about 1 mol %, and their total combined concentration is typically less than or equal to about 5 mol %, about 4 mol %, about 3 mol %, about 2 mol %, or about 1 mol %. In some circumstances, higher amounts can be used so long as the amounts used do not place the composition outside of the ranges described above. The glasses, according to some embodiments, can also include various contaminants associated with batch materials and/or introduced into the glass by the melting, fining, and/or forming equipment used to produce the glass (e.g., $ZrO_2$).

In some embodiments, the alkali aluminosilicate glasses and articles described herein comprise from about 40 mol % to about 70 mol % $SiO_2$; from about 11 mol % to about 25 mol % $Al_2O_3$; from about 4 mol % to about 15 mol % $P_2O_5$; and from about 11 mol % to about 25 mol % $Na_2O$.

In some embodiments, the glass compositions have high damage resistance. In some embodiments, the glass compositions have Vickers cracking thresholds of greater than 7 kilograms force (kgf). In some embodiments, the glass compositions have Vickers cracking thresholds of greater than 12 kgf. In some embodiments, the glass compositions have Vickers cracking thresholds of greater than 15 kgf. In some embodiments, the glass compositions have Vickers cracking thresholds of greater than 20 kgf. In some embodiments, the glass compositions have Vickers cracking thresholds of greater than 6, 7, 8, 9, 10, 11, 12, 13, 14, 15, 16, 17, 18, 19, 20, 21, 22, 23, 24, or 25 kgf.

Non-limiting examples of embodied glasses (wherein the glass thickness is 0.7 mm) are listed in Table 1.

TABLE 1

Glass compositions and properties.

| Sample | a | b | c | d | e | f | g | h | i | j | k | l |
|---|---|---|---|---|---|---|---|---|---|---|---|---|
| $SiO_2$ (mol %) | 61 | 59 | 57 | 62 | 60 | 58 | 60 | 60 | 60 | 60 | 60 | 60 |
| $B_2O_3$ (mol %) | 0 | 0 | 0 | 0 | 0 | 0 | 0 | 0 | 0 | 0 | 0 | 0 |
| $Al_2O_3$ (mol %) | 15.5 | 16.5 | 17.5 | 15.5 | 16.5 | 17.5 | 16 | 16 | 16 | 16 | 16 | 16 |
| $P_2O_5$ (mol %) | 7 | 7 | 7 | 6 | 6 | 6 | 5 | 5 | 6 | 6 | 7 | 7 |
| $Na_2O$ (mol %) | 16.5 | 17.5 | 18.5 | 16.5 | 17.5 | 18.5 | 16 | 16 | 16 | 16 | 16 | 16 |
| MgO (mol %) | 0 | 0 | 0 | 0 | 0 | 0 | 3 | 0 | 2 | 0 | 1 | 0 |
| ZnO (mol %) | 0 | 0 | 0 | 0 | 0 | 0 | 0 | 3 | 0 | 2 | 0 | 1 |
| Density (g/cm$^3$) | 2.388 | 2.401 | 2.412 | 2.393 | 2.406 | 2.416 | | | | | | |
| Molar Volume (cm$^3$/mol) | 30.41 | 30.43 | 30.47 | 30.01 | 30.03 | 30.08 | | | | | | |
| Strain Point (° C.) | 615 | 620 | 625 | 633 | 638 | 640 | | | | | | |
| Anneal Point (° C.) | 675 | 678 | 682 | 693 | 697 | 699 | | | | | | |
| Softening Point (° C.) | 963 | 958 | 951 | 973 | 978 | 969 | | | | | | |
| T200P (° C.) | 1732 | 1708 | 1683 | 1752 | 1720 | 1698 | | | | | | |
| T35000P (° C.) | 1284 | 1274 | 1260 | 1304 | 1289 | 1275 | | | | | | |
| T160000P (° C.) | 1195 | 1186 | 1176 | 1215 | 1202 | 1191 | | | | | | |
| Liquidus Temperature (° C.) | 775 | 740 | 730 | 770 | 790 | 770 | | | | | | |
| 0.7 mm thick parts annealed | | | | | | | | | | | | |
| 410° C., 8 hr Compressive Stress (MPa) | 665 | over limits of FSM | over limits of FSM | over limits of FSM | over limits of FSM | over limits of FSM | | | | | | |
| 410° C., 8 hr Depth of Layer (μm) | 113 | over limits of FSM | over limits of FSM | over limits of FSM | over limits of FSM | over limits of FSM | | | | | | |
| 410° C., 1 hr Compressive Stress (MPa) | 764 | 806 | 866 | 805 | 863 | 922 | | | | | | |
| 410° C., 1 hr Depth of Layer (μm) | 40 | 38 | 38 | 39 | 37 | 36 | | | | | | |
| 410° C., 4 hr Compressive Stress (MPa) | 706 | 747 | 804 | 745 | 805 | over limits of FSM | | | | | | |
| 410° C., 4 hr Depth of Layer (microns) | 80 | 82 | 80 | 77 | 77 | over limits of FSM | | | | | | |
| 410° C., 4 hr Vickers Crack Initiation Load (kgf) | >25 | >20 | >20 | >15 | >25 | >15 | | | | | | |
| 470° C., 6 min Compressive Stress (MPa) | 736 | 780 | 837 | 778 | 836 | 894 | | | | | | |
| 470° C., 6 min Depth of Layer (μm) | 23 | 23 | 23 | 23 | 23 | 23 | | | | | | |
| $(Al_2O_3 + B_2O_3)/R_xO$ | 0.94 | 0.94 | 0.95 | 0.94 | 0.94 | 0.95 | 0.84 | 0.84 | 0.89 | 0.89 | 0.94 | 0.94 |
| $(P_2O_5 + R_xO)/M_2O_3$ | 1.52 | 1.48 | 1.46 | 1.45 | 1.42 | 1.40 | 1.5 | 1.5 | 1.5 | 1.5 | 1.54 | 1.5 |

TABLE 1-continued

Glass compositions and properties.

| Sample | a | b | c | d | e | f | g | h | i | j | k | l |
|---|---|---|---|---|---|---|---|---|---|---|---|---|
| K⁺/Na⁺ Ion-Exchange Interdiffusion Coefficient at 410° C. in annealed parts × $10^{-10}$ (cm²/s) | 5.78 | 5.65 | 5.50 | 5.43 | 5.16 | 4.69 | | | | | | |

Non-limiting examples of embodied glasses (wherein the glass thickness is 1.0 mm) are listed in Table 2 (for ion-exchange data, if no SOC is provided, the default used was 3.0 using 1.0 mm thick ion-exchanged parts).

TABLE 2

Glass compositions and properties.

| | Example Number | | | | | | |
|---|---|---|---|---|---|---|---|
| | 1 | 2 | 3 | 4 | 5 | 6 | 7 |
| $SiO_2$ in mol % | 61.0 | 59.0 | 57.0 | 62.0 | 60.0 | 58.0 | 58.0 |
| $Al_2O_3$ in mol % | 15.5 | 16.5 | 17.5 | 15.5 | 16.5 | 17.5 | 17.4 |
| $P_2O_5$ in mol % | 7.0 | 7.0 | 7.0 | 6.0 | 6.0 | 6.0 | 6.1 |
| $Na_2O$ in mol % | 16.5 | 17.5 | 18.5 | 16.5 | 17.5 | 18.5 | 18.5 |
| MgO in mol % | 0.0 | 0.0 | 0.0 | 0.0 | 0.0 | 0.0 | 0.1 |
| ZnO in mol % | 0.0 | 0.0 | 0.0 | 0.0 | 0.0 | 0.0 | 0.0 |
| $SnO_2$ in mol % | 0.0 | 0.0 | 0.0 | 0.0 | 0.0 | 0.0 | 0.0 |
| CaO in mol % | 0.0 | 0.0 | 0.0 | 0.0 | 0.0 | 0.0 | 0.0 |
| $(M_2O_3)/R_xO$ in mol % | 0.94 | 0.94 | 0.95 | 0.94 | 0.94 | 0.95 | 0.95 |
| $(P_2O_5 + R_2O)/(M_2O_3)$ in mol % | 1.52 | 1.48 | 1.46 | 1.45 | 1.42 | 1.40 | 1.41 |
| $(P_2O_5 + R_xO)/(M_2O_3)$ in mol % | 1.52 | 1.48 | 1.46 | 1.45 | 1.42 | 1.40 | 1.40 |
| $SiO_2$ in wt % | 50.5 | 48.5 | 46.6 | 51.9 | 49.9 | 48.0 | 48.0 |
| $Al_2O_3$ in wt % | 21.8 | 23.0 | 24.3 | 22.0 | 23.3 | 24.6 | 24.4 |
| $P_2O_5$ in wt % | 13.7 | 13.6 | 13.5 | 11.9 | 11.8 | 11.7 | 11.8 |
| $Na_2O$ in wt % | 14.1 | 14.8 | 15.6 | 14.2 | 15.0 | 15.8 | 15.8 |
| MgO in wt % | 0.0 | 0.0 | 0.0 | 0.0 | 0.0 | 0.0 | 0.0 |
| ZnO in wt % | 0.0 | 0.0 | 0.0 | 0.0 | 0.0 | 0.0 | 0.0 |
| $SnO_2$ in wt % | 0.0 | 0.0 | 0.0 | 0.0 | 0.0 | 0.0 | 0.0 |
| CaO in wt % | 0.0 | 0.0 | 0.0 | 0.0 | 0.0 | 0.0 | 0.0 |
| Compositional analysis | none | none | none | none | none | none | XRF |
| Density (g/cm³) | 2.388 | 2.401 | 2.412 | 2.393 | 2.406 | 2.416 | 2.416 |
| Molar Volume (cm³/mol) | 30.41 | 30.43 | 30.47 | 30.01 | 30.03 | 30.08 | 30.08 |
| Strain Pt. (° C.) | 615 | 620 | 625 | 633 | 638 | 640 | 640 |
| Anneal Pt. (° C.) | 675 | 678 | 682 | 693 | 697 | 699 | 699 |
| Softening Pt. (° C.) | 963 | 958 | 951 | 973 | 978 | 969 | 969 |
| Temperature at 200 P Viscosity (° C.) | 1732 | 1708 | 1683 | 1752 | 1720 | 1698 | 1698 |
| Temperature at 35 kP Viscosity (° C.) | 1284 | 1274 | 1260 | 1304 | 1289 | 1275 | 1275 |
| Temperature at 160 kP Viscosity (° C.) | 1195 | 1186 | 1176 | 1215 | 1202 | 1191 | 1191 |
| Liquidus Temperature (° C.) | 775 | 740 | 730 | 770 | 790 | 770 | 890 |
| Liquidus Viscosity (P) | 2.91E+10 | 8.74E+10 | 4.40E+11 | 1.67E+11 | 2.46E+10 | 2.04E+11 | 7.09E+08 |
| Zircon Breakdown Temperature (° C.) | | | | | | | |
| Zircon Breakdown Viscosity (P) | | | | | | | |
| Stress Optical Coefficient ((nm · Mpa⁻¹ · mm⁻¹) | | | | | | | |
| Approximate Fictive temperature (° C.) | 675 | 678 | 682 | 693 | 697 | 699 | 795 |
| 410° C. 1 hr Compressive Stress (MPa) | 777 | 820 | 881 | 819 | 878 | 938 | 804 |

TABLE 2-continued

Glass compositions and properties.

| | | | | | | | |
|---|---|---|---|---|---|---|---|
| 410° C. 1 hr Depth of Layer (mm) | 40 | 38 | 38 | 39 | 37 | 36 | 43 |
| 410° C. 1 hr Vickers Crack Initiation Load (kgf) | | | | | | | |
| 410° C. 2 hr Compressive Stress (MPa) | | | | | | | |
| 410° C. 2 hr Depth of Layer (mm) | | | | | | | |
| 410° C. 2 hr Vickers Crack Initiation Load (kgf) | | | | | | | |
| 410° C. 3 hr Compressive Stress (MPa) | | | | | | | |
| 410° C. 3 hr Depth of Layer (mm) | | | | | | | |
| 410° C. 4 hr Compressive Stress (MPa) | 718 | 760 | 818 | 758 | 819 | over | |
| 410° C. 4 hr Depth of Layer (mm) | 80 | 82 | 80 | 77 | 77 | over | |
| 410° C. 4 hr Vickers Crack Initiation Load (kgf) | >25 | >20 | >20 | >15 | >25 | >15 | |
| 410° C. 8 hr Compressive Stress (MPa) | 678 | over | over | over | over | over | |
| 410° C. 8 hr Depth of Layer (mm) | 113 | over | over | over | over | over | |
| D FSM DOL ~1.4 * 2 * (Dt)^0.5 at 410° C. 1 hr | 5.7E−10 | 5.1E−10 | 5.1E−10 | 5.4E−10 | 4.9E−10 | 4.6E−10 | 6.6E−10 |
| D FSM DOL ~1.4 * 2 * (Dt)^0.5 at 410° C. 2 hr | | | | | | | |
| D FSM DOL ~1.4 * 2 * (Dt)^0.5 at 410° C. 3 hr | | | | | | | |
| D FSM DOL ~1.4 * 2 * (Dt)^0.5 at 410° C. 4 hr | 5.7E−10 | 6.0E−10 | 5.7E−10 | 5.3E−10 | 5.3E−10 | | |
| D FSM DOL ~1.4 * 2 * (Dt)^0.5 at 410° C. 8 hr | 5.7E−10 | | | | | | |

| | Example Number | | | | | | |
|---|---|---|---|---|---|---|---|
| | 8 | 9 | 10 | 11 | 12 | 13 | 14 |
| $SiO_2$ in mol % | 60.0 | 60.0 | 60.0 | 60.0 | 60.0 | 60.0 | 62.0 |
| $Al_2O_3$ in mol % | 16.0 | 16.0 | 16.0 | 16.0 | 16.0 | 16.0 | 15.0 |
| $P_2O_5$ in mol % | 5.0 | 5.0 | 6.0 | 6.0 | 7.0 | 7.0 | 5.0 |
| $Na_2O$ in mol % | 16.0 | 16.0 | 16.0 | 16.0 | 16.0 | 16.0 | 15.0 |
| MgO in mol % | 3.0 | 0.0 | 2.0 | 0.0 | 1.0 | 0.0 | 3.0 |
| ZnO in mol % | 0.0 | 3.0 | 0.0 | 2.0 | 0.0 | 1.0 | 0.0 |
| $SnO_2$ in mol % | 0.0 | 0.0 | 0.0 | 0.0 | 0.0 | 0.0 | 0.0 |
| CaO in mol % | 0.0 | 0.0 | 0.0 | 0.0 | 0.0 | 0.0 | 0.0 |
| $(M_2O_3)/R_xO$ in mol % | 0.84 | 0.84 | 0.89 | 0.89 | 0.94 | 0.94 | 0.83 |
| $(P_2O_5 + R_2O)/(M_2O_3)$ in mol % | 1.31 | 1.31 | 1.38 | 1.38 | 1.44 | 1.44 | 1.33 |
| $(P_2O_5 + R_xO)/(M_2O_3)$ in mol % | 1.50 | 1.50 | 1.50 | 1.50 | 1.50 | 1.50 | 1.53 |
| $SiO_2$ in wt % | 51.1 | 50.2 | 50.3 | 49.8 | 49.6 | 49.4 | 53.1 |
| $Al_2O_3$ in wt % | 23.1 | 22.7 | 22.8 | 22.5 | 22.5 | 22.3 | 21.8 |
| $P_2O_5$ in wt % | 10.1 | 9.9 | 11.9 | 11.8 | 13.7 | 13.6 | 10.1 |
| $Na_2O$ in wt % | 14.0 | 13.8 | 13.8 | 13.7 | 13.7 | 13.6 | 13.3 |
| MgO in wt % | 1.7 | 0.0 | 1.1 | 0.0 | 0.6 | 0.0 | 1.7 |
| ZnO in wt % | 0.0 | 3.4 | 0.0 | 2.2 | 0.0 | 1.1 | 0.0 |
| $SnO_2$ in wt % | 0.0 | 0.0 | 0.0 | 0.0 | 0.0 | 0.0 | 0.0 |
| CaO in wt % | 0.0 | 0.0 | 0.0 | 0.0 | 0.0 | 0.0 | 0.0 |
| Compositional analysis | none | none | none | none | none | none | none |
| Density (g/cm³) | 2.417 | 2.453 | 2.406 | 2.428 | 2.393 | 2.404 | 2.423 |
| Molar Volume (cm³/mol) | 29.21 | 29.28 | 29.76 | 29.83 | 30.35 | 30.38 | 28.95 |
| Strain Pt. (° C.) | 643 | 621 | 623 | 619 | 611 | 621 | 680 |

TABLE 2-continued

| Glass compositions and properties. | | | | | | | |
|---|---|---|---|---|---|---|---|
| Anneal Pt. (° C.) | 696 | 681 | 684 | 681 | 675 | 683 | 730 |
| Softening Pt. (° C.) | 964 | 954.3 | 963.5 | 963.4 | 965 | 967.4 | 989.1 |
| Temperature at 200 P Viscosity (° C.) | 1668 | 1677 | 1695 | 1698 | 1714 | 1713 | 1676 |
| Temperature at 35 kP Viscosity (° C.) | 1247 | 1252 | 1268 | 1265 | 1280 | 1277 | 1252 |
| Temperature at 160 kP Viscosity (° C.) | 1162 | 1166 | 1181 | 1178 | 1193 | 1190 | 1167 |
| Liquidus Temperature (° C.) | 960 | | | | | | 1100 |
| Liquidus Viscosity (P) | 1.85E+07 | | | | | | 6.28E+05 |
| Zircon Breakdown Temperature (° C.) | 1240 | | | | | | >1265 |
| Zircon Breakdown Viscosity (P) | 39255 | | | | | | <28281 |
| Stress Optical Coefficient ((nm · Mpa$^{-1}$ · mm$^{-1}$)) | 3.015 | 3.132 | 3.055 | 3.122 | | | 2.999 |
| Approximate Fictive temperature (° C.) | 798 | 754 | 767 | 745 | 778 | 778 | 824 |
| 410° C. 1 hr Compressive Stress (MPa) | 932 | 963 | 833 | 895 | 817 | 820 | 970 |
| 410° C. 1 hr Depth of Layer (mm) | 32 | 28 | 33 | 32 | 39 | 39 | 33 |
| 410° C. 1 hr Vickers Crack Initiation Load (kgf) | | | | | | | |
| 410° C. 2 hr Compressive Stress (MPa) | 901 | 959 | 813 | 874 | 797 | 796 | 959 |
| 410° C. 2 hr Depth of Layer (mm) | 44 | 38 | 48 | 46 | 54 | 53 | 44 |
| 410° C. 2 hr Vickers Crack Initiation Load (kgf) | >30 | >20 | >20 | >20 | >20 | >20 | >20 |
| 410° C. 3 hr Compressive Stress (MPa) | 895 | 949 | 808 | 868 | 787 | 781 | |
| 410° C. 3 hr Depth of Layer (mm) | 54 | 46 | 57 | 55 | 65 | 65 | |
| 410° C. 4 hr Compressive Stress (MPa) | 884 | 942 | 792 | 842 | 770 | 772 | |
| 410° C. 4 hr Depth of Layer (mm) | 63 | 54 | 64 | 63 | 76 | 76 | |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | 3.6E−10 | 2.8E−10 | 3.9E−10 | 3.6E−10 | 5.4E−10 | 5.4E−10 | 3.9E−10 |
| D FSM DOL ~1.4 * 2 * (Dt)^0.5 at 410° C. 2 hr | 3.4E−10 | 2.6E−10 | 4.1E−10 | 3.7E−10 | 5.2E−10 | 5.0E−10 | 3.4E−10 |
| D FSM DOL ~1.4 * 2 * (Dt)^0.5 at 410° C. 3 hr | 3.4E−10 | 2.5E−10 | 3.8E−10 | 3.6E−10 | 5.0E−10 | 5.0E−10 | |
| D FSM DOL ~1.4 * 2 * (Dt)^0.5 at 410° C. 4 hr | 3.5E−10 | 2.6E−10 | 3.6E−10 | 3.5E−10 | 5.1E−10 | 5.1E−10 | |
| D FSM DOL ~1.4 * 2 * (Dt)^0.5 at 410° C. 8 hr | | | | | | | |

TABLE 2-continued

Glass compositions and properties.

| | Example Number | | | | | | |
|---|---|---|---|---|---|---|---|
| | 15 | 16 | 17 | 18 | 19 | 20 | 21 |
| $SiO_2$ in mol % | 61.0 | 63.1 | 61.2 | 61.3 | 60.8 | 60.9 | 60.3 |
| $Al_2O_3$ in mol % | 14.8 | 13.9 | 15.9 | 15.8 | 16.0 | 15.8 | 15.7 |
| $P_2O_5$ in mol % | 4.9 | 5.0 | 5.0 | 4.9 | 4.9 | 4.9 | 5.5 |
| $Na_2O$ in mol % | 15.3 | 13.9 | 15.8 | 16.0 | 16.1 | 15.8 | 16.0 |
| MgO in mol % | 3.8 | 4.1 | 2.0 | 2.0 | 2.0 | 2.5 | 2.5 |
| ZnO in mol % | 0.0 | 0.0 | 0.0 | 0.0 | 0.0 | 0.0 | 0.0 |
| $SnO_2$ in mol % | 0.0 | 0.0 | 0.1 | 0.1 | 0.1 | 0.1 | 0.1 |
| CaO in mol % | 0.0 | 0.1 | 0.0 | 0.0 | 0.0 | 0.0 | 0.0 |
| $(M_2O_3)/R_xO$ in mol % | 0.77 | 0.77 | 0.90 | 0.88 | 0.88 | 0.86 | 0.85 |
| $(P_2O_5 + R_2O)/(M_2O_3)$ in mol % | 1.36 | 1.36 | 1.30 | 1.32 | 1.31 | 1.31 | 1.37 |
| $(P_2O_5 + R_xO)/(M_2O_3)$ in mol % | 1.63 | 1.65 | 1.43 | 1.45 | 1.44 | 1.47 | 1.53 |
| $SiO_2$ in wt % | 52.5 | 54.6 | 52.0 | 52.1 | 51.7 | 51.9 | 51.0 |
| $Al_2O_3$ in wt % | 21.6 | 20.4 | 23.0 | 22.7 | 23.1 | 22.8 | 22.5 |
| $P_2O_5$ in wt % | 10.0 | 10.2 | 10.0 | 9.8 | 9.8 | 9.8 | 10.9 |
| $Na_2O$ in wt % | 13.6 | 12.4 | 13.8 | 14.0 | 14.1 | 13.9 | 13.9 |
| MgO in wt % | 2.2 | 2.4 | 1.1 | 1.1 | 1.1 | 1.4 | 1.4 |
| ZnO in wt % | 0.0 | 0.0 | 0.0 | 0.0 | 0.0 | 0.0 | 0.0 |
| $SnO_2$ in wt % | 0.0 | 0.0 | 0.1 | 0.2 | 0.2 | 0.2 | 0.2 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm$^3$) | 2.411 | 2.404 | 2.413 | 2.415 | 2.417 | 2.418 | 2.416 |
| Molar Volume (cm$^3$/mol) | 28.98 | 28.89 | 29.32 | 29.26 | 29.28 | 29.17 | 29.38 |
| Strain Pt. (° C.) | 659 | 672 | 631 | 630 | 628 | 630 | 631 |
| Anneal Pt. (° C.) | 709 | 734 | 689 | 687 | 685 | 683 | 685 |
| Softening Pt. (° C.) | 980.3 | 999.4 | 977.9 | 973.6 | 969.2 | 968.2 | 960.6 |
| Temperature at 200 P Viscosity (° C.) | 1695 | 1711 | 1704 | 1699 | 1698 | 1691 | 1687 |
| Temperature at 35 kP Viscosity (° C.) | 1260 | 1270 | 1285 | 1273 | 1274 | 1268 | 1263 |
| Temperature at 160 kP Viscosity (° C.) | 1173 | 1183 | 1197 | 1187 | 1188 | 1182 | 1177 |
| Liquidus Temperature (° C.) | | | 970 | | | | |
| Liquidus Viscosity (P) | | | 2.97E+07 | | | | |
| Zircon Breakdown Temperature (° C.) | | | >1260 | | | | |
| Zircon Breakdown Viscosity (P) | | | <52623 | | | | |
| Stress Optical Coefficient ((nm · Mpa$^{-1}$ · mm$^{-1}$) | | | 3.095 | | | | 3.014 |
| Approximate Fictive temperature (° C.) | 797 | 831 | 787 | 784 | 781 | 775 | 782 |
| 410° C. 1 hr Compressive Stress (MPa) | 919 | 875 | | 918 | 966 | 954 | |
| 410° C. 1 hr Depth of Layer (mm) | 36 | 32 | | 37 | 35 | 35 | |
| 410° C. 1 hr Vickers Crack Initiation Load (kgf) | | | | | | | |
| 410° C. 2 hr Compressive Stress (MPa) | 917 | 863 | 879 | 906 | 926 | 942 | 912 |
| 410° C. 2 hr Depth of Layer (mm) | 48 | 45 | 47 | 49 | 46 | 48 | 47 |
| 410° C. 2 hr Vickers Crack Initiation Load (kgf) | >20 | 15-20 | >20 | 15-20 | 15-20 | 15-20 | 15-20 |
| 410° C. 3 hr Compressive Stress (MPa) | 881 | 855 | 856 | 906 | 924 | 910 | 878 |
| 410° C. 3 hr Depth of Layer (mm) | 56 | 56 | 57 | 59 | 55 | 56 | 55 |
| 410° C. 4 hr Compressive Stress (MPa) | 874 | 854 | 858 | 869 | 898 | 896 | |

TABLE 2-continued

Glass compositions and properties.

| | | | | | | | |
|---|---|---|---|---|---|---|---|
| 410° C. 4 hr Depth of Layer (mm) | 65 | 65 | 66 | 67 | 64 | 65 | |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | 4.6E−10 | 3.6E−10 | | 4.9E−10 | 4.3E−10 | 4.3E−10 | |
| D FSM DOL ~1.4 * 2 * (Dt)^0.5 at 410° C. 2 hr | 4.1E−10 | 3.6E−10 | 3.9E−10 | 4.3E−10 | 3.7E−10 | 4.1E−10 | 3.9E−10 |
| D FSM DOL ~1.4 * 2 * (Dt)^0.5 at 410° C. 3 hr | 3.7E−10 | 3.7E−10 | 3.8E−10 | 4.1E−10 | 3.6E−10 | 3.7E−10 | 3.6E−10 |
| D FSM DOL ~1.4 * 2 * (Dt)^0.5 at 410° C. 4 hr | 3.7E−10 | 3.7E−10 | | 4.0E−10 | 3.6E−10 | 3.7E−10 | |
| D FSM DOL ~1.4 * 2 * (Dt)^0.5 at 410° C. 8 hr | | | | | | | |

| | Example Number | | | | | | |
|---|---|---|---|---|---|---|---|
| | 22 | 23 | 24 | 25 | 26 | 27 | 28 |
| $SiO_2$ in mol % | 60.3 | 62.3 | 61.3 | 60.8 | 60.5 | 62.2 | 62.1 |
| $Al_2O_3$ in mol % | 15.9 | 14.7 | 15.7 | 16.0 | 15.9 | 14.6 | 14.6 |
| $P_2O_5$ in mol % | 5.5 | 4.9 | 5.0 | 5.0 | 5.2 | 5.0 | 5.0 |
| $Na_2O$ in mol % | 16.2 | 15.0 | 16.0 | 16.1 | 16.3 | 15.1 | 15.2 |
| MgO in mol % | 1.9 | 2.0 | 1.9 | 2.0 | 2.0 | 3.1 | 0.1 |
| ZnO in mol % | 0.0 | 0.0 | 0.0 | 0.0 | 0.0 | 0.0 | 3.0 |
| $SnO_2$ in mol % | 0.1 | 0.1 | 0.1 | 0.1 | 0.1 | 0.1 | 0.1 |
| CaO in mol % | 0.0 | 1.0 | 0.0 | 0.0 | 0.0 | 0.1 | 0.0 |
| $(M_2O_3)/R_xO$ in mol % | 0.88 | 0.82 | 0.87 | 0.88 | 0.87 | 0.80 | 0.80 |
| $(P_2O_5 + R_2O)/(M_2O_3)$ in mol % | 1.36 | 1.36 | 1.34 | 1.32 | 1.35 | 1.37 | 1.38 |
| $(P_2O_5 + R_xO)/(M_2O_3)$ in mol % | 1.48 | 1.56 | 1.46 | 1.45 | 1.47 | 1.59 | 1.59 |
| $SiO_2$ in wt % | 50.9 | 53.3 | 52.1 | 51.6 | 51.2 | 53.4 | 52.4 |
| $Al_2O_3$ in wt % | 22.8 | 21.3 | 22.6 | 23.0 | 22.9 | 21.2 | 20.9 |
| $P_2O_5$ in wt % | 10.9 | 10.0 | 10.0 | 10.0 | 10.4 | 10.1 | 9.9 |
| $Na_2O$ in wt % | 14.1 | 13.2 | 14.0 | 14.1 | 14.2 | 13.3 | 13.2 |
| MgO in wt % | 1.1 | 1.1 | 1.1 | 1.1 | 1.1 | 1.8 | 0.0 |
| ZnO in wt % | 0.0 | 0.0 | 0.0 | 0.0 | 0.0 | 0.0 | 3.4 |
| $SnO_2$ in wt % | 0.2 | 0.2 | 0.2 | 0.2 | 0.2 | 0.2 | 0.2 |
| CaO in wt % | 0.0 | 0.8 | 0.0 | 0.0 | 0.0 | 0.0 | 0.0 |
| Compositional analysis | XRF | XRF | XRF | XRF | XRF | XRF | XRF |
| Density (g/cm³) | 2.415 | 2.415 | 2.414 | 2.417 | 2.416 | 2.413 | 2.449 |
| Molar Volume (cm³/mol) | 29.49 | 29.07 | 29.30 | 29.31 | 29.40 | 29.02 | 29.10 |
| Strain Pt. (° C.) | 632 | 644 | 638 | 639 | 636 | 652 | 614 |
| Anneal Pt. (° C.) | 688 | 695 | 694 | 696 | 694 | 702 | 671 |
| Softening Pt. (° C.) | 965.7 | 980.7 | 975.7 | 972.1 | 970.6 | 977.2 | 950 |
| Temperature at 200 P Viscosity (° C.) | 1690 | 1699 | 1703 | 1698 | 1691 | 1704 | 1702 |
| Temperature at 35 kP Viscosity (° C.) | 1267 | 1267 | 1278 | 1275 | 1269 | 1263 | 1253 |
| Temperature at 160 kP Viscosity (° C.) | 1181 | 1179 | 1191 | 1189 | 1183 | 1178 | 1167 |
| Liquidus Temperature (° C.) | | | | | | | |
| Liquidus Viscosity (P) | | | | | | | |
| Zircon Breakdown Temperature (° C.) | | | | | | | |
| Zircon Breakdown Viscosity (P) | | | | | | | |
| Stress Optical Coefficient ((nm · Mpa⁻¹ · mm⁻¹)) | 3.058 | 3.045 | 3.029 | 3.045 | 3.041 | 3.044 | 3.156 |
| Approximate Fictive temperature (° C.) | 773 | 795 | 780 | 782 | 769 | 796 | 762 |

TABLE 2-continued

Glass compositions and properties.

| | | | | | | | |
|---|---|---|---|---|---|---|---|
| 410° C. 1 hr Compressive Stress (MPa) | | | | | | 873 | 901 |
| 410° C. 1 hr Depth of Layer (mm) | | | | | | 33 | 29 |
| 410° C. 1 hr Vickers Crack Initiation Load (kgf) | | | | | | | |
| 410° C. 2 hr Compressive Stress (MPa) | 900 | 858 | 902 | 906 | 909 | 870 | 862 |
| 410° C. 2 hr Depth of Layer (mm) | 47 | 47 | 47 | 47 | 46 | 47 | 41 |
| 410° C. 2 hr Vickers Crack Initiation Load (kgf) | >20 | 15-20 | 15-20 | 15-20 | >20 | >20 | 15-20 |
| 410° C. 3 hr Compressive Stress (MPa) | 896 | 846 | 890 | 906 | 900 | 862 | 880 |
| 410° C. 3 hr Depth of Layer (mm) | 55 | 56 | 56 | 55 | 53 | 55 | 49 |
| 410° C. 4 hr Compressive Stress (MPa) | | | | | | 864 | 870 |
| 410° C. 4 hr Depth of Layer (mm) | | | | | | 61 | 54 |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~$1.4 * 2 * (Dt)^{0.5}$ at 410° C. 1 hr | | | | | | 3.9E-10 | 3.0E-10 |
| D FSM DOL ~$1.4 * 2 * (Dt)^{0.5}$ at 410° C. 2 hr | 3.9E-10 | 3.9E-10 | 3.9E-10 | 3.9E-10 | 3.7E-10 | 3.9E-10 | 3.0E-10 |
| D FSM DOL ~$1.4 * 2 * (Dt)^{0.5}$ at 410° C. 3 hr | 3.6E-10 | 3.7E-10 | 3.7E-10 | 3.6E-10 | 3.3E-10 | 3.6E-10 | 2.8E-10 |
| D FSM DOL ~$1.4 * 2 * (Dt)^{0.5}$ at 410° C. 4 hr | | | | | | 3.3E-10 | 2.6E-10 |
| D FSM DOL ~$1.4 * 2 * (Dt)^{0.5}$ at 410° C. 8 hr | | | | | | | |

| | Example Number | | | | | | |
|---|---|---|---|---|---|---|---|
| | 29 | 30 | 31 | 32 | 33 | 34 | 35 |
| $SiO_2$ in mol % | 62.2 | 60.3 | 60.0 | 60.0 | 59.9 | 60.7 | 60.3 |
| $Al_2O_3$ in mol % | 14.8 | 15.6 | 15.6 | 15.8 | 15.7 | 15.4 | 15.5 |
| $P_2O_5$ in mol % | 5.0 | 5.0 | 5.0 | 5.0 | 5.0 | 4.9 | 5.4 |
| $Na_2O$ in mol % | 15.3 | 15.9 | 16.2 | 16.4 | 16.3 | 15.9 | 15.8 |
| MgO in mol % | 2.5 | 3.0 | 0.0 | 2.6 | 2.9 | 2.9 | 3.0 |
| ZnO in mol % | 0.0 | 0.0 | 3.1 | 0.0 | 0.0 | 0.0 | 0.0 |
| $SnO_2$ in mol % | 0.1 | 0.1 | 0.1 | 0.1 | 0.1 | 0.1 | 0.1 |
| CaO in mol % | 0.0 | 0.1 | 0.0 | 0.0 | 0.1 | 0.1 | 0.1 |
| $(M_2O_3)/R_xO$ in mol % | 0.83 | 0.82 | 0.81 | 0.83 | 0.82 | 0.82 | 0.82 |
| $(P_2O_5 + R_2O)/(M_2O_3)$ in mol % | 1.37 | 1.34 | 1.36 | 1.35 | 1.35 | 1.35 | 1.37 |
| $(P_2O_5 + R_xO)/(M_2O_3)$ in mol % | 1.54 | 1.54 | 1.56 | 1.52 | 1.54 | 1.54 | 1.56 |
| $SiO_2$ in wt % | 53.2 | 51.4 | 50.3 | 51.0 | 51.0 | 51.8 | 51.2 |
| $Al_2O_3$ in wt % | 21.5 | 22.5 | 22.1 | 22.8 | 22.7 | 22.4 | 22.3 |
| $P_2O_5$ in wt % | 10.0 | 10.1 | 9.8 | 10.0 | 10.1 | 10.0 | 10.8 |
| $Na_2O$ in wt % | 13.5 | 14.0 | 14.0 | 14.4 | 14.3 | 14.0 | 13.8 |
| MgO in wt % | 1.5 | 1.7 | 0.0 | 1.5 | 1.7 | 1.7 | 1.7 |
| ZnO in wt % | 0.0 | 0.0 | 3.5 | 0.0 | 0.0 | 0.0 | 0.0 |

TABLE 2-continued

Glass compositions and properties.

| | | | | | | | |
|---|---|---|---|---|---|---|---|
| $SnO_2$ in wt % | 0.2 | 0.2 | 0.2 | 0.2 | 0.2 | 0.2 | 0.2 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm$^3$) | 2.411 | 2.424 | 2.46 | 2.423 | 2.426 | 2.422 | 2.422 |
| Molar Volume (cm$^3$/mol) | 29.12 | 29.07 | 29.15 | 29.17 | 29.08 | 29.06 | 29.20 |
| Strain Pt. (° C.) | 642 | 646 | 618 | 641 | 633 | 630 | 625 |
| Anneal Pt. (° C.) | 696 | 696 | 674 | 693 | 682 | 681 | 676 |
| Softening Pt. (° C.) | 972.7 | 960.3 | 941.8 | 960 | 952.8 | 957.2 | 950.7 |
| Temperature at 200 P Viscosity (° C.) | 1713 | 1664 | 1668 | 1676 | 1670 | 1673 | 1672 |
| Temperature at 35 kP Viscosity (° C.) | 1271 | 1240 | 1238 | 1246 | 1243 | 1250 | 1241 |
| Temperature at 160 kP Viscosity (° C.) | 1185 | 1155 | 1153 | 1162 | 1160 | 1164 | 1157 |
| Liquidus Temperature (° C.) | | | | | | 995 | 975 |
| Liquidus Viscosity (P) | | | | | | 6.97E+06 | 1.21E+07 |
| Zircon Breakdown Temperature (° C.) | | | | | | 1240 | 1265 |
| Zircon Breakdown Viscosity (P) | | | | | | 41251 | 23823 |
| Stress Optical Coefficient ((nm · Mpa$^{-1}$ · mm$^{-1}$) | 3.05 | 2.938 | 3.112 | 3.009 | 2.994 | 3.018 | 3.266?? |
| Approximate Fictive temperature (° C.) | 795 | 794 | 749 | 791 | 779 | 775 | 772 |
| 410° C. 1 hr Compressive Stress (MPa) | | | 921 | 927 | | | |
| 410° C. 1 hr Depth of Layer (mm) | | | 28 | 33 | | | |
| 410° C. 1 hr Vickers Crack Initiation Load (kgf) | | | | | | | |
| 410° C. 2 hr Compressive Stress (MPa) | 868 | 943 | 921 | 946 | 948 | 890 | 834 |
| 410° C. 2 hr Depth of Layer (mm) | 48 | 46 | 41 | 48 | 46 | 44 | 48 |
| 410° C. 2 hr Vickers Crack Initiation Load (kgf) | >20 | >20 | 15-20 | 10-15 | 10-15 | >20 | >20 |
| 410° C. 3 hr Compressive Stress (MPa) | 862 | 941 | 895 | 921 | 936 | 885 | 818 |
| 410° C. 3 hr Depth of Layer (mm) | 55 | 54 | 47 | 55 | 51 | 55 | 52 |
| 410° C. 4 hr Compressive Stress (MPa) | | | 894 | 924 | | 875 | |
| 410° C. 4 hr Depth of Layer (mm) | | | 52 | 61 | | 63 | |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | | | 2.8E-10 | 3.9E-10 | | | |
| D FSM DOL ~1.4 * 2 * (Dt)^0.5 at 410° C. 2 hr | 4.1E-10 | 3.7E-10 | 3.0E-10 | 4.1E-10 | 3.7E-10 | 3.4E-10 | 4.1E-10 |
| D FSM DOL ~1.4 * 2 * (Dt)^0.5 at 410° C. 3 hr | 3.6E-10 | 3.4E-10 | 2.6E-10 | 3.6E-10 | 3.1E-10 | 3.6E-10 | 3.2E-10 |

TABLE 2-continued

Glass compositions and properties.

| | | | | | | | |
|---|---|---|---|---|---|---|---|
| D FSM DOL ~1.4 * 2 * (Dt)^0.5 at 410° C. 4 hr | | 2.4E−10 | 3.3E−10 | | 3.5E−10 | | |
| D FSM DOL ~1.4 * 2 * (Dt)^0.5 at 410° C. 8 hr | | | | | | | |

| | Example Number | | | | | | |
|---|---|---|---|---|---|---|---|
| | 36 | 37 | 38 | 39 | 40 | 41 | 42 |
| $SiO_2$ in mol % | 60.0 | 60.4 | 60.2 | 62.8 | 61.3 | 61.1 | 60.9 |
| $Al_2O_3$ in mol % | 15.6 | 15.6 | 15.5 | 14.4 | 15.1 | 15.2 | 15.3 |
| $P_2O_5$ in mol % | 5.5 | 5.0 | 4.9 | 4.1 | 4.7 | 4.8 | 4.9 |
| $Na_2O$ in mol % | 16.3 | 16.4 | 16.4 | 15.6 | 15.7 | 15.8 | 15.8 |
| MgO in mol % | 2.5 | 2.5 | 2.9 | 3.0 | 3.0 | 3.0 | 3.0 |
| ZnO in mol % | 0.0 | 0.0 | 0.0 | 0.0 | 0.0 | 0.0 | 0.0 |
| $SnO_2$ in mol % | 0.1 | 0.1 | 0.1 | 0.1 | 0.1 | 0.1 | 0.1 |
| CaO in mol % | 0.0 | 0.0 | 0.1 | 0.0 | 0.0 | 0.0 | 0.0 |
| $(M_2O_3)/R_xO$ in mol % | 0.83 | 0.83 | 0.80 | 0.77 | 0.81 | 0.81 | 0.81 |
| $(P_2O_5 + R_2O)/(M_2O_3)$ in mol % | 1.39 | 1.37 | 1.38 | 1.37 | 1.35 | 1.35 | 1.35 |
| $(P_2O_5 + R_xO)/(M_2O_3)$ in mol % | 1.55 | 1.53 | 1.57 | 1.58 | 1.55 | 1.55 | 1.55 |
| $SiO_2$ in wt % | 50.8 | 51.4 | 51.4 | 54.5 | 52.6 | 52.3 | 52.1 |
| $Al_2O_3$ in wt % | 22.4 | 22.5 | 22.4 | 21.1 | 22.0 | 22.1 | 22.2 |
| $P_2O_5$ in wt % | 10.9 | 10.1 | 9.9 | 8.3 | 9.5 | 9.7 | 9.9 |
| $Na_2O$ in wt % | 14.2 | 14.4 | 14.4 | 14.0 | 13.9 | 13.9 | 13.9 |
| MgO in wt % | 1.4 | 1.4 | 1.7 | 1.7 | 1.7 | 1.7 | 1.7 |
| ZnO in wt % | 0.0 | 0.0 | 0.0 | 0.0 | 0.0 | 0.0 | 0.0 |
| $SnO_2$ in wt % | 0.2 | 0.2 | 0.2 | 0.3 | 0.3 | 0.3 | 0.3 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm$^3$) | 2.419 | 2.421 | 2.427 | 2.422 | 2.422 | 2.422 | 2.422 |
| Molar Volume (cm$^3$/mol) | 29.35 | 29.17 | 29.00 | 28.58 | 28.92 | 28.98 | 29.03 |
| Strain Pt. (° C.) | 619 | 624 | 632 | 653 | 635 | 634 | 632 |
| Anneal Pt. (° C.) | 672 | 677 | 680 | 704 | 685 | 684 | 682 |
| Softening Pt. (° C.) | 954.2 | 956.8 | 952.6 | 977.4 | 963.1 | 961.8 | 957.4 |
| Temperature at 200 P Viscosity (° C.) | 1675 | 1680 | 1659 | 1709 | 1693 | 1690 | 1689 |
| Temperature at 35 kP Viscosity (° C.) | 1246 | 1255 | 1229 | 1263 | 1257 | 1256 | 1254 |
| Temperature at 160 kP Viscosity (° C.) | 1161 | 1169 | 1145 | 1176 | 1170 | 1170 | 1168 |
| Liquidus Temperature (° C.) | 985 | 990 | | | | | |
| Liquidus Viscosity (P) | 1.00E+07 | 9.03E+06 | | | | | |
| Zircon Breakdown Temperature (° C.) | 1260 | 1240 | | | | | |
| Zircon Breakdown Viscosity (P) | 27805 | 45159 | | | | | |
| Stress Optical Coefficient ((nm · Mpa$^{-1}$ · mm$^{-1}$) | 2.986 | 3.005 | 3.008 | | | | |
| Approximate Fictive temperature (° C.) | 767 | 768 | 778 | 793 | 773 | 772 | 770 |
| 410° C. 1 hr Compressive Stress (MPa) | | 925 | | 979 | 973 | 967 | 967 |
| 410° C. 1 hr Depth of Layer (mm) | | 34 | | 30 | 30 | 29 | 29 |
| 410° C. 1 hr Vickers Crack Initiation Load (kgf) | | | | | | | |
| 410° C. 2 hr Compressive Stress (MPa) | 903 | 928 | 934 | 980 | 978 | 975 | 948 |
| 410° C. 2 hr Depth of Layer (mm) | 46 | 46 | 46 | 42 | 41 | 41 | 41 |
| 410° C. 2 hr Vickers Crack Initiation Load (kgf) | 15-20 | 10-15 | 15-20 | 15-20 | 15-20 | 15-20 | 10-15 |
| 410° C. 3 hr Compressive Stress (MPa) | | 923 | 943 | 930 | 934 | 927 | 925 |

TABLE 2-continued

Glass compositions and properties.

| | | | | | | |
|---|---|---|---|---|---|---|
| 410° C. 3 hr Depth of Layer (mm) | | 54 | 53 | 53 | 51 | 51 | 51 |
| 410° C. 4 hr Compressive Stress (MPa) | | 920 | | 949 | 948 | 943 | 941 |
| 410° C. 4 hr Depth of Layer (mm) | | 59 | | 59 | 57 | 57 | 57 |
| 410° C. 4 hr Vickers Crack Initiation Load (kgf) | | | | 15-20 | 15-20 | 15-20 | 10-15 |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | | 4.1E−10 | | 3.2E−10 | 3.2E−10 | 3.0E−10 | 3.0E−10 |
| D FSM DOL ~1.4 * 2 * (Dt)^0.5 at 410° C. 2 hr | 3.7E−10 | 3.7E−10 | 3.7E−10 | 3.1E−10 | 3.0E−10 | 3.0E−10 | 3.0E−10 |
| D FSM DOL ~1.4 * 2 * (Dt)^0.5 at 410° C. 3 hr | | 3.4E−10 | 3.3E−10 | 3.3E−10 | 3.1E−10 | 3.1E−10 | 3.1E−10 |
| D FSM DOL ~1.4 * 2 * (Dt)^0.5 at 410° C. 4 hr | | 3.1E−10 | | 3.1E−10 | 2.9E−10 | 2.9E−10 | 2.9E−10 |

| | Example Number | | | | | | |
|---|---|---|---|---|---|---|---|
| | 43 | 44 | 45 | 46 | 47 | 48 | 49 |
| $SiO_2$ in mol % | 60.4 | 60.2 | 60.1 | 60.0 | 59.9 | 60.1 | 59.3 |
| $Al_2O_3$ in mol % | 15.5 | 15.6 | 15.6 | 15.6 | 15.7 | 15.6 | 15.3 |
| $P_2O_5$ in mol % | 5.0 | 5.0 | 5.1 | 5.1 | 5.1 | 5.2 | 5.7 |
| $Na_2O$ in mol % | 15.9 | 16.0 | 16.0 | 16.0 | 16.1 | 16.1 | 16.5 |
| MgO in mol % | 3.0 | 3.0 | 3.0 | 3.0 | 3.0 | 2.9 | 2.9 |
| ZnO in mol % | 0.0 | 0.0 | 0.0 | 0.0 | 0.0 | 0.0 | 0.0 |
| $SnO_2$ in mol % | 0.1 | 0.1 | 0.1 | 0.1 | 0.1 | 0.1 | 0.1 |
| CaO in mol % | 0.0 | 0.0 | 0.0 | 0.0 | 0.0 | 0.0 | 0.0 |
| $(M_2O_3)/R_xO$ in mol % | 0.82 | 0.82 | 0.82 | 0.82 | 0.82 | 0.82 | 0.79 |
| $(P_2O_5 + R_2O)/(M_2O_3)$ in mol % | 1.35 | 1.35 | 1.35 | 1.35 | 1.35 | 1.37 | 1.46 |
| $(P_2O_5 + R_xO)/(M_2O_3)$ in mol % | 1.54 | 1.55 | 1.55 | 1.54 | 1.54 | 1.55 | 1.65 |
| $SiO_2$ in wt % | 51.5 | 51.3 | 51.2 | 51.1 | 51.0 | 51.2 | 50.2 |
| $Al_2O_3$ in wt % | 22.4 | 22.5 | 22.6 | 22.6 | 22.7 | 22.5 | 22.0 |
| $P_2O_5$ in wt % | 10.1 | 10.2 | 10.2 | 10.2 | 10.3 | 10.4 | 11.4 |
| $Na_2O$ in wt % | 14.0 | 14.0 | 14.0 | 14.1 | 14.1 | 14.1 | 14.5 |
| MgO in wt % | 1.7 | 1.7 | 1.7 | 1.7 | 1.7 | 1.6 | 1.7 |
| ZnO in wt % | 0.0 | 0.0 | 0.0 | 0.0 | 0.0 | 0.0 | 0.0 |
| $SnO_2$ in wt % | 0.3 | 0.3 | 0.3 | 0.3 | 0.3 | 0.3 | 0.3 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm³) | 2.423 | 2.424 | 2.425 | 2.424 | 2.424 | 2.423 | 2.424 |
| Molar Volume (cm³/mol) | 29.09 | 29.10 | 29.10 | 29.11 | 29.14 | 29.14 | 29.27 |
| Strain Pt. (° C.) | 628 | 629 | 633 | 630 | 629 | 615 | 603 |
| Anneal Pt. (° C.) | 680 | 680 | 680 | 681 | 680 | 664 | 651 |
| Softening Pt. (° C.) | 954 | 952.8 | 956.5 | 953.3 | 953 | 944.5 | 929.6 |
| Temperature at 200 P Viscosity (° C.) | 1684 | 1678 | 1676 | 1681 | 1678 | 1681 | 1665 |
| Temperature at 35 kP Viscosity (° C.) | 1257 | 1245 | 1248 | 1249 | 1251 | 1242 | 1225 |
| Temperature at 160 kP Viscosity (° C.) | 1171 | 1160 | | 1163 | 1166 | 1158 | 1141 |
| Liquidus Temperature (° C.) | | | | | | | |
| Liquidus Viscosity (P) | | | | | | | |
| Zircon Breakdown Temperature (° C.) | | | | | | | |
| Zircon Breakdown Viscosity (P) | | | | | | | |
| Stress Optical Coefficient ((nm · Mpa⁻¹ · mm⁻¹) | | | | | | | |

TABLE 2-continued

Glass compositions and properties.

| | | | | | | | |
|---|---|---|---|---|---|---|---|
| Approximate Fictive temperature (° C.) | 770 | 769 | 765 | 770 | 769 | 752 | 737 |
| 410° C. 1 hr Compressive Stress (MPa) | 975 | 964 | 992 | | | | |
| 410° C. 1 hr Depth of Layer (mm) | 29 | 29 | 27 | | | | |
| 410° C. 1 hr Vickers Crack Initiation Load (kgf) | | | | | | | |
| 410° C. 2 hr Compressive Stress (MPa) | 960 | 955 | 990 | 945 | 948 | 939 | 905 |
| 410° C. 2 hr Depth of Layer (mm) | 41 | 40 | 38 | 38 | 38 | 38 | 39 |
| 410° C. 2 hr Vickers Crack Initiation Load (kgf) | 25-30 | 25-30 | >20 | >20 | >20 | 15-20 | 10-15 |
| 410° C. 3 hr Compressive Stress (MPa) | 930 | 933 | 970 | | | | |
| 410° C. 3 hr Depth of Layer (mm) | 50 | 50 | 53 | | | | |
| 410° C. 4 hr Compressive Stress (MPa) | 948 | 940 | | | | | |
| 410° C. 4 hr Depth of Layer (mm) | 56 | 56 | | | | | |
| 410° C. 4 hr Vickers Crack Initiation Load (kgf) | 25-30 | 20-25 | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | 3.0E−10 | 3.0E−10 | 2.6E−10 | | | | |
| D FSM DOL ~1.4 * 2 * (Dt)^0.5 at 410° C. 2 hr | 3.0E−10 | 2.8E−10 | 2.6E−10 | 2.6E−10 | 2.6E−10 | 2.6E−10 | 2.7E−10 |
| D FSM DOL ~1.4 * 2 * (Dt)^0.5 at 410° C. 3 hr | 3.0E−10 | 3.0E−10 | 3.3E−10 | | | | |
| D FSM DOL ~1.4 * 2 * (Dt)^0.5 at 410° C. 4 hr | 2.8E−10 | 2.8E−10 | | | | | |
| D FSM DOL ~1.4 * 2 * (Dt)^0.5 at 410° C. 8 hr | | | | | | | |

| | Example Number | | | | | | |
|---|---|---|---|---|---|---|---|
| | 50 | 51 | 52 | 53 | 54 | 55 | 56 |
| SiO$_2$ in mol % | 61.8 | 56.9 | 60.1 | 60.2 | 60.1 | 61.1 | 61.0 |
| Al$_2$O$_3$ in mol % | 13.5 | 13.4 | 15.0 | 15.4 | 15.2 | 14.6 | 14.9 |
| P$_2$O$_5$ in mol % | 5.0 | 10.0 | 6.0 | 5.4 | 5.7 | 5.4 | 5.5 |
| Na$_2$O in mol % | 19.5 | 19.6 | 15.7 | 15.9 | 15.9 | 15.2 | 15.5 |
| MgO in mol % | 0.0 | 0.0 | 3.0 | 3.0 | 3.0 | 3.5 | 3.1 |
| ZnO in mol % | 0.0 | 0.0 | 0.0 | 0.0 | 0.0 | 0.0 | 0.0 |
| SnO$_2$ in mol % | 0.1 | 0.1 | 0.1 | 0.1 | 0.1 | 0.1 | 0.1 |
| CaO in mol % | 0.0 | 0.0 | 0.1 | 0.1 | 0.1 | 0.1 | 0.1 |
| (M$_2$O$_3$)/R$_x$O in mol % | 0.69 | 0.68 | 0.80 | 0.81 | 0.80 | 0.78 | 0.80 |
| (P$_2$O$_5$ + R$_2$O)/(M$_2$O$_3$) in mol % | 1.82 | 2.21 | 1.44 | 1.38 | 1.42 | 1.41 | 1.41 |
| (P$_2$O$_5$ + R$_x$O)/(M$_2$O$_3$) in mol % | 1.82 | 2.21 | 1.64 | 1.58 | 1.62 | 1.65 | 1.62 |
| SiO$_2$ in wt % | 52.9 | 46.0 | 50.9 | 51.2 | 50.9 | 52.2 | 51.9 |
| Al$_2$O$_3$ in wt % | 19.5 | 18.4 | 21.6 | 22.2 | 21.9 | 21.2 | 21.5 |
| P$_2$O$_5$ in wt % | 10.1 | 19.1 | 11.9 | 10.7 | 11.3 | 10.9 | 11.0 |
| Na$_2$O in wt % | 17.2 | 16.3 | 13.7 | 13.9 | 13.9 | 13.4 | 13.6 |
| MgO in wt % | 0.0 | 0.0 | 1.7 | 1.7 | 1.7 | 2.0 | 1.7 |

TABLE 2-continued

| Glass compositions and properties. | | | | | | | |
|---|---|---|---|---|---|---|---|
| ZnO in wt % | 0.0 | 0.0 | 0.0 | 0.0 | 0.0 | 0.0 | 0.0 |
| SnO$_2$ in wt % | 0.2 | 0.2 | 0.2 | 0.2 | 0.2 | 0.2 | 0.2 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm$^3$) | 2.426 | 2.408 | 2.413 | 2.419 | 2.416 | 2.415 | 2.415 |
| Molar Volume (cm$^3$/mol) | 28.96 | 30.85 | 29.45 | 29.23 | 29.34 | 29.10 | 29.21 |
| Strain Pt. (° C.) | 574 | 522 | 626 | 637 | 630 | 649 | 639 |
| Anneal Pt. (° C.) | 625 | 568 | 679 | 688 | 681 | 701 | 689 |
| Softening Pt. (° C.) | 872.9 | 825.1 | 947.3 | 955.1 | 949.9 | 969.4 | 961 |
| Temperature at 200 P Viscosity (° C.) | 1651 | 1587 | 1686 | 1679 | 1684 | 1678 | 1698 |
| Temperature at 35 kP Viscosity (° C.) | 1162 | 1126 | 1248 | 1253 | 1248 | 1248 | 1256 |
| Temperature at 160 kP Viscosity (° C.) | 1075 | 1040 | 1162 | 1169 | 1163 | 1163 | 1172 |
| Liquidus Temperature (° C.) | 990 | 915 | 1000 | | | | |
| Liquidus Viscosity (P) | 9.59E+05 | 2.61E+06 | 6.34E+06 | | | | |
| Zircon Breakdown Temperature (° C.) | 1235 | >1245 | 1275 | >1270 | | >1300 | |
| Zircon Breakdown Viscosity (P) | 11856 | <6194 | 22653 | <26470 | | <15377 | |
| Stress Optical Coefficient ((nm · Mpa$^{-1}$ · mm$^{-1}$)) | | | 3.069 | 3.107 | 2.986 | 3.089 | 3.064 |
| Approximate Fictive temperature (° C.) | 710 | 650 | 769 | 776 | 769 | 790 | 777 |
| 410° C. 1 hr Compressive Stress (MPa) | | | 850 | 891 | 870 | 852 | 867 |
| 410° C. 1 hr Depth of Layer (mm) | | | 47 | 37 | 38 | 37 | 38 |
| 410° C. 1 hr Vickers Crack Initiation Load (kgf) | | | | | | | |
| 410° C. 2 hr Compressive Stress (MPa) | 501 | 496 | 857 | 873 | 848 | 841 | 829 |
| 410° C. 2 hr Depth of Layer (mm) | 90 | 88 | 52 | 49 | 52 | 50 | 50 |
| 410° C. 2 hr Vickers Crack Initiation Load (kgf) | >20 | >20 | 20-30 | >20 | >20 | >20 | 10-15 |
| 410° C. 3 hr Compressive Stress (MPa) | | | 842 | 863 | 834 | 836 | 832 |
| 410° C. 3 hr Depth of Layer (mm) | | | 59 | 64 | 63 | 63 | 64 |
| 410° C. 4 hr Compressive Stress (MPa) | | | 828 | 859 | 842 | 826 | 835 |
| 410° C. 4 hr Depth of Layer (mm) | | | 70 | 72 | 70 | 73 | 72 |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | | | 7.8E−10 | 4.9E−10 | 5.1E−10 | 4.9E−10 | 5.1E−10 |
| D FSM DOL ~1.4 * 2 * (Dt)^0.5 at 410° C. 2 hr | 1.4E−09 | 1.4E−09 | 4.8E−10 | 4.3E−10 | 4.8E−10 | 4.4E−10 | 4.4E−10 |
| D FSM DOL ~1.4 * 2 * (Dt)^0.5 at 410° C. 3 hr | | | 4.1E−10 | 4.8E−10 | 4.7E−10 | 4.7E−10 | 4.8E−10 |

TABLE 2-continued

Glass compositions and properties.

| | | | | | | |
|---|---|---|---|---|---|---|
| D FSM DOL $\sim 1.4 * 2 * (Dt)^{0.5}$ at 410° C. 4 hr | 4.3E−10 | 4.6E−10 | 4.3E−10 | 4.7E−10 | 4.6E−10 | |
| D FSM DOL $\sim 1.4 * 2 * (Dt)^{0.5}$ at 410° C. 8 hr | | | | | | |

| | Example Number | | | | | | |
|---|---|---|---|---|---|---|---|
| | 57 | 58 | 59 | 60 | 61 | 62 | 63 |
| $SiO_2$ in mol % | 60.2 | 60.2 | 60.3 | 60.4 | 60.3 | 60.4 | 60.2 |
| $Al_2O_3$ in mol % | 15.0 | 15.3 | 15.1 | 15.5 | 15.3 | 15.4 | 15.1 |
| $P_2O_5$ in mol % | 5.5 | 6.0 | 5.9 | 5.9 | 5.9 | 5.9 | 6.0 |
| $Na_2O$ in mol % | 15.6 | 15.4 | 15.1 | 15.4 | 15.3 | 15.4 | 15.2 |
| MgO in mol % | 3.5 | 3.0 | 3.6 | 2.5 | 3.1 | 2.8 | 3.4 |
| ZnO in mol % | 0.0 | 0.0 | 0.0 | 0.0 | 0.0 | 0.0 | 0.0 |
| $SnO_2$ in mol % | 0.1 | 0.1 | 0.1 | 0.1 | 0.1 | 0.1 | 0.1 |
| CaO in mol % | 0.1 | 0.0 | 0.1 | 0.0 | 0.1 | 0.1 | 0.1 |
| $(M_2O_3)/R_xO$ in mol % | 0.78 | 0.83 | 0.81 | 0.86 | 0.83 | 0.85 | 0.81 |
| $(P_2O_5 + R_2O)/(M_2O_3)$ in mol % | 1.41 | 1.40 | 1.39 | 1.38 | 1.39 | 1.38 | 1.40 |
| $(P_2O_5 + R_xO)/(M_2O_3)$ in mol % | 1.65 | 1.59 | 1.63 | 1.54 | 1.59 | 1.56 | 1.63 |
| $SiO_2$ in wt % | 51.3 | 50.9 | 51.1 | 50.9 | 51.0 | 50.9 | 50.9 |
| $Al_2O_3$ in wt % | 21.7 | 21.9 | 21.7 | 22.2 | 21.9 | 22.1 | 21.7 |
| $P_2O_5$ in wt % | 11.0 | 11.9 | 11.7 | 11.8 | 11.8 | 11.8 | 11.9 |
| $Na_2O$ in wt % | 13.8 | 13.4 | 13.2 | 13.4 | 13.3 | 13.4 | 13.3 |
| MgO in wt % | 2.0 | 1.7 | 2.0 | 1.4 | 1.7 | 1.6 | 1.9 |
| ZnO in wt % | 0.0 | 0.0 | 0.0 | 0.0 | 0.0 | 0.0 | 0.0 |
| $SnO_2$ in wt % | 0.2 | 0.2 | 0.2 | 0.2 | 0.2 | 0.2 | 0.2 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm³) | 2.42 | 2.41 | 2.42 | 2.41 | 2.42 | 2.41 | 2.41 |
| Molar Volume (cm³/mol) | 29.13 | 29.49 | 29.32 | 29.57 | 29.43 | 29.50 | 29.41 |
| Strain Pt. (° C.) | 647 | 627 | 634 | 624 | 627 | 625 | 627 |
| Anneal Pt. (° C.) | 697 | 682 | 684 | 680 | 680 | 679 | 679 |
| Softening Pt. (° C.) | 962.8 | 952 | 959.1 | 954.6 | 951 | 951.6 | 954.9 |
| Temperature at 200 P Viscosity (° C.) | 1677 | 1728 | 1679 | 1693 | 1685 | 1687 | 1673 |
| Temperature at 35 kP Viscosity (° C.) | 1247 | 1257 | 1246 | 1259 | 1253 | 1257 | 1235 |
| Temperature at 160 kP Viscosity (° C.) | 1163 | 1173 | 1160 | 1173 | 1168 | 1171 | 1151 |
| Liquidus Temperature (° C.) | | | 1090 | | | | |
| Liquidus Viscosity (P) | | | 6.79E+05 | | | | |
| Zircon Breakdown Temperature (° C.) | | | 1265 | | | | >1250 |
| Zircon Breakdown Viscosity (P) | | | 25644 | | | | <27583 |
| Stress Optical Coefficient ((nm · Mpa⁻¹ · mm⁻¹)) | 3.046 | | 3.092 | | 3.085 | | 3.037 |
| Approximate Fictive temperature (° C.) | 784 | 776 | 778 | 779 | 779 | 773 | 787 |
| 410° C. 1 hr Compressive Stress (MPa) | 883 | | | | | | |
| 410° C. 1 hr Depth of Layer (mm) | 37 | | | | | | |
| 410° C. 1 hr Vickers Crack Initiation Load (kgf) | | | | | | | |
| 410° C. 2 hr Compressive Stress (MPa) | 870 | 879 | 910 | 878 | 869 | 885 | 885 |
| 410° C. 2 hr Depth of Layer (mm) | 52 | 46 | 45 | 47 | 50 | 46 | 45 |
| 410° C. 2 hr Vickers Crack Initiation Load (kgf) | >20 | 30-40 | 30-40 | 30-40 | 20-30 | 20-30 | 30-40 |
| 410° C. 3 hr Compressive Stress (MPa) | 861 | | | | | | |

TABLE 2-continued

Glass compositions and properties.

| | | | | | | | |
|---|---|---|---|---|---|---|---|
| 410° C. 3 hr Depth of Layer (mm) | 63 | | | | | | |
| 410° C. 4 hr Compressive Stress (MPa) | 853 | | | | | | |
| 410° C. 4 hr Depth of Layer (mm) | 71 | | | | | | |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | 4.9E−10 | | | | | | |
| D FSM DOL ~1.4 * 2 * (Dt)^0.5 at 410° C. 2 hr | 4.8E−10 | 3.8E−10 | 3.6E−10 | 3.9E−10 | 4.4E−10 | 3.7E−10 | 3.6E−10 |
| D FSM DOL ~1.4 * 2 * (Dt)^0.5 at 410° C. 3 hr | 4.7E−10 | | | | | | |
| D FSM DOL ~1.4 * 2 * (Dt)^0.5 at 410° C. 4 hr | 4.5E−10 | | | | | | |
| D FSM DOL ~1.4 * 2 * (Dt)^0.5 at 410° C. 8 hr | | | | | | | |

| | Example Number | | | | | | |
|---|---|---|---|---|---|---|---|
| | 64 | 65 | 66 | 67 | 68 | 69 | 70 |
| $SiO_2$ in mol % | 59.9 | 60.0 | 60.1 | 60.1 | 60.2 | 60.2 | 57.1 |
| $Al_2O_3$ in mol % | 15.5 | 15.3 | 15.5 | 15.2 | 15.4 | 15.0 | 17.5 |
| $P_2O_5$ in mol % | 5.4 | 5.3 | 3.6 | 5.6 | 5.8 | 5.8 | 6.8 |
| $Na_2O$ in mol % | 15.9 | 15.6 | 15.5 | 15.4 | 15.4 | 15.2 | 18.4 |
| MgO in mol % | 3.1 | 3.6 | 3.1 | 3.6 | 3.0 | 3.6 | 0.1 |
| ZnO in mol % | 0.0 | 0.0 | 0.0 | 0.0 | 0.0 | 0.0 | 0.0 |
| $SnO_2$ in mol % | 0.1 | 0.1 | 0.1 | 0.1 | 0.1 | 0.1 | 0.1 |
| CaO in mol % | 0.0 | 0.0 | 0.0 | 0.0 | 0.0 | 0.0 | 0.0 |
| $(M_2O_3)/R_xO$ in mol % | 0.81 | 0.80 | 0.83 | 0.80 | 0.83 | 0.80 | 0.95 |
| $(P_2O_5 + R_2O)/(M_2O_3)$ in mol % | 1.38 | 1.37 | 1.24 | 1.38 | 1.39 | 1.40 | 1.44 |
| $(P_2O_5 + R_xO)/(M_2O_3)$ in mol % | 1.58 | 1.60 | 1.44 | 1.61 | 1.58 | 1.63 | 1.45 |
| $SiO_2$ in wt % | 50.9 | 51.2 | 53.1 | 51.1 | 50.9 | 51.2 | 46.8 |
| $Al_2O_3$ in wt % | 22.3 | 22.1 | 23.1 | 21.9 | 22.0 | 21.7 | 24.2 |
| $P_2O_5$ in wt % | 10.8 | 10.7 | 7.6 | 11.2 | 11.7 | 11.6 | 13.2 |
| $Na_2O$ in wt % | 14.0 | 13.7 | 14.1 | 13.5 | 13.5 | 13.3 | 15.5 |
| MgO in wt % | 1.8 | 2.1 | 1.8 | 2.0 | 1.7 | 2.0 | 0.0 |
| ZnO in wt % | 0.0 | 0.0 | 0.0 | 0.0 | 0.0 | 0.0 | 0.0 |
| $SnO_2$ in wt % | 0.2 | 0.2 | 0.2 | 0.2 | 0.2 | 0.2 | 0.2 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm³) | 2.419 | 2.421 | 2.417 | 2.419 | 2.415 | 2.416 | 2.41 |
| Molar Volume (cm³/mol) | 29.23 | 29.12 | 28.17 | 29.23 | 29.43 | 29.29 | 30.41 |
| Strain Pt. (° C.) | 637 | 640 | 631 | 638 | 629 | 634 | 619 |
| Anneal Pt. (° C.) | 689 | 689 | 683 | 687 | 681 | 684 | 679 |
| Softening Pt. (° C.) | 958 | 962.4 | 956.3 | 962.4 | 954.1 | 959.7 | 953.7 |
| Temperature at 200 P Viscosity (° C.) | 1680 | 1670 | 1675 | 1665 | 1681 | 1676 | 1680 |
| Temperature at 35 kP Viscosity (° C.) | 1253 | 1249 | 1245 | 1240 | 1253 | 1247 | 1246 |
| Temperature at 160 kP Viscosity (° C.) | 1168 | 1165 | 1159 | 1155 | 1167 | 1162 | 1165 |
| Liquidus Temperature (° C.) | | | | | | | 855 |
| Liquidus Viscosity (P) | | | | | | | 1.99E+09 |
| Zircon Breakdown Temperature (° C.) | | | | | | | 1225 |
| Zircon Breakdown Viscosity (P) | | | | | | | 50768 |

TABLE 2-continued

Glass compositions and properties.

| | | | | | | | |
|---|---|---|---|---|---|---|---|
| Stress Optical Coefficient ((nm · Mpa$^{-1}$ · mm$^{-1}$)) | | | | | | | 2.997 |
| Approximate Fictive temperature (° C.) | 778 | 776 | 773 | 774 | 771 | 772 | 776 |
| 410° C. 1 hr Compressive Stress (MPa) | | | | | | | 808 |
| 410° C. 1 hr Depth of Layer (mm) | | | | | | | 43 |
| 410° C. 1 hr Vickers Crack Initiation Load (kgf) | | | | | | | >50 |
| 410° C. 2 hr Compressive Stress (MPa) | 929 | 925 | 914 | 914 | 898 | 900 | |
| 410° C. 2 hr Depth of Layer (mm) | 48 | 47 | 49 | 48 | 50 | 48 | |
| 410° C. 2 hr Vickers Crack Initiation Load (kgf) | >20 | >20 | >20 | >20 | >20 | >20 | |
| 410° C. 3 hr Compressive Stress (MPa) | | | | | | | |
| 410° C. 3 hr Depth of Layer (mm) | | | | | | | |
| 410° C. 4 hr Compressive Stress (MPa) | | | | | | | |
| 410° C. 4 hr Depth of Layer (mm) | | | | | | | |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)$^{0.5}$ at 410° C. 1 hr | | | | | | | 6.6E−10 |
| D FSM DOL ~1.4 * 2 * (Dt)$^{0.5}$ at 410° C. 2 hr | 4.1E−10 | 3.9E−10 | 4.3E−10 | 4.1E−10 | 4.4E−10 | 4.1E−10 | |
| D FSM DOL ~1.4 * 2 * (Dt)$^{0.5}$ at 410° C. 3 hr | | | | | | | |
| D FSM DOL ~1.4 * 2 * (Dt)$^{0.5}$ at 410° C. 4 hr | | | | | | | |
| D FSM DOL ~1.4 * 2 * (Dt)$^{0.5}$ at 410° C. 8 hr | | | | | | | |

| | Example Number | | | | | | |
|---|---|---|---|---|---|---|---|
| | 71 | 72 | 73 | 74 | 75 | 76 | 77 |
| $SiO_2$ in mol % | 56.4 | 55.5 | 56.2 | 56.3 | 57.4 | 57.3 | 56.4 |
| $Al_2O_3$ in mol % | 17.4 | 17.4 | 16.5 | 14.5 | 16.6 | 14.5 | 16.5 |
| $P_2O_5$ in mol % | 8.0 | 8.9 | 8.0 | 7.9 | 7.0 | 6.9 | 7.9 |
| $Na_2O$ in mol % | 18.1 | 18.0 | 18.1 | 18.0 | 17.8 | 18.1 | 19.0 |
| MgO in mol % | 0.1 | 0.1 | 1.0 | 3.1 | 1.0 | 3.0 | 0.0 |
| ZnO in mol % | 0.0 | 0.0 | 0.0 | 0.0 | 0.0 | 0.0 | 0.0 |
| $SnO_2$ in mol % | 0.1 | 0.1 | 0.1 | 0.1 | 0.1 | 0.1 | 0.1 |
| CaO in mol % | 0.0 | 0.0 | 0.0 | 0.0 | 0.0 | 0.0 | 0.0 |
| $(M_2O_3)/R_xO$ in mol % | 0.96 | 0.97 | 0.86 | 0.69 | 0.88 | 0.69 | 0.87 |
| $(P_2O_5 + R_2O)/(M_2O_3)$ in mol % | 1.50 | 1.54 | 1.59 | 1.79 | 1.50 | 1.72 | 1.62 |
| $(P_2O_5 + R_xO)/(M_2O_3)$ in mol % | 1.50 | 1.55 | 1.65 | 2.00 | 1.56 | 1.93 | 1.62 |
| $SiO_2$ in wt % | 45.6 | 44.4 | 45.8 | 46.7 | 47.3 | 48.0 | 45.9 |
| $Al_2O_3$ in wt % | 23.9 | 23.7 | 22.8 | 20.4 | 23.2 | 20.6 | 22.8 |
| $P_2O_5$ in wt % | 15.2 | 16.8 | 15.4 | 15.5 | 13.6 | 13.8 | 15.1 |
| $Na_2O$ in wt % | 15.1 | 14.9 | 15.2 | 15.4 | 15.2 | 15.6 | 16.0 |
| MgO in wt % | 0.0 | 0.0 | 0.6 | 1.7 | 0.5 | 1.7 | 0.0 |
| ZnO in wt % | 0.0 | 0.0 | 0.0 | 0.0 | 0.0 | 0.0 | 0.0 |

TABLE 2-continued

| Glass compositions and properties. | | | | | | | |
|---|---|---|---|---|---|---|---|
| $SnO_2$ in wt % | 0.2 | 0.2 | 0.2 | 0.2 | 0.2 | 0.2 | 0.2 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm$^3$) | 2.41 | 2.41 | 2.42 | 2.43 | 2.42 | 2.43 | 2.42 |
| Molar Volume (cm$^3$/mol) | 30.82 | 31.19 | 30.54 | 29.86 | 30.16 | 29.49 | 30.58 |
| Strain Pt. (° C.) | 603 | 591 | 586 | 571 | 601 | 588 | 586 |
| Anneal Pt. (° C.) | 661 | 648 | 642 | 619 | 658 | 634 | 642 |
| Softening Pt. (° C.) | 932.5 | 916.5 | 909.5 | 877.4 | 928.3 | 900.7 | 906.5 |
| Temperature at 200 P Viscosity (° C.) | 1653 | 1660 | 1641 | 1603 | 1660 | 1616 | 1644 |
| Temperature at 35 kP Viscosity (° C.) | 1227 | 1224 | 1214 | 1171 | 1233 | 1183 | 1212 |
| Temperature at 160 kP Viscosity (° C.) | 1142 | 1138 | 1128 | 1086 | 1148 | 1098 | 1126 |
| Liquidus Temperature (° C.) | 800 | | | | | | |
| Liquidus Viscosity (P) | 2.74E+09 | | | | | | |
| Zircon Breakdown Temperature (° C.) | 1265 | | | | | | |
| Zircon Breakdown Viscosity (P) | 18914 | | | | | | |
| Stress Optical Coefficient ((nm · Mpa$^{-1}$ · mm$^{-1}$)) | 3.038 | | 3.005 | 2.998 | 2.992 | 2.977 | |
| Approximate Fictive temperature (° C.) | 756 | 742 | 735 | 703 | 752 | 717 | 734 |
| 410° C. 1 hr Compressive Stress (MPa) | 888 | | | 734 | 816 | 809 | |
| 410° C. 1 hr Depth of Layer (mm) | 43 | | | 44 | 49 | 45 | |
| 410° C. 1 hr Vickers Crack Initiation Load (kgf) | 40-50 | | | | | | |
| 410° C. 2 hr Compressive Stress (MPa) | | 731 | 706 | 706 | 804 | 775 | 711 |
| 410° C. 2 hr Depth of Layer (mm) | | 62 | 62 | 60 | 58 | 59 | 68 |
| 410° C. 2 hr Vickers Crack Initiation Load (kgf) | | >40 | >40 | >20 | 30-40 | >20 | >20 |
| 410° C. 3 hr Compressive Stress (MPa) | | | | | | | |
| 410° C. 3 hr Depth of Layer (mm) | | | | | | | |
| 410° C. 4 hr Compressive Stress (MPa) | | | | | | | |
| 410° C. 4 hr Depth of Layer (mm) | | | | | | | |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | 6.6E-10 | | | 6.9E-10 | 8.5E-10 | 7.2E-10 | |

TABLE 2-continued

Glass compositions and properties.

| | | | | | | |
|---|---|---|---|---|---|---|
| D FSM DOL ~1.4 * 2 * (Dt)^0.5 at 410° C. 2 hr | 6.9E−10 | 6.8E−10 | 6.4E−10 | 5.9E−10 | 6.2E−10 | 8.3E−10 |
| ~D FSM DOL 1.4 * 2 * (Dt)^0.5 at 410° C. 3 hr | | | | | | |
| ~D FSM DOL 1.4 * 2 * (Dt)^0.5 at 410° C. 4 hr | | | | | | |
| D FSM DOL ~1.4 * 2 * (Dt)^0.5 at 410° C. 8 hr | | | | | | |

| | Example Number | | | | | | |
|---|---|---|---|---|---|---|---|
| | 78 | 79 | 80 | 81 | 82 | 83 | 84 |
| $SiO_2$ in mol % | 56.3 | 57.2 | 57.6 | 50.4 | 56.4 | 55.9 | 55.4 |
| $Al_2O_3$ in mol % | 15.5 | 16.5 | 15.5 | 19.8 | 18.1 | 18.1 | 18.1 |
| $P_2O_5$ in mol % | 7.9 | 6.9 | 6.8 | 9.8 | 7.2 | 7.7 | 7.7 |
| $Na_2O$ in mol % | 20.0 | 19.1 | 20.0 | 19.9 | 18.2 | 18.2 | 18.1 |
| MgO in mol % | 0.0 | 0.0 | 0.0 | 0.0 | 0.0 | 0.0 | 0.6 |
| ZnO in mol % | 0.0 | 0.0 | 0.0 | 0.0 | 0.0 | 0.0 | 0.0 |
| $SnO_2$ in mol % | 0.1 | 0.1 | 0.1 | 0.1 | 0.1 | 0.1 | 0.1 |
| CaO in mol % | 0.0 | 0.0 | 0.0 | 0.0 | 0.0 | 0.0 | 0.0 |
| $(M_2O_3)/R_xO$ in mol % | 0.78 | 0.86 | 0.78 | 0.99 | 0.99 | 0.99 | 0.96 |
| $(P_2O_5 + R_2O)/(M_2O_3)$ in mol % | 1.80 | 1.58 | 1.73 | 1.50 | 1.41 | 1.43 | 1.43 |
| $(P_2O_5 + R_xO)/(M_2O_3)$ in mol % | 1.80 | 1.58 | 1.73 | 1.50 | 1.41 | 1.43 | 1.46 |
| $SiO_2$ in wt % | 46.1 | 47.0 | 47.7 | 39.4 | 45.8 | 45.2 | 44.9 |
| $Al_2O_3$ in wt % | 21.5 | 23.0 | 21.7 | 26.3 | 24.9 | 24.8 | 24.8 |
| $P_2O_5$ in wt % | 15.3 | 13.5 | 13.3 | 18.1 | 13.9 | 14.7 | 14.7 |
| $Na_2O$ in wt % | 16.9 | 16.2 | 17.0 | 16.0 | 15.2 | 15.1 | 15.1 |
| MgO in wt % | 0.0 | 0.0 | 0.0 | 0.0 | 0.0 | 0.0 | 0.3 |
| ZnO in wt % | 0.0 | 0.0 | 0.0 | 0.0 | 0.0 | 0.0 | 0.0 |
| $SnO_2$ in wt % | 0.2 | 0.2 | 0.2 | 0.2 | 0.2 | 0.2 | 0.2 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm$^3$) | 2.42 | 2.42 | 2.43 | 2.42 | 2.41 | 2.41 | 2.42 |
| Molar Volume (cm$^3$/mol) | 30.36 | 30.22 | 29.94 | 31.72 | 30.65 | 30.81 | 30.74 |
| Strain Pt. (° C.) | 572 | 601 | 582 | 588 | 617 | 610 | 607 |
| Anneal Pt. (° C.) | 624 | 658 | 634 | 644 | 676 | 670 | 664 |
| Softening Pt. (° C.) | 879.4 | 924.2 | 888.5 | 904 | 951.4 | 947.1 | 939.1 |
| Temperature at 200 P Viscosity (° C.) | 1623 | 1659 | 1634 | 1603 | 1672 | 1660 | 1664 |
| Temperature at 35 kP Viscosity (° C.) | 1180 | 1224 | 1190 | 1192 | 1254 | 1250 | 1233 |
| Temperature at 160 kP Viscosity (° C.) | 1093 | 1138 | 1104 | 1111 | 1170 | 1166 | 1152 |
| Liquidus Temperature (° C.) | | | | | 865 | 800 | |
| Liquidus Viscosity (P) | | | | | 5.74E+08 | 5.51E+09 | |
| Zircon Breakdown Temperature (° C.) | | | | | 1215 | 1245 | |
| Zircon Breakdown Viscosity (P) | | | | | 69204 | 38105 | |
| Stress Optical Coefficient ((nm · Mpa$^{-1}$ · mm$^{-1}$) | 2.97 | | 2.935 | 2.999 | 3.051 | 3.028 | 3.044 |
| Approximate Fictive temperature (° C.) | 692 | 751 | 699 | 716 | 750 | 750 | 740 |
| 410° C. 1 hr Compressive Stress (MPa) | 694 | | 750 | 796 | 909 | 887 | 843 |
| 410° C. 1 hr Depth of Layer (mm) | 64 | | 60 | 46 | 41 | 42 | 41 |
| 410° C. 1 hr Vickers Crack Initiation Load (kgf) | | | | 30-40 | >50 | >50 | |
| 410° C. 2 hr Compressive Stress (MPa) | 680 | 751 | 732 | 749 | | | 837 |
| 410° C. 2 hr Depth of Layer (mm) | 81 | 66 | 75 | 63 | | | 56 |

TABLE 2-continued

Glass compositions and properties.

| | 85 | 86 | 87 | 88 | 89 | 90 | 91 |
|---|---|---|---|---|---|---|---|
| 410° C. 2 hr Vickers Crack Initiation Load (kgf) | >20 | >20 | >30 | 30-40 | | | >40 |
| 410° C. 3 hr Compressive Stress (MPa) | | | | | | | |
| 410° C. 3 hr Depth of Layer (mm) | | | | | | | |
| 410° C. 4 hr Compressive Stress (MPa) | | | | | | | |
| 410° C. 4 hr Depth of Layer (mm) | | | | | | | |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | 1.5E−09 | | 1.3E−09 | 7.5E−10 | 6.0E−10 | 6.3E−10 | 6.0E−10 |
| D FSM DOL ~1.4 * 2 * (Dt)^0.5 at 410° C. 2 hr | 1.2E−09 | 7.8E−10 | 1.0E−09 | 7.0E−10 | | | 5.6E−10 |
| D FSM DOL ~1.4 * 2 * (Dt)^0.5 at 410° C. 3 hr | | | | | | | |
| D FSM DOL ~1.4 * 2 * (Dt)^0.5 at 410° C. 4 hr | | | | | | | |
| D FSM DOL ~1.4 * 2 * (Dt)^0.5 at 410° C. 8 hr | | | | | | | |

| | Example Number | | | | | | |
|---|---|---|---|---|---|---|---|
| | 85 | 86 | 87 | 88 | 89 | 90 | 91 |
| $SiO_2$ in mol % | 58.3 | 58.3 | 58.6 | 58.3 | 58.4 | 58.4 | 59.2 |
| $Al_2O_3$ in mol % | 15.8 | 15.6 | 15.4 | 15.6 | 15.4 | 15.1 | 15.3 |
| $P_2O_5$ in mol % | 6.8 | 6.7 | 6.7 | 6.8 | 6.7 | 6.7 | 6.8 |
| $Na_2O$ in mol % | 15.9 | 15.7 | 15.2 | 15.6 | 15.4 | 15.1 | 15.5 |
| MgO in mol % | 3.1 | 3.0 | 3.1 | 3.5 | 3.5 | 3.5 | 3.1 |
| ZnO in mol % | 0.0 | 0.5 | 0.9 | 0.0 | 0.5 | 1.0 | 0.0 |
| $SnO_2$ in mol % | 0.1 | 0.1 | 0.1 | 0.1 | 0.1 | 0.1 | 0.1 |
| CaO in mol % | 0.1 | 0.1 | 0.1 | 0.1 | 0.1 | 0.1 | 0.1 |
| $(M_2O_3)/R_xO$ in mol % | 0.83 | 0.81 | 0.80 | 0.81 | 0.79 | 0.77 | 0.82 |
| $(P_2O_5 + R_2O)/(M_2O_3)$ in mol % | 1.43 | 1.43 | 1.42 | 1.44 | 1.44 | 1.45 | 1.45 |
| $(P_2O_5 + R_xO)/(M_2O_3)$ in mol % | 1.63 | 1.66 | 1.68 | 1.67 | 1.70 | 1.75 | 1.66 |
| $SiO_2$ in wt % | 48.6 | 48.6 | 48.9 | 48.8 | 48.8 | 48.9 | 49.5 |
| $Al_2O_3$ in wt % | 22.4 | 22.1 | 21.9 | 22.1 | 21.8 | 21.5 | 21.7 |
| $P_2O_5$ in wt % | 13.4 | 13.2 | 13.1 | 13.4 | 13.3 | 13.3 | 13.4 |
| $Na_2O$ in wt % | 13.6 | 13.5 | 13.1 | 13.5 | 13.3 | 13.1 | 13.4 |
| MgO in wt % | 1.7 | 1.7 | 1.7 | 2.0 | 2.0 | 2.0 | 1.7 |
| ZnO in wt % | 0.0 | 0.5 | 1.0 | 0.0 | 0.5 | 1.1 | 0.0 |
| $SnO_2$ in wt % | 0.2 | 0.2 | 0.2 | 0.2 | 0.2 | 0.2 | 0.2 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm$^3$) | 2.42 | 2.42 | 2.43 | 2.42 | 2.42 | 2.43 | 2.41 |
| Molar Volume (cm$^3$/mol) | 29.81 | 29.70 | 29.62 | 29.72 | 29.63 | 29.52 | 29.78 |
| Strain Pt. (° C.) | 612 | 614 | 611 | 615 | 614 | 616 | 612 |
| Anneal Pt. (° C.) | 664 | 666 | 661 | 666 | 663 | 664 | 666 |
| Softening Pt. (° C.) | 932.6 | 935.5 | 928.4 | 934 | 932.5 | 932.8 | 942.5 |
| Temperature at 200 P Viscosity (° C.) | 1660 | 1656 | 1654 | 1655 | 1651 | 1650 | 1675 |
| Temperature at 35 kP Viscosity (° C.) | 1235 | 1231 | 1226 | 1232 | 1227 | 1220 | 1244 |
| Temperature at 160 kP Viscosity (° C.) | 1150 | 1147 | 1141 | 1147 | 1143 | 1136 | 1158 |
| Liquidus Temperature (° C.) | | | | | | | 975 |

TABLE 2-continued

Glass compositions and properties.

| | | | | | | | |
|---|---|---|---|---|---|---|---|
| Liquidus Viscosity (P) | | | | | | | 1.07E+07 |
| Zircon Breakdown Temperature (° C.) | | | | | | | >1300 |
| Zircon Breakdown Viscosity (P) | | | | | | | <14599 |
| Stress Optical Coefficient ((nm · Mpa$^{-1}$ · mm$^{-1}$)) | 3.109 | 3.112 | 3.069 | 3.049 | 3.082 | 3.021 | 3.03 |
| Approximate Fictive temperature (° C.) | 753 | 755 | 748 | 754 | 749 | 749 | 758 |
| 410° C. 1 hr Compressive Stress (MPa) | | | | | | | 873 |
| 410° C. 1 hr Depth of Layer (mm) | | | | | | | 33 |
| 410° C. 1 hr Vickers Crack Initiation Load (kgf) | | | | | | | |
| 410° C. 2 hr Compressive Stress (MPa) | 861 | 862 | 861 | 850 | 881 | 874 | 853 |
| 410° C. 2 hr Depth of Layer (mm) | 49 | 47 | 46 | 47 | 46 | 45 | 45 |
| 410° C. 2 hr Vickers Crack Initiation Load (kgf) | >40 | >40 | >40 | >40 | >40 | >40 | >50 |
| 410° C. 3 hr Compressive Stress (MPa) | | | | | | | |
| 410° C. 3 hr Depth of Layer (mm) | | | | | | | |
| 410° C. 4 hr Compressive Stress (MPa) | | | | | | | |
| 410° C. 4 hr Depth of Layer (mm) | | | | | | | |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | | | | | | | 3.9E−10 |
| D FSM DOL ~1.4 * 2 * (Dt)^0.5 at 410° C. 2 hr | 4.3E−10 | 3.9E−10 | 3.7E−10 | 3.9E−10 | 3.7E−10 | 3.6E−10 | 3.6E−10 |
| D FSM DOL ~1.4 * 2 * (Dt)^0.5 at 410° C. 3 hr | | | | | | | |
| D FSM DOL ~1.4 * 2 * (Dt)^0.5 at 410° C. 4 hr | | | | | | | |
| D FSM DOL ~1.4 * 2 * (Dt)^0.5 at 410° C. 8 hr | | | | | | | |

| | Example Number | | | | | | |
|---|---|---|---|---|---|---|---|
| | 92 | 93 | 94 | 95 | 96 | 97 | 98 |
| SiO$_2$ in mol % | 59.2 | 59.3 | 59.3 | 59.3 | 59.2 | 59.3 | 58.4 |
| Al$_2$O$_3$ in mol % | 15.0 | 14.8 | 15.1 | 14.8 | 14.6 | 15.1 | 16.0 |
| P$_2$O$_5$ in mol % | 6.8 | 6.8 | 6.8 | 6.8 | 6.8 | 6.7 | 6.8 |
| Na$_2$O in mol % | 15.2 | 14.9 | 15.1 | 14.9 | 14.8 | 15.2 | 15.9 |
| MgO in mol % | 3.1 | 3.0 | 3.5 | 3.6 | 3.6 | 3.6 | 2.7 |
| ZnO in mol % | 0.5 | 1.0 | 0.0 | 0.5 | 1.0 | 0.0 | 0.0 |
| SnO$_2$ in mol % | 0.1 | 0.1 | 0.1 | 0.1 | 0.1 | 0.1 | 0.1 |
| CaO in mol % | 0.1 | 0.1 | 0.1 | 0.1 | 0.1 | 0.0 | 0.0 |
| (M$_2$O$_3$)/R$_x$O in mol % | 0.80 | 0.78 | 0.81 | 0.78 | 0.75 | 0.80 | 0.86 |
| (P$_2$O$_5$ + R$_2$O)/(M$_2$O$_3$) in mol % | 1.46 | 1.47 | 1.45 | 1.46 | 1.48 | 1.45 | 1.41 |
| (P$_2$O$_5$ + R$_x$O)/(M$_2$O$_3$) in mol % | 1.71 | 1.74 | 1.69 | 1.74 | 1.80 | 1.69 | 1.58 |

TABLE 2-continued

| Glass compositions and properties. | | | | | | | |
|---|---|---|---|---|---|---|---|
| SiO$_2$ in wt % | 49.6 | 49.6 | 49.7 | 49.8 | 49.7 | 49.9 | 48.7 |
| Al$_2$O$_3$ in wt % | 21.3 | 21.0 | 21.5 | 21.1 | 20.7 | 21.5 | 22.7 |
| P$_2$O$_5$ in wt % | 13.4 | 13.4 | 13.5 | 13.4 | 13.4 | 13.3 | 13.3 |
| Na$_2$O in wt % | 13.2 | 12.9 | 13.1 | 12.9 | 12.8 | 13.2 | 13.7 |
| MgO in wt % | 1.7 | 1.7 | 2.0 | 2.0 | 2.0 | 2.0 | 1.5 |
| ZnO in wt % | 0.6 | 1.1 | 0.0 | 0.6 | 1.1 | 0.0 | 0.0 |
| SnO$_2$ in wt % | 0.2 | 0.2 | 0.2 | 0.2 | 0.2 | 0.1 | 0.1 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm$^3$) | 2.43 | 2.41 | 2.41 | 2.42 | 2.43 | 2.411 | 2.414 |
| Molar Volume (cm$^3$/mol) | 29.61 | 29.79 | 29.71 | 29.59 | 29.48 | 29.64 | 29.87 |
| Strain Pt. (° C.) | 615 | 613 | 617 | 620 | 620 | 616 | 612 |
| Anneal Pt. (° C.) | 669 | 663 | 668 | 671 | 669 | 669 | 666 |
| Softening Pt. (° C.) | 936.3 | 934.5 | 939.7 | 938.2 | 942.5 | 940.7 | 940.2 |
| Temperature at 200 P Viscosity (° C.) | 1667 | 1666 | 1663 | 1670 | 1657 | 1666 | 1661 |
| Temperature at 35 kP Viscosity (° C.) | 1241 | 1234 | 1233 | 1235 | 1216 | 1240 | 1243 |
| Temperature at 160 kP Viscosity (° C.) | 1156 | 1148 | 1147 | 1151 | 1133 | 1153 | 1158 |
| Liquidus Temperature (° C.) | | | | | | | |
| Liquidus Viscosity (P) | | | | | | | |
| Zircon Breakdown Temperature (° C.) | | | | | | | |
| Zircon Breakdown Viscosity (P) | | | | | | | |
| Stress Optical Coefficient ((nm·Mpa$^{-1}$·mm$^{-1}$)) | 3.067 | 3.117 | 3.08 | 3.115 | 3.091 | | |
| Approximate Fictive temperature (° C.) | 760 | 751 | 757 | 759 | 756 | 760 | 758 |
| 410° C. 1 hr Compressive Stress (MPa) | | | | | | 864 | 896 |
| 410° C. 1 hr Depth of Layer (mm) | | | | | | 29 | 30 |
| 410° C. 1 hr Vickers Crack Initiation Load (kgf) | | | | | | | |
| 410° C. 2 hr Compressive Stress (MPa) | 831 | 844 | 832 | 850 | 838 | 870 | 889 |
| 410° C. 2 hr Depth of Layer (mm) | 46 | 44 | 45 | 47 | 44 | 43 | 42 |
| 410° C. 2 hr Vickers Crack Initiation Load (kgf) | >40 | >40 | >40 | >40 | >40 | 40-50 | >50 |
| 410° C. 3 hr Compressive Stress (MPa) | | | | | | | |
| 410° C. 3 hr Depth of Layer (mm) | | | | | | | |
| 410° C. 4 hr Compressive Stress (MPa) | | | | | | | |
| 410° C. 4 hr Depth of Layer (mm) | | | | | | | |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | | | | | | 3.0E−10 | 3.2E−10 |

TABLE 2-continued

Glass compositions and properties.

| | | | | | | | |
|---|---|---|---|---|---|---|---|
| D FSM DOL ~1.4 * 2 * (Dt)^0.5 at 410° C. 2 hr | 3.7E−10 | 3.4E−10 | 3.6E−10 | 3.9E−10 | 3.4E−10 | 3.3E−10 | 3.1E−10 |
| D FSM DOL ~1.4 * 2 * (Dt)^0.5 at 410° C. 3 hr | | | | | | | |
| D FSM DOL ~1.4 * 2 * (Dt)^0.5 at 410° C. 4 hr | | | | | | | |
| D FSM DOL ~1.4 * 2 * (Dt)^0.5 at 410° C. 8 hr | | | | | | | |

| | Example Number | | | | | | |
|---|---|---|---|---|---|---|---|
| | 99 | 100 | 101 | 102 | 103 | 104 | 105 |
| $SiO_2$ in mol % | 58.2 | 59.4 | 56.6 | 56.3 | 59.9 | 60.5 | 60.9 |
| $Al_2O_3$ in mol % | 15.6 | 16.0 | 16.0 | 16.1 | 15.1 | 15.1 | 15.0 |
| $P_2O_5$ in mol % | 6.8 | 6.8 | 7.6 | 7.7 | 6.8 | 6.8 | 6.8 |
| $Na_2O$ in mol % | 15.8 | 16.0 | 15.9 | 16.2 | 15.1 | 15.0 | 15.1 |
| MgO in mol % | 3.6 | 1.7 | 3.7 | 3.6 | 3.1 | 2.6 | 2.1 |
| ZnO in mol % | 0.0 | 0.0 | 0.0 | 0.0 | 0.0 | 0.0 | 0.0 |
| $SnO_2$ in mol % | 0.1 | 0.1 | 0.1 | 0.1 | 0.1 | 0.1 | 0.1 |
| CaO in mol % | 0.0 | 0.0 | 0.0 | 0.0 | 0.0 | 0.0 | 0.0 |
| $(M_2O_3)/R_xO$ in mol % | 0.80 | 0.90 | 0.82 | 0.81 | 0.83 | 0.86 | 0.88 |
| $(P_2O_5 + R_2O)/(M_2O_3)$ in mol % | 1.45 | 1.43 | 1.47 | 1.48 | 1.45 | 1.44 | 1.46 |
| $(P_2O_5 + R_xO)/(M_2O_3)$ in mol % | 1.68 | 1.53 | 1.70 | 1.71 | 1.66 | 1.61 | 1.59 |
| $SiO_2$ in wt % | 48.7 | 49.3 | 46.8 | 46.5 | 50.2 | 50.7 | 50.9 |
| $Al_2O_3$ in wt % | 22.1 | 22.6 | 22.5 | 22.6 | 21.4 | 21.4 | 21.3 |
| $P_2O_5$ in wt % | 13.4 | 13.3 | 14.9 | 15.0 | 13.5 | 13.4 | 13.5 |
| $Na_2O$ in wt % | 13.6 | 13.8 | 13.6 | 13.8 | 13.0 | 13.0 | 13.0 |
| MgO in wt % | 2.0 | 1.0 | 2.1 | 2.0 | 1.7 | 1.4 | 1.2 |
| ZnO in wt % | 0.0 | 0.0 | 0.0 | 0.0 | 0.0 | 0.0 | 0.0 |
| $SnO_2$ in wt % | 0.1 | 0.1 | 0.1 | 0.1 | 0.1 | 0.1 | 0.1 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm³) | 2.415 | 2.406 | 2.417 | 2.417 | 2.405 | 2.4 | 2.396 |
| Molar Volume (cm³/mol) | 29.70 | 30.05 | 30.04 | 30.08 | 29.78 | 29.87 | 29.98 |
| Strain Pt. (° C.) | 612 | 613 | 596 | 598 | 607 | 607 | 613 |
| Anneal Pt. (° C.) | 664 | 671 | 649 | 652 | 663 | 663 | 671 |
| Softening Pt. (° C.) | 937.7 | 951.1 | 918.5 | 919.9 | 945.2 | 949.4 | 955.8 |
| Temperature at 200 P Viscosity (° C.) | 1658 | 1698 | 1631 | 1637 | 1682 | 1695 | 1709 |
| Temperature at 35 kP Viscosity (° C.) | 1235 | 1262 | 1215 | 1219 | 1251 | 1262 | 1271 |
| Temperature at 160 kP Viscosity (° C.) | 1150 | 1176 | 1131 | 1135 | 1164 | 1174 | 1182 |
| Liquidus Temperature (° C.) | | | | | | | |
| Liquidus Viscosity (P) | | | | | | | |
| Zircon Breakdown Temperature (° C.) | | | | | | | |
| Zircon Breakdown Viscosity (P) | | | | | | | |
| Stress Optical Coefficient ((nm · Mpa⁻¹ · mm⁻¹) | | | | | | | |
| Approximate Fictive temperature (° C.) | 754 | 767 | 739 | 743 | 758 | 759 | 768 |
| 410° C. 1 hr Compressive Stress (MPa) | 895 | 889 | 855 | 853 | 839 | 823 | 817 |
| 410° C. 1 hr Depth of Layer (mm) | 29 | 32 | 28 | 28 | 30 | 31 | 31 |
| 410° C. 1 hr Vickers Crack Initiation Load (kgf) | | | | | | | |
| 410° C. 2 hr Compressive Stress (MPa) | 890 | 843 | 865 | 856 | 846 | 820 | 803 |
| 410° C. 2 hr Depth of Layer (mm) | 43 | 49 | 41 | 42 | 44 | 45 | 46 |

TABLE 2-continued

Glass compositions and properties.

|  |  |  |  |  |  |  |  |
|---|---|---|---|---|---|---|---|
| 410° C. 2 hr Vickers Crack Initiation Load (kgf) | >50 | >50 | >50 | >50 | 40-50 | 40-50 | 40-50 |
| 410° C. 3 hr Compressive Stress (MPa) |  |  |  |  |  |  |  |
| 410° C. 3 hr Depth of Layer (mm) |  |  |  |  |  |  |  |
| 410° C. 4 hr Compressive Stress (MPa) |  |  |  |  |  |  |  |
| 410° C. 4 hr Depth of Layer (mm) |  |  |  |  |  |  |  |
| 410° C. 4 hr Vickers Crack Initiation Load (kgf) |  |  |  |  |  |  |  |
| 410° C. 8 hr Compressive Stress (MPa) |  |  |  |  |  |  |  |
| 410° C. 8 hr Depth of Layer (mm) |  |  |  |  |  |  |  |
| D FSM DOL ~1.4 * 2 * (Dt)^0.5 at 410° C. 1 hr | 3.0E−10 | 3.6E−10 | 2.8E−10 | 2.8E−10 | 3.2E−10 | 3.4E−10 | 3.4E−10 |
| D FSM DOL ~1.4 * 2 * (Dt)^0.5 at 410° C. 2 hr | 3.3E−10 | 4.3E−10 | 3.0E−10 | 3.1E−10 | 3.4E−10 | 3.6E−10 | 3.7E−10 |
| D FSM DOL ~1.4 * 2 * (Dt)^0.5 at 410° C. 3 hr |  |  |  |  |  |  |  |
| D FSM DOL ~1.4 * 2 * (Dt)^0.5 at 410° C. 4 hr |  |  |  |  |  |  |  |
| D FSM DOL ~1.4 * 2 * (Dt)^0.5 at 410° C. 8 hr |  |  |  |  |  |  |  |

|  | Example Number | | | | | | | |
|---|---|---|---|---|---|---|---|---|
|  | 106 | 107 | 108 | 109 | 110 | 111 | 112 | 113 |
| $SiO_2$ in mol % | 56.8 | 55.8 | 55.7 | 55.9 | 56.0 | 55.8 | 55.8 | 59.9 |
| $Al_2O_3$ in mol % | 17.9 | 18.0 | 18.0 | 18.0 | 18.0 | 18.0 | 18.0 | 15.7 |
| $P_2O_5$ in mol % | 7.2 | 7.8 | 7.8 | 7.7 | 7.7 | 7.7 | 7.8 | 5.4 |
| $Na_2O$ in mol % | 17.9 | 16.1 | 16.3 | 16.6 | 16.6 | 17.0 | 17.0 | 16.2 |
| MgO in mol % | 0.1 | 2.0 | 0.1 | 1.5 | 0.1 | 1.3 | 0.1 | 2.6 |
| ZnO in mol % | 0.0 | 0.0 | 2.0 | 0.0 | 1.4 | 0.0 | 1.2 | 0.0 |
| $SnO_2$ in mol % | 0.0 | 0.1 | 0.1 | 0.1 | 0.1 | 0.1 | 0.1 | 0.1 |
| CaO in mol % | 0.0 | 0.1 | 0.0 | 0.1 | 0.0 | 0.0 | 0.0 | 0.1 |
| $(M_2O_3)/R_xO$ in mol % | 0.99 | 0.99 | 0.98 | 0.99 | 1.00 | 0.99 | 0.98 | 0.83 |
| $(P_2O_5 + R_2O)/(M_2O_3)$ in mol % | 1.40 | 1.33 | 1.34 | 1.35 | 1.35 | 1.37 | 1.38 | 1.38 |
| $(P_2O_5 + R_xO)/(M_2O_3)$ in mol % | 1.41 | 1.44 | 1.45 | 1.44 | 1.43 | 1.44 | 1.45 | 1.55 |
| $SiO_2$ in wt % | 46.3 | 45.3 | 44.8 | 45.3 | 45.1 | 45.3 | 44.9 | 50.7 |
| $Al_2O_3$ in wt % | 24.7 | 24.9 | 24.6 | 24.8 | 24.6 | 24.8 | 24.6 | 22.5 |
| $P_2O_5$ in wt % | 13.9 | 14.9 | 14.7 | 14.8 | 14.6 | 14.8 | 14.8 | 10.9 |
| $Na_2O$ in wt % | 15.0 | 13.5 | 13.5 | 13.9 | 13.8 | 14.2 | 14.1 | 14.2 |
| MgO in wt % | 0.0 | 1.1 | 0.0 | 0.8 | 0.0 | 0.7 | 0.0 | 1.5 |
| ZnO in wt % | 0.0 | 0.0 | 2.1 | 0.0 | 1.6 | 0.0 | 1.4 | 0.0 |
| $SnO_2$ in wt % | 0.0 | 0.2 | 0.2 | 0.2 | 0.2 | 0.2 | 0.2 | 0.2 |
| CaO in wt % | 0.0 | 0.0 | 0.0 | 0.0 | 0.0 | 0.0 | 0.0 | 0.0 |
| Compositional analysis | XRF | XRF | XRF | XRF | XRF | XRF | XRF | XRF |
| Density (g/cm$^3$) | 2.409 | 2.411 | 2.436 | 2.411 | 2.430 | 2.411 | 2.427 | 2.419 |
| Molar Volume (cm$^3$/mol) | 30.63 | 30.69 | 30.69 | 30.71 | 30.70 | 30.72 | 30.74 | 29.34 |
| Strain Pt. (° C.) | 617 | 621 | 609 | 618 | 604 | 617 | 613 | 629 |
| Anneal Pt. (° C.) | 677 | 679 | 666 | 676 | 663 | 676 | 671 | 684 |
| Softening Pt. (° C.) | 956.5 | 950.7 | 935.8 | 949.4 | 939 | 949.5 | 941.5 | 953 |

TABLE 2-continued

| Glass compositions and properties. | | | | | | | |
|---|---|---|---|---|---|---|---|
| Temperature at 200 P Viscosity (° C.) | 1673 | 1651 | 1650 | 1655 | 1659 | 1661 | 1681 | 1681 |
| Temperature at 35 kP Viscosity (° C.) | 1259 | 1247 | 1238 | 1247 | 1242 | 1250 | 1256 | 1256 |
| Temperature at 160 kP Viscosity (° C.) | 1174 | 1164 | 1154 | 1164 | 1161 | 1167 | 1171 | 1171 |
| Liquidus Temperature (° C.) | | | | | | | | |
| Liquidus Viscosity (P) | | | | | | | | |
| Zircon Breakdown Temperature (° C.) | | | | | | | | |
| Zircon Breakdown Viscosity (P) | | | | | | | | |
| Stress Optical Coefficient ((nm · Mpa$^{-1}$ · mm$^{-1}$) | | 3.088 | 3.118 | 3.127 | 3.183 | 3.036 | 3.124 | 3.147 |
| Approximate Fictive temperature (° C.) | 775 | 751 | 742 | 755 | 736 | 751 | 745 | 775 |
| 410° C. 1 hr Compressive Stress (MPa) | | 869 | 916 | 912 | 921 | 899 | 922 | 969 |
| 410° C. 1 hr Depth of Layer (mm) | | 29 | 29 | 32 | 32 | 33 | 32 | 30 |
| 410° C. 1 hr Vickers Crack Initiation Load (kgf) | | | | | | | | |
| 410° C. 2 hr Compressive Stress (MPa) | 854 | 884 | 895 | 892 | 901 | 868 | 889 | 933 |
| 410° C. 2 hr Depth of Layer (mm) | 59 | 42 | 44 | 46 | 46 | 49 | 49 | 46 |
| 410° C. 2 hr Vickers Crack Initiation Load (kgf) | >50 | >50 | >50 | >50 | >50 | >50 | >50 | 20-30 |
| 410° C. 3 hr Compressive Stress (MPa) | | | | | | | | |
| 410° C. 3 hr Depth of Layer (mm) | | | | | | | | |
| 410° C. 4 hr Compressive Stress (MPa) | | | | | | | | |
| 410° C. 4 hr Depth of Layer (mm) | | | | | | | | |
| 410° C. 4 hr Vickers Crack Initiation Load (kgf) | | | | | | | | |
| 410° C. 8 hr Compressive Stress (MPa) | | | | | | | | |
| 410° C. 8 hr Depth of Layer (mm) | | | | | | | | |
| D FSM DOL ~1.4 * 2 * (Dt)^0.5 at 410° C. 1 hr | | 3.0E−10 | 3.0E−10 | 3.6E−10 | 3.6E−10 | 3.9E−10 | 3.6E−10 | 3.2E−10 |

TABLE 2-continued

Glass compositions and properties.

| | | | | | | | | |
|---|---|---|---|---|---|---|---|---|
| D FSM DOL ~1.4 * 2 * (Dt)^0.5 at 410° C. 2 hr | 6.2E−10 | 3.1E−10 | 3.4E−10 | 3.7E−10 | 3.7E−10 | 4.3E−10 | 4.3E−10 | 3.7E−10 |
| D FSM DOL ~1.4 * 2 * (Dt)^0.5 at 410° C. 3 hr | | | | | | | | |
| D FSM DOL ~1.4 * 2 * (Dt)^0.5 at 410° C. 4 hr | | | | | | | | |
| D FSM DOL ~1.4 * 2 * (Dt)^0.5 at 410° C. 8 hr | | | | | | | | |

| | Example Number | | | | | | |
|---|---|---|---|---|---|---|---|
| | 114 | 115 | 116 | 117 | 118 | 119 | 120 |
| SiO$_2$ in mol % | 59.2 | 58.4 | 57.9 | 57.1 | 56.5 | 56.8 | 57.4 |
| Al$_2$O$_3$ in mol % | 16.1 | 16.5 | 16.8 | 17.2 | 17.6 | 16.8 | 16.6 |
| P$_2$O$_5$ in mol % | 5.8 | 6.2 | 6.5 | 6.9 | 7.3 | 7.1 | 7.1 |
| Na$_2$O in mol % | 16.6 | 17.0 | 17.3 | 17.7 | 18.0 | 17.1 | 16.7 |
| MgO in mol % | 2.2 | 1.7 | 1.3 | 0.9 | 0.5 | 2.1 | 2.1 |
| ZnO in mol % | 0.0 | 0.0 | 0.0 | 0.0 | 0.0 | 0.0 | 0.0 |
| SnO$_2$ in mol % | 0.1 | 0.1 | 0.1 | 0.1 | 0.1 | 0.1 | 0.1 |
| CaO in mol % | 0.1 | 0.0 | 0.0 | 0.0 | 0.0 | 0.0 | 0.1 |
| (M$_2$O$_3$)/R$_x$O in mol % | 0.86 | 0.88 | 0.90 | 0.93 | 0.95 | 0.88 | 0.88 |
| (P$_2$O$_5$ + R$_2$O)/(M$_2$O$_3$) in mol % | 1.39 | 1.40 | 1.42 | 1.43 | 1.44 | 1.44 | 1.43 |
| (P$_2$O$_5$ + R$_x$O)/(M$_2$O$_3$) in mol % | 1.53 | 1.51 | 1.49 | 1.48 | 1.47 | 1.56 | 1.56 |
| SiO$_2$ in wt % | 49.7 | 48.7 | 47.9 | 46.9 | 46.0 | 46.8 | 47.4 |
| Al$_2$O$_3$ in wt % | 22.9 | 23.3 | 23.6 | 24.0 | 24.4 | 23.5 | 23.3 |
| P$_2$O$_5$ in wt % | 11.5 | 12.2 | 12.8 | 13.5 | 14.0 | 13.8 | 13.8 |
| Na$_2$O in wt % | 14.4 | 14.6 | 14.8 | 15.0 | 15.2 | 14.5 | 14.2 |
| MgO in wt % | 1.2 | 1.0 | 0.7 | 0.5 | 0.3 | 1.1 | 1.2 |
| ZnO in wt % | 0.0 | 0.0 | 0.0 | 0.0 | 0.0 | 0.0 | 0.0 |
| SnO$_2$ in wt % | 0.2 | 0.2 | 0.2 | 0.2 | 0.2 | 0.2 | 0.2 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm$^3$) | 2.418 | 2.415 | 2.416 | 2.416 | 2.414 | 2.419 | 2.415 |
| Molar Volume (cm$^3$/mol) | 29.58 | 29.86 | 30.07 | 30.30 | 30.54 | 30.14 | 30.14 |
| Strain Pt. (° C.) | 624 | 618 | 616 | 616 | 615 | 609 | 610 |
| Anneal Pt. (° C.) | 681 | 677 | 675 | 674 | 674 | 666 | 666 |
| Softening Pt. (° C.) | 954.9 | 950.5 | 948.1 | 947.9 | 949.3 | 930.8 | 940.6 |
| Temperature at 200 P Viscosity (° C.) | 1680 | 1673 | 1676 | 1670 | 1667 | 1654 | 1660 |
| Temperature at 35 kP Viscosity (° C.) | 1257 | 1253 | 1254 | 1250 | 1249 | 1235 | 1240 |
| Temperature at 160 kP Viscosity (° C.) | 1171 | 1168 | 1169 | 1166 | 1164 | 1151 | 1156 |
| Liquidus Temperature (° C.) | | 955 | | | | | |
| Liquidus Viscosity (P) | | 2.67E+07 | | | | | |
| Zircon Breakdown Temperature (° C.) | | | | | | | |
| Zircon Breakdown Viscosity (P) | | | | | | | |
| Stress Optical Coefficient ((nm · Mpa$^{-1}$ · mm$^{-1}$) | 3.038 | 3.050 | 3.080 | 3.004 | 3.093 | | |
| Approximate Fictive temperature (° C.) | 764 | 750 | 745 | 765 | 747 | 746 | 741 |
| 410° C. 1 hr Compressive Stress (MPa) | 942 | 953 | 918 | 899 | 888 | 921 | 900 |
| 410° C. 1 hr Depth of Layer (mm) | 30 | 31 | 34 | 36 | 38 | 34 | 34 |
| 410° C. 1 hr Vickers Crack Initiation Load (kgf) | | >50 | | | | | |
| 410° C. 2 hr Compressive Stress (MPa) | 945 | 924 | 901 | 868 | 853 | 913 | 895 |
| 410° C. 2 hr Depth of Layer (mm) | 46 | 47 | 50 | 54 | 50 | 46 | 45 |

TABLE 2-continued

Glass compositions and properties.

| | | | | | | | |
|---|---|---|---|---|---|---|---|
| 410° C. 2 hr Vickers Crack Initiation Load (kgf) | 20-30 | >50 | >50 | >40 | >50 | >50 | 30-40 |
| 410° C. 3 hr Compressive Stress (MPa) | | | | | | | |
| 410° C. 3 hr Depth of Layer (mm) | | | | | | | |
| 410° C. 4 hr Compressive Stress (MPa) | | | | | | | |
| 410° C. 4 hr Depth of Layer (mm) | | | | | | | |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | 3.2E−10 | 3.4E−10 | 4.1E−10 | 4.6E−10 | 5.1E−10 | 4.1E−10 | 4.1E−10 |
| D FSM DOL ~1.4 * 2 * (Dt)^0.5 at 410° C. 2 hr | 3.7E−10 | 3.9E−10 | 4.4E−10 | 5.2E−10 | 4.4E−10 | 3.7E−10 | 3.6E−10 |
| D FSM DOL ~1.4 * 2 * (Dt)^0.5 at 410° C. 3 hr | | | | | | | |
| D FSM DOL ~1.4 * 2 * (Dt)^0.5 at 410° C. 4 hr | | | | | | | |
| D FSM DOL ~1.4 * 2 * (Dt)^0.5 at 410° C. 8 hr | | | | | | | |

| | Example Number | | | | | | |
|---|---|---|---|---|---|---|---|
| | 121 | 122 | 123 | 124 | 125 | 126 | 127 |
| $SiO_2$ in mol % | 57.9 | 57.0 | 57.4 | 58.0 | 59.0 | 58.9 | 58.9 |
| $Al_2O_3$ in mol % | 16.4 | 16.7 | 16.6 | 16.2 | 15.5 | 15.7 | 16.0 |
| $P_2O_5$ in mol % | 7.1 | 7.3 | 7.3 | 7.4 | 6.4 | 6.5 | 6.4 |
| $Na_2O$ in mol % | 16.5 | 16.7 | 16.5 | 16.3 | 15.4 | 15.7 | 16.0 |
| MgO in mol % | 2.1 | 2.0 | 2.0 | 2.0 | 3.5 | 3.0 | 2.5 |
| ZnO in mol % | 0.0 | 0.0 | 0.0 | 0.0 | 0.0 | 0.0 | 0.0 |
| $SnO_2$ in mol % | 0.1 | 0.1 | 0.1 | 0.1 | 0.1 | 0.1 | 0.1 |
| CaO in mol % | 0.1 | 0.1 | 0.0 | 0.1 | 0.1 | 0.1 | 0.1 |
| $(M_2O_3)/R_xO$ in mol % | 0.88 | 0.89 | 0.89 | 0.88 | 0.82 | 0.84 | 0.86 |
| $(P_2O_5 + R_2O)/(M_2O_3)$ in mol % | 1.44 | 1.43 | 1.44 | 1.46 | 1.41 | 1.41 | 1.40 |
| $(P_2O_5 + R_xO)/(M_2O_3)$ in mol % | 1.56 | 1.56 | 1.57 | 1.59 | 1.64 | 1.60 | 1.56 |
| $SiO_2$ in wt % | 47.8 | 46.9 | 47.2 | 47.8 | 49.6 | 49.4 | 49.2 |
| $Al_2O_3$ in wt % | 23.0 | 23.4 | 23.1 | 22.6 | 22.1 | 22.4 | 22.7 |
| $P_2O_5$ in wt % | 13.8 | 14.2 | 14.3 | 14.4 | 12.8 | 12.8 | 12.7 |
| $Na_2O$ in wt % | 14.0 | 14.2 | 14.0 | 13.8 | 13.4 | 13.6 | 13.8 |
| MgO in wt % | 1.1 | 1.1 | 1.1 | 1.1 | 2.0 | 1.7 | 1.4 |
| ZnO in wt % | 0.0 | 0.0 | 0.0 | 0.0 | 0.0 | 0.0 | 0.0 |
| $SnO_2$ in wt % | 0.2 | 0.2 | 0.2 | 0.2 | 0.1 | 0.1 | 0.1 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm³) | 2.411 | 2.415 | 2.412 | 2.409 | 2.415 | 2.414 | 2.413 |
| Molar Volume (cm³/mol) | 30.16 | 30.26 | 30.27 | 30.26 | 29.59 | 29.70 | 29.79 |
| Strain Pt. (° C.) | 609 | 607 | 607 | 605 | 617 | 612 | 613 |
| Anneal Pt. (° C.) | 667 | 663 | 663 | 662 | 669 | 666 | 669 |
| Softening Pt. (° C.) | 941.6 | 937.7 | 936.6 | 940.1 | 940.6 | 941.4 | 948.7 |
| Temperature at 200 P Viscosity (° C.) | 1670 | 1658 | 1661 | 1665 | 1666 | 1669 | 1677 |
| Temperature at 35 kP Viscosity (° C.) | 1247 | 1238 | 1241 | 1244 | 1241 | 1244 | 1250 |

TABLE 2-continued

Glass compositions and properties.

|  |  |  |  |  |  |  |  |
|---|---|---|---|---|---|---|---|
| Temperature at 160 kP Viscosity (° C.) | 1161 | 1154 | 1156 | 1159 | 1156 | 1159 | 1165 |
| Liquidus Temperature (° C.) |  |  |  |  |  |  |  |
| Liquidus Viscosity (P) |  |  |  |  |  |  |  |
| Zircon Breakdown Temperature (° C.) |  |  |  |  |  |  |  |
| Zircon Breakdown Viscosity (P) |  |  |  |  |  |  |  |
| Stress Optical Coefficient ((nm · Mpa$^{-1}$ · mm$^{-1}$) |  |  |  |  | 3.056 | 3.038 | 3.055 |
| Approximate Fictive temperature (° C.) | 742 | 742 | 739 | 730 | 765 | 755 | 754 |
| 410° C. 1 hr Compressive Stress (MPa) | 885 | 889 | 876 | 857 |  |  |  |
| 410° C. 1 hr Depth of Layer (mm) | 34 | 35 | 34 | 35 |  |  |  |
| 410° C. 1 hr Vickers Crack Initiation Load (kgf) |  |  |  |  |  |  |  |
| 410° C. 2 hr Compressive Stress (MPa) | 874 | 870 | 861 | 838 | 907 | 889 | 896 |
| 410° C. 2 hr Depth of Layer (mm) | 46 | 47 | 47 | 47 | 43 | 44 | 45 |
| 410° C. 2 hr Vickers Crack Initiation Load (kgf) | >50 | >50 | >50 | 40-50 | 40-50 | 30-40 | 40-50 |
| 410° C. 3 hr Compressive Stress (MPa) |  |  |  |  |  |  |  |
| 410° C. 3 hr Depth of Layer (mm) |  |  |  |  |  |  |  |
| 410° C. 4 hr Compressive Stress (MPa) |  |  |  |  |  |  |  |
| 410° C. 4 hr Depth of Layer (mm) |  |  |  |  |  |  |  |
| 410° C. 4 hr Vickers Crack Initiation Load (kgf) |  |  |  |  |  |  |  |
| 410° C. 8 hr Compressive Stress (MPa) |  |  |  |  |  |  |  |
| 410° C. 8 hr Depth of Layer (mm) |  |  |  |  |  |  |  |
| D FSM DOL ~1.4 * 2 * (Dt)^0.5 at 410° C. 1 hr | 4.1E−10 | 4.3E−10 | 4.1E−10 | 4.3E−10 |  |  |  |
| D FSM DOL ~1.4 * 2 * (Dt)^0.5 at 410° C. 2 hr | 3.7E−10 | 3.9E−10 | 3.9E−10 | 3.9E−10 | 3.3E−10 | 3.4E−10 | 3.6E−10 |
| D FSM DOL ~1.4 * 2 * (Dt)^0.5 at 410° C. 3 hr |  |  |  |  |  |  |  |
| D FSM DOL ~1.4 * 2 * (Dt)^0.5 at 410° C. 4 hr |  |  |  |  |  |  |  |
| D FSM DOL ~1.4 * 2 * (Dt)^0.5 at 410° C. 8 hr |  |  |  |  |  |  |  |

|  | Example Number |  |  |  |  |  |  |
|---|---|---|---|---|---|---|---|
|  | 128 | 129 | 130 | 131 | 132 | 133 | 134 |
| SiO$_2$ in mol % | 58.2 | 57.8 | 57.9 | 56.8 | 56.9 | 56.9 | 56.8 |
| Al$_2$O$_3$ in mol % | 16.1 | 16.5 | 16.3 | 16.5 | 16.8 | 17.0 | 17.5 |
| P$_2$O$_5$ in mol % | 6.3 | 6.5 | 6.4 | 6.5 | 6.4 | 6.4 | 6.4 |
| Na$_2$O in mol % | 15.9 | 16.5 | 16.3 | 16.5 | 16.8 | 17.1 | 17.1 |
| MgO in mol % | 3.5 | 2.6 | 3.0 | 3.6 | 3.1 | 2.5 | 2.0 |
| ZnO in mol % | 0.0 | 0.0 | 0.0 | 0.0 | 0.0 | 0.0 | 0.0 |
| SnO$_2$ in mol % | 0.1 | 0.1 | 0.1 | 0.0 | 0.0 | 0.0 | 0.0 |
| CaO in mol % | 0.1 | 0.1 | 0.1 | 0.0 | 0.0 | 0.0 | 0.0 |
| (M$_2$O$_3$)/R$_x$O in mol % | 0.83 | 0.86 | 0.84 | 0.82 | 0.84 | 0.86 | 0.91 |

TABLE 2-continued

Glass compositions and properties.

| | | | | | | | |
|---|---|---|---|---|---|---|---|
| $(P_2O_5 + R_2O)/(M_2O_3)$ in mol % | 1.38 | 1.39 | 1.39 | 1.40 | 1.38 | 1.38 | 1.34 |
| $(P_2O_5 + R_xO)/(M_2O_3)$ in mol % | 1.60 | 1.55 | 1.58 | 1.62 | 1.56 | 1.53 | 1.46 |
| $SiO_2$ in wt % | 48.8 | 48.2 | 48.3 | 47.5 | 47.4 | 47.3 | 47.0 |
| $Al_2O_3$ in wt % | 22.9 | 23.4 | 23.1 | 23.3 | 23.8 | 24.0 | 24.6 |
| $P_2O_5$ in wt % | 12.5 | 12.7 | 12.7 | 12.8 | 12.5 | 12.5 | 12.5 |
| $Na_2O$ in wt % | 13.7 | 14.2 | 14.0 | 14.2 | 14.4 | 14.6 | 14.6 |
| MgO in wt % | 1.9 | 1.4 | 1.7 | 2.0 | 1.7 | 1.4 | 1.1 |
| ZnO in wt % | 0.0 | 0.0 | 0.0 | 0.0 | 0.0 | 0.0 | 0.0 |
| $SnO_2$ in wt % | 0.1 | 0.1 | 0.1 | 0.1 | 0.1 | 0.1 | 0.1 |
| CaO in wt % | 0.0 | 0.0 | 0.0 | 0.0 | 0.0 | 0.0 | 0.0 |
| Compositional analysis | XRF | XRF | XRF | XRF | XRF | XRF | XRF |
| Density (g/cm$^3$) | 2.421 | 2.419 | 2.420 | 2.426 | 2.426 | 2.424 | 2.420 |
| Molar Volume (cm$^3$/mol) | 29.58 | 29.82 | 29.72 | 29.64 | 29.70 | 29.81 | 30.00 |
| Strain Pt. (° C.) | 615 | 616 | 616 | 615 | 615 | 623 | 624 |
| Anneal Pt. (° C.) | 666 | 671 | 670 | 666 | 669 | 679 | 681 |
| Softening Pt. (° C.) | 937.8 | 945.7 | 941.6 | 930.6 | 933.9 | 949.7 | 952.4 |
| Temperature at 200 P Viscosity (° C.) | 1655 | 1658 | 1658 | 1641 | 1646 | 1646 | 1657 |
| Temperature at 35 kP Viscosity (° C.) | 1235 | 1236 | 1236 | 1224 | 1233 | 1236 | 1246 |
| Temperature at 160 kP Viscosity (° C.) | 1152 | 1154 | 1154 | 1141 | 1151 | 1152 | 1162 |
| Liquidus Temperature (° C.) | | | | | | | |
| Liquidus Viscosity (P) | | | | | | | |
| Zircon Breakdown Temperature (° C.) | | | | | | | |
| Zircon Breakdown Viscosity (P) | | | | | | | |
| Stress Optical Coefficient ((nm · Mpa$^{-1}$ · mm$^{-1}$) | 3.021 | 3.007 | 3.015 | | | | |
| Approximate Fictive temperature (° C.) | 763 | 743 | 764 | 760 | 760 | 748 | 748 |
| 410° C. 1 hr Compressive Stress (MPa) | | | | | | | |
| 410° C. 1 hr Depth of Layer (mm) | | | | | | | |
| 410° C. 1 hr Vickers Crack Initiation Load (kgf) | | | | | | | |
| 410° C. 2 hr Compressive Stress (MPa) | 925 | 925 | 927 | 978 | 981 | 975 | 983 |
| 410° C. 2 hr Depth of Layer (mm) | 43 | 45 | 44 | 40 | 40 | 41 | 41 |
| 410° C. 2 hr Vickers Crack Initiation Load (kgf) | 20-30 | 30-40 | 20-30 | >30 | >30 | >30 | >30 |
| 410° C. 3 hr Compressive Stress (MPa) | | | | | | | |
| 410° C. 3 hr Depth of Layer (mm) | | | | | | | |
| 410° C. 4 hr Compressive Stress (MPa) | | | | | | | |
| 410° C. 4 hr Depth of Layer (mm) | | | | | | | |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | | | | | | | |

TABLE 2-continued

Glass compositions and properties.

| | | | | | | | |
|---|---|---|---|---|---|---|---|
| D FSM DOL ~$1.4 * 2 * (Dt)^{0.5}$ at 410° C. 2 hr | 3.3E−10 | 3.6E−10 | 3.4E−10 | 2.8E−10 | 2.8E−10 | 3.0E−10 | 3.0E−10 |
| D FSM DOL ~$1.4 * 2 * (Dt)^{0.5}$ at 410° C. 3 hr | | | | | | | |
| D FSM DOL ~$1.4 * 2 * (Dt)^{0.5}$ at 410° C. 4 hr | | | | | | | |
| D FSM DOL ~$1.4 * 2 * (Dt)^{0.5}$ at 410° C. 8 hr | | | | | | | |

| | Example Number | | | | | | |
|---|---|---|---|---|---|---|---|
| | 135 | 136 | 137 | 138 | 139 | 140 | 141 |
| $SiO_2$ in mol % | 57.8 | 58.8 | 55.8 | 55.9 | 55.8 | 57.8 | 56.9 |
| $Al_2O_3$ in mol % | 17.0 | 16.5 | 17.0 | 18.0 | 18.1 | 17.0 | 16.9 |
| $P_2O_5$ in mol % | 6.4 | 6.4 | 7.6 | 7.7 | 7.7 | 6.6 | 7.0 |
| $Na_2O$ in mol % | 16.6 | 16.2 | 17.3 | 16.2 | 16.7 | 17.2 | 17.0 |
| MgO in mol % | 2.0 | 2.0 | 0.1 | 0.1 | 0.1 | 0.1 | 0.1 |
| ZnO in mol % | 0.0 | 0.0 | 0.0 | 0.0 | 0.0 | 0.0 | 0.0 |
| $SnO_2$ in mol % | 0.1 | 0.1 | 0.1 | 0.1 | 0.1 | 0.1 | 0.1 |
| CaO in mol % | 0.0 | 0.0 | 2.0 | 2.0 | 1.5 | 1.2 | 2.0 |
| $(M_2O_3)/R_xO$ in mol % | 0.91 | 0.90 | 0.88 | 0.98 | 0.99 | 0.92 | 0.88 |
| $(P_2O_5 + R_2O)/(M_2O_3)$ in mol % | 1.36 | 1.37 | 1.46 | 1.33 | 1.35 | 1.40 | 1.43 |
| $(P_2O_5 + R_xO)/(M_2O_3)$ in mol % | 1.48 | 1.49 | 1.59 | 1.45 | 1.44 | 1.48 | 1.55 |
| $SiO_2$ in wt % | 48.0 | 49.0 | 45.5 | 45.2 | 45.1 | 47.6 | 46.7 |
| $Al_2O_3$ in wt % | 23.9 | 23.3 | 23.5 | 24.7 | 24.8 | 23.8 | 23.5 |
| $P_2O_5$ in wt % | 12.6 | 12.6 | 14.7 | 14.8 | 14.8 | 12.8 | 13.6 |
| $Na_2O$ in wt % | 14.2 | 13.9 | 14.5 | 13.5 | 13.9 | 14.6 | 14.4 |
| MgO in wt % | 1.1 | 1.1 | 0.1 | 0.1 | 0.0 | 0.0 | 0.1 |
| ZnO in wt % | 0.0 | 0.0 | 0.0 | 0.0 | 0.0 | 0.0 | 0.0 |
| $SnO_2$ in wt % | 0.1 | 0.1 | 0.2 | 0.2 | 0.2 | 0.2 | 0.2 |
| CaO in wt % | 0.0 | 0.0 | 1.5 | 1.5 | 1.1 | 0.9 | 1.5 |
| Compositional analysis | XRF | XRF | XRF | XRF | XRF | XRF | XRF |
| Density (g/cm³) | 2.416 | 2.410 | 2.421 | 2.429 | 2.419 | 2.423 | 2.427 |
| Molar Volume (cm³/mol) | 29.96 | 29.93 | 30.46 | 30.56 | 30.71 | 30.09 | 30.16 |
| Strain Pt. (° C.) | 619 | 620 | 623 | 607 | 620 | 622 | 615 |
| Anneal Pt. (° C.) | 676 | 677 | 680 | 660 | 676 | 679 | 669 |
| Softening Pt. (° C.) | 948.8 | 957.8 | 947.1 | 916.9 | 944.6 | 946.4 | 928 |
| Temperature at 200 P Viscosity (° C.) | 1673 | 1684 | 1638 | 1652 | 1650 | 1674 | 1656 |
| Temperature at 35 kP Viscosity (° C.) | 1254 | 1261 | 1214 | 1238 | 1242 | 1248 | 1230 |
| Temperature at 160 kP Viscosity (° C.) | 1171 | 1176 | 1130 | 1156 | 1157 | 1163 | 1147 |
| Liquidus Temperature (° C.) | | | | | | | |
| Liquidus Viscosity (P) | | | | | | | |
| Zircon Breakdown Temperature (° C.) | | | | | | | |
| Zircon Breakdown Viscosity (P) | | | | | | | |
| Stress Optical Coefficient ((nm · $Mpa^{-1}$ · $mm^{-1}$)) | | | | | | | |
| Approximate Fictive temperature (° C.) | 754 | 755 | 730 | 753 | 750 | 749 | 753 |
| 410° C. 1 hr Compressive Stress (MPa) | | | | | | | |
| 410° C. 1 hr Depth of Layer (mm) | | | | | | | |
| 410° C. 1 hr Vickers Crack Initiation Load (kgf) | | | | | | | |
| 410° C. 2 hr Compressive Stress (MPa) | 953 | 922 | 895 | 898 | 896 | 925 | 906 |
| 410° C. 2 hr Depth of Layer (mm) | 42 | 42 | 45 | 38 | 43 | 45 | 45 |

TABLE 2-continued

Glass compositions and properties.

| | | | | | | | |
|---|---|---|---|---|---|---|---|
| 410° C. 2 hr Vickers Crack Initiation Load (kgf) | >30 | >30 | >30 | >30 | >30 | >30 | >30 |
| 410° C. 3 hr Compressive Stress (MPa) | | | | | | | |
| 410° C. 3 hr Depth of Layer (mm) | | | | | | | |
| 410° C. 4 hr Compressive Stress (MPa) | | | | | | | |
| 410° C. 4 hr Depth of Layer (mm) | | | | | | | |
| 410° C. 4 hr Vickers Crack Initiation Load (kgf) | | | | | | | |
| 410° C. 8 hr Compressive Stress (MPa) | | | | | | | |
| 410° C. 8 hr Depth of Layer (mm) | | | | | | | |
| D FSM DOL ~1.4 * 2 * (Dt)^0.5 at 410° C. 1 hr | | | | | | | |
| D FSM DOL ~1.4 * 2 * (Dt)^0.5 at 410° C. 2 hr | 3.1E−10 | 3.1E−10 | 3.6E−10 | 2.6E−10 | 3.3E−10 | 3.6E−10 | 3.6E−10 |
| D FSM DOL ~1.4 * 2 * (Dt)^0.5 at 410° C. 3 hr | | | | | | | |
| D FSM DOL ~1.4 * 2 * (Dt)^0.5 at 410° C. 4 hr | | | | | | | |
| D FSM DOL ~1.4 * 2 * (Dt)^0.5 at 410° C. 8 hr | | | | | | | |

| | Example Number | | | |
|---|---|---|---|---|
| | 142 | 143 | 144 | 145 |
| $SiO_2$ in mol % | 57.5 | 58.1 | 58.2 | 58.4 |
| $Al_2O_3$ in mol % | 16.7 | 16.0 | 16.0 | 16.0 |
| $P_2O_5$ in mol % | 6.9 | 6.2 | 6.2 | 6.2 |
| $Na_2O$ in mol % | 16.7 | 16.0 | 16.1 | 16.1 |
| MgO in mol % | 0.1 | 3.6 | 3.4 | 3.1 |
| ZnO in mol % | 0.0 | 0.0 | 0.0 | 0.0 |
| $SnO_2$ in mol % | 0.1 | 0.1 | 0.1 | 0.1 |
| CaO in mol % | 2.0 | 0.1 | 0.0 | 0.0 |
| $(M_2O_3)/R_xO$ in mol % | 0.89 | 0.81 | 0.82 | 0.83 |
| $(P_2O_5 + R_2O)/(M_2O_3)$ in mol % | 1.42 | 1.39 | 1.40 | 1.40 |
| $(P_2O_5 + R_xO)/(M_2O_3)$ in mol % | 1.54 | 1.62 | 1.61 | 1.59 |
| $SiO_2$ in wt % | 47.3 | 48.8 | 48.9 | 49.0 |
| $Al_2O_3$ in wt % | 23.3 | 22.8 | 22.8 | 22.8 |
| $P_2O_5$ in wt % | 13.5 | 12.4 | 12.3 | 12.3 |
| $Na_2O$ in wt % | 14.2 | 13.9 | 14.0 | 14.0 |
| MgO in wt % | 0.1 | 2.0 | 1.9 | 1.7 |
| ZnO in wt % | 0.0 | 0.0 | 0.0 | 0.0 |
| $SnO_2$ in wt % | 0.2 | 0.1 | 0.1 | 0.1 |
| CaO in wt % | 1.5 | 0.0 | 0.0 | 0.0 |
| Compositional analysis | XRF | XRF | XRF | XRF |
| Density (g/cm³) | 2.425 | 2.422 | 2.421 | 2.418 |
| Molar Volume (cm³/mol) | 30.12 | 29.52 | 29.54 | 29.61 |
| Strain Pt. (° C.) | 615 | 621 | 619 | 616 |
| Anneal Pt. (° C.) | 669 | 672 | 671 | 670 |
| Softening Pt. (° C.) | 930.1 | 938.5 | 938.9 | 941.3 |
| Temperature at 200 P Viscosity (° C.) | 1655 | 1652 | 1662 | 1664 |
| Temperature at 35 kP Viscosity (° C.) | 1232 | 1232 | 1240 | 1243 |

TABLE 2-continued

Glass compositions and properties.

| | | | | |
|---|---|---|---|---|
| Temperature at 160 kP Viscosity (° C.) | 1147 | 1148 | 1157 | 1159 |
| Liquidus Temperature (° C.) | | | | |
| Liquidus Viscosity (P) | | | | |
| Zircon Breakdown Temperature (° C.) | | | | |
| Zircon Breakdown Viscosity (P) | | | | |
| Stress Optical Coefficient ((nm · Mpa$^{-1}$ · mm$^{-1}$) | | | | |
| Approximate Fictive temperature (° C.) | 750 | 765 | 772 | 770 |
| 410° C. 1 hr Compressive Stress (MPa) | | | | |
| 410° C. 1 hr Depth of Layer (mm) | | | | |
| 410° C. 1 hr Vickers Crack Initiation Load (kgf) | | | | |
| 410° C. 2 hr Compressive Stress (MPa) | 902 | 961 | 953 | 948 |
| 410° C. 2 hr Depth of Layer (mm) | 48 | 40 | 42 | 41 |
| 410° C. 2 hr Vickers Crack Initiation Load (kgf) | >30 | >30 | >30 | >30 |
| 410° C. 3 hr Compressive Stress (MPa) | | | | |
| 410° C. 3 hr Depth of Layer (mm) | | | | |
| 410° C. 4 hr Compressive Stress (MPa) | | | | |
| 410° C. 4 hr Depth of Layer (mm) | | | | |
| 410° C. 4 hr Vickers Crack Initiation Load (kgf) | | | | |
| 410° C. 8 hr Compressive Stress (MPa) | | | | |
| 410° C. 8 hr Depth of Layer (mm) | | | | |
| D FSM DOL ~1.4 * 2 * (Dt)^0.5 at 410° C. 1 hr | | | | |
| D FSM DOL ~1.4 * 2 * (Dt)^0.5 at 410° C. 2 hr | 4.1E−10 | 2.8E−10 | 3.1E−10 | 3.0E−10 |
| D FSM DOL ~1.4 * 2 * (Dt)^0.5 at 410° C. 3 hr | | | | |
| D FSM DOL ~1.4 * 2 * (Dt)^0.5 at 410° C. 4 hr | | | | |
| D FSM DOL ~1.4 * 2 * (Dt)^0.5 at 410° C. 8 hr | | | | |

Ion exchange is widely used to chemically strengthen glass articles for use in in consumer electronics, automotive applications, appliances, architectural components, and other areas where high levels of damage resistance are desirable. In the ion exchange process, a glass article containing a first metal ion (e.g., alkali cations in $Li_2O$, $Na_2O$, etc.) is at least partially immersed in or otherwise contacted with an ion exchange bath or medium containing a second metal ion that is either larger or smaller than the first metal ion that is present in the glass. The first metal ions diffuse from the glass surface into the ion exchange bath/medium while the second metal ions from the ion exchange bath/medium replace the first metal ions in the glass to a depth of layer below the surface of the glass. The substitution of larger ions for smaller ions in the glass creates a compressive stress at the glass surface, whereas substitution of smaller ions for larger ions in the glass typically creates a tensile stress at the surface of the glass. In some embodiments, the first metal ion and second metal ion are monovalent alkali metal ions. However, other monovalent metal ions such as $Ag^+$, $Tl^+$, $Cu^+$, and the like may also be used in the ion exchange process. In those instances where at least one of Ag+ and Cu+ is exchanged for metal ions in the glass, such glasses may be particularly useful for anti-viral and/or anti-microbial applications.

A cross-sectional view of a portion (i.e., ends of the glass sheet are not shown) of a glass sheet strengthened by ion exchange is schematically shown in FIG. 1. In the non-limiting example shown in FIG. 1, strengthened glass sheet 100 has a thickness t, central portion 130, and a first surface 110 and second surface 112 that are substantially parallel to each other. Compressive layers 120, 122 extend from first surface 110 and second surface 112, respectively, to depths of layer $d_1$, $d_2$ below each surface. Compressive layers 120, 122 are under a compressive stress, while central portion 130 is under a tensile stress, or in tension. The tensile stress in central portion 130 balances the compressive stresses in compressive layers 120, 122, thus maintaining equilibrium within strengthened glass sheet 100. In some embodiments, the glasses and glass articles described herein may be ion exchanged to achieve a compressive stress of at least about 300 MPa and/or a depth of compressive layer of at least about 10 μm. In some embodiments, the glasses and glass articles described herein may be ion exchanged to achieve a compressive stress of at least about 500 MPa and/or a depth of compressive layer of at least about 40 μm. In some embodiments, the glass is ion exchanged to achieve a compressive stress of at least about 200, 300, 400, 500, 600, 700, 800, 900, or 1000 MPa. In some embodiments, the glass is ion exchanged to achieve a depth of layer of at least about 10 μm, 20 μm, 30 μm, 40 μm, 50 μm, 60 μm, 70 μm, 80 μm, 90 μm, 100 μm, or 110 μm or more.

In addition to high damage resistance, the glasses described herein may be ion exchanged to achieve desired levels of compressive stress and compressive depth of layer in relatively short times. Following ion exchange at 410° C. for 4 hours in molten $KNO_3$ salt, for example, a compressive layer having a compressive stress of greater than about 700 MPa and a depth of compressive layer of greater than about 75 μm may be achieved in these glasses. In some embodiments, the ion exchange is done at about 400° C., 410° C., 420° C., 430° C., 440° C., 450° C., 460° C., 470° C., 480° C., 490° C., 500° C., 510° C., 520° C., 530° C., 540° C., or 550° C. or greater. In some embodiments, the ion exchange is done for about 0.5, 1, 2, 3, 4, 5, 6, 7, 8, 9, 10, or more than 10 hours.

Figure 2:
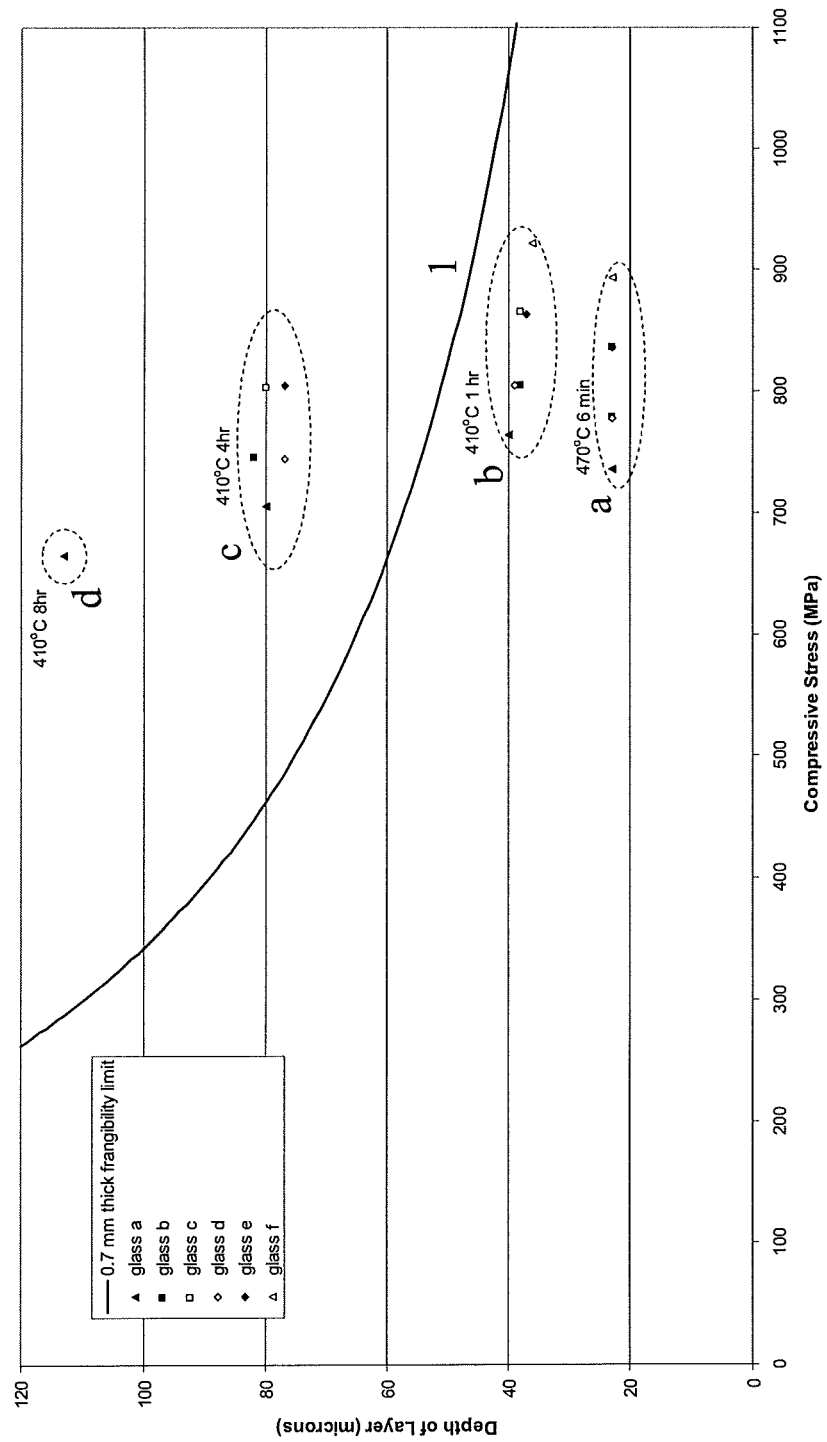
FIG. 2 is a plot of depth of layer as a function of compressive stress for 0.7 mm thick samples that were annealed at 700° C. and ion exchanged in a molten $KNO_3$ salt bath at 410° C.

FIG. 2 is a plot of depth of layer as a function of compressive stress for samples a-f in Table 1. The 0.7 mm thick samples were annealed at 700° C. and ion exchanged in a molten $KNO_3$ salt bath at 410° C. for times ranging from 1 hour up to 8 hours (groups "b-d" in FIG. 2) or at 470° C. for six minutes (group "a" in FIG. 2). The samples that were ion exchanged at 470° C. for six minutes exhibited compressive stresses and depths of layer that are well below the frangibility limit (i.e., the point at which the glass sample should or is likely to exhibit frangible behavior, indicated by line 1 in FIG. 2). The ion exchange time required for 0.7 mm thick samples to reach the frangibility limit is slightly greater than one hour at 410° C. In samples having higher fictive temperatures with viscosities corresponding to about $10^{11}$ Poise (i.e., unannealed, as down-drawn samples), the frangibility limit will also be met in a similarly short time, but the compressive stress will be lower and the depth of layer will be greater than in annealed samples. Samples that were ion exchanged for one hour (group "b") exhibited compressive stresses and depths of layer that are just below the frangibility limit, and samples that were ion exchanged for either 4 or 8 hours (groups "c" and "d", respectively) exhibit compressive stresses and depths of layer that exceed the frangibility limit.

The ability to ion exchange the glasses described herein may be at least partially attributable to the fact that these glasses have potassium and sodium interdiffusion coefficients that are significantly greater that those of other alkali aluminosilicate glasses that are used in applications in which damage resistance, as characterized by the Vickers crack initiation threshold of the glass, is a desirable attribute. At 410° C., the glasses described herein have a potassium/sodium interdiffusion coefficient of at least about $2.4 \times 10^{-10}$ cm²/s, $3.0 \times 10^{-10}$ cm²/s, $4.0 \times 10^{-10}$ cm²/s, or $4.5 \times 10^{-10}$ cm²/s, $6.0 \times 10^{-10}$ cm²/s, $7.5 \times 10^{-10}$ cm²/s, $9.0 \times 10^{-10}$ cm²/s, $1.0 \times 10^{-9}$ cm²/s, $1.2 \times 10^{-9}$ cm²/s, $1.5 \times 10^{-9}$ cm²/s and in some embodiments, in a range from about $2.4 \times 10^{-10}$ cm⁻²/s, $3.0 \times 10^{-10}$ cm²/s, $4.0 \times 10^{-10}$ cm²/s, or $4.5 \times 10^{-10}$ cm²/s up to about $7.5 \times 10^{-10}$ cm²/s, $9.0 \times 10^{-10}$ cm²/s, $1.0 \times 10^{-9}$ cm²/s, $1.2 \times 10^{-9}$ cm²/s, or $1.5 \times 10^{-9}$ cm²/s. In contrast to these glasses, the alkali aluminosilicate glasses described in U.S. patent application Ser. Nos. 12/858,490, 12/856,840, and 12/392,577 have potassium/sodium interdiffusion coefficients of less than $1.5 \times 10^{-10}$ cm²/s.

An embodiment comprises an alkali aluminosilicate glass comprising at least about 4 mol % $P_2O_5$, wherein $[M_2O_3 \text{ (mol \%)}/R_xO(\text{mol \%})]<1.4$, where $M_2O_3=Al_2O_3+B_2O_3$ and $R_xO$ is the sum of monovalent and divalent cation oxides present in the alkali aluminosilicate glass. In some embodiments, $[M_2O_3 \text{ (mol \%)}/R_xO(\text{mol \%})]<1$. In some embodiments, the alkali aluminosilicate glass further comprises less than 1 mol % $K_2O$. In some embodiments, the alkali aluminosilicate glass comprises 0 mol % $K_2O$. In some embodiments, the alkali aluminosilicate glass comprises less than 1 mol % $B_2O_3$. In some embodiments, the alkali aluminosilicate glass comprises 0 mol % $B_2O_3$. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the alkali aluminosilicate glass has a potassium/sodium interdiffusion coefficient of at least about $2.4 \times 10^{-10}$ cm²/s at 410° C. In some embodiments, the potassium/sodium interdiffusion coefficient is in a range from about $2.4 \times 10^{-10}$ cm²/s up to about $1.5 \times 10^{-9}$ cm²/s at 410° C.

An embodiment comprises an alkali aluminosilicate glass comprising $0.6 < [M_2O_3 \text{ (mol \%)}/R_xO(\text{mol \%})]<1.4$ where $M_2O_3=Al_2O_3+B_2O_3$ and $R_xO$ is the sum of monovalent and divalent cation oxides present in the alkali aluminosilicate glass. In some embodiments, $0.8 < [M_2O_3(\text{mol \%})/R_xO(\text{mol \%})]<1.4$. In some embodiments, $0.8 \leq [M_2O_3(\text{mol \%})/R_xO(\text{mol \%})] \leq 1.0$. In some embodiments, the alkali aluminosilicate glass further comprises less than 1 mol % $K_2O$. In some embodiments, the alkali aluminosilicate glass comprises 0 mol % $K_2O$. In some embodiments, the alkali aluminosilicate glass comprises less than 1 mol % $B_2O_3$. In some embodiments, the alkali aluminosilicate glass comprises 0 mol % $B_2O_3$. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the alkali aluminosilicate glass has a potassium/sodium interdiffusion coefficient of at least about $2.4 \times 10^{-10}$ cm²/s at 410° C. In some embodiments, the potassium/sodium interdiffusion coefficient is in a range from about $2.4 \times 10^{-10}$ cm²/s up to about $1.5 \times 10^{-9}$ cm²/s at 410° C.

Another embodiment comprises an alkali aluminosilicate glass comprising at least about 4% $P_2O_5$, wherein the alkali aluminosilicate glass is ion exchanged to a depth of layer of at least about 20 μm, and wherein $0.6 < [M_2O_3(\text{mol \%})/R_xO(\text{mol \%})]<1.4$, where $M_2O_3=Al_2O_3+B_2O_3$ and $R_xO$ is the sum of monovalent and divalent cation oxides present in the alkali aluminosilicate glass. In some embodiments, $0.6 < [M_2O_3$ (mol %)/$R_xO$(mol %)]<1.0. In some embodiments, 0.8<[$M_2O_3$(mol %)/$R_xO$(mol %)]<1.4. In some embodiments, 0.8≤[$M_2O_3$(mol %)/$R_xO$(mol %)]≤1.0. In some embodiments, the alkali aluminosilicate glass further comprises less than 1 mol % $K_2O$. In some embodiments, the alkali aluminosilicate glass comprises 0 mol % $K_2O$. In some embodiments, the alkali aluminosilicate glass comprises less than 1 mol % $B_2O_3$. In some embodiments, the alkali aluminosilicate glass comprises 0 mol % $B_2O_3$. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the alkali aluminosilicate glass has a potassium/sodium interdiffusion coefficient of at least about $2.4 \times 10^{-10}$ cm$^2$/s at 410° C. In some embodiments, the potassium/sodium interdiffusion coefficient is in a range from about $2.4 \times 10^{-10}$ cm$^2$/s up to about $1.5 \times 10^{-9}$ cm$^2$/s at 410° C.

Another embodiment comprises an alkali aluminosilicate glass comprising at least about 4% $P_2O_5$, wherein 1.3<[($P_2O_5$+$R_2O$)/$M_2O_3$]≤2.3, where $M_2O_3$=$Al_2O_3$+$B_2O_3$ and $R_2O$ is the sum of monovalent cation oxides present in the alkali aluminosilicate glass. In some embodiments, the alkali aluminosilicate glass further comprises less than 1 mol % $K_2O$. In some embodiments, the alkali aluminosilicate glass comprises 0 mol % $K_2O$. In some embodiments, the alkali aluminosilicate glass comprises less than 1 mol % $B_2O_3$. In some embodiments, the alkali aluminosilicate glass comprises 0 mol % $B_2O_3$. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the alkali aluminosilicate glass has a potassium/sodium interdiffusion coefficient of at least about $2.4 \times 10^{-10}$ cm$^2$/s at 410° C. In some embodiments, the potassium/sodium interdiffusion coefficient is in a range from about $2.4 \times 10^{-10}$ cm$^2$/s up to about $1.5 \times 10^{-9}$ cm$^2$/s at 410° C.

In some embodiments, the alkali aluminosilicate glass comprises from about 40 mol % to about 70 mol % $SiO_2$; from about 11 mol % to about 25 mol % $Al_2O_3$; from about 4 mol % to about 15 mol % $P_2O_5$; and from about 13 mol % to about 25 mol % $Na_2O$. In some embodiments, the alkali aluminosilicate glass comprises from about 50 mol % to about 65 mol % $SiO_2$; from about 14 mol % to about 20 mol % $Al_2O_3$; from about 4 mol % to about 10 mol % $P_2O_5$; and from about 14 mol % to about 20 mol % $Na_2O$. In some embodiments, the alkali aluminosilicate glass further comprises less than 1 mol % $K_2O$. In some embodiments, the alkali aluminosilicate glass comprises 0 mol % $K_2O$. In some embodiments, the alkali aluminosilicate glass comprises less than 1 mol % $B_2O_3$. In some embodiments, the alkali aluminosilicate glass comprises 0 mol % $B_2O_3$. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO.

In some embodiments, the alkali aluminosilicate glasses described above are ion exchanged to a depth of layer of at least about 20 μm. In some embodiments, the glasses are ion exchanged to a depth of layer of at least about 40 μm. In some embodiments, the alkali aluminosilicate glasses have a compressive layer extending from a surface of the glass to the depth of layer, and wherein the compressive layer is under a compressive stress of at least 500 MPa. In some embodiments, the compressive stress is at least 750 MPa. In some embodiments, the compressive stress layer is from about 500 MPa to about 2000 MPa. In some embodiments, the ion exchanged alkali aluminosilicate glasses have a Vickers indentation crack initiation load of at least about 8 kgf. In some embodiments, the ion exchanged alkali aluminosilicate glasses have a Vickers indentation crack initiation load of at least about 12 kgf.

An embodiment comprises a method of strengthening an alkali aluminosilicate glass, the method comprising: providing an alkali aluminosilicate glass as described above, and immersing the alkali aluminosilicate glass in an ion exchange bath for a time period of up to about 24 hours to form a compressive layer extending from a surface of the alkali aluminosilicate glass to a depth of layer of at least 20 μm. In some embodiments, the alkali aluminosilicate glass comprises at least about 4 mol % $P_2O_5$, wherein [$M_2O_3$ (mol %)/$R_xO$(mol %)]<1.4, where $M_2O_3$=$Al_2O_3$+$B_2O_3$ and $R_xO$ is the sum of monovalent and divalent cation oxides present in the alkali aluminosilicate glass. In some embodiments, [$M_2O_3$ (mol %)/$R_xO$(mol %)]<1. In some embodiments, the alkali aluminosilicate glass comprises 0.6<[$M_2O_3$ (mol %)/$R_xO$(mol %)]<1.4 where $M_2O_3$=$Al_2O_3$+$B_2O_3$ and $R_xO$ is the sum of monovalent and divalent cation oxides present in the alkali aluminosilicate glass. In some embodiments, 0.8<[$M_2O_3$(mol %)/$R_xO$(mol %)]<1.4. In some embodiments, 0.8≤[$M_2O_3$(mol %)/$R_xO$(mol %)]≤1.0. In some embodiments, the alkali aluminosilicate glass comprising at least about 4% $P_2O_5$, wherein 1.3<[($P_2O_5$+$R_2O$)/$M_2O_3$]≤2.3, where $M_2O_3$=$Al_2O_3$+$B_2O_3$ and $R_2O$ is the sum of monovalent cation oxides present in the alkali aluminosilicate glass. In some embodiments, the alkali aluminosilicate glass comprises from about 40 mol % to about 70 mol % $SiO_2$; from about 11 mol % to about 25 mol % $Al_2O_3$; from about 4 mol % to about 15 mol % $P_2O_5$; and from about 13 mol % to about 25 mol % $Na_2O$. In some embodiments, the alkali aluminosilicate glass comprises from about 50 mol % to about 65 mol % $SiO_2$; from about 14 mol % to about 20 mol % $Al_2O_3$; from about 4 mol % to about 10 mol % $P_2O_5$; and from about 14 mol % to about 20 mol % $Na_2O$. In some embodiments, the alkali aluminosilicate glass further comprises less than 1 mol % $K_2O$. In some embodiments, the alkali aluminosilicate glass comprises 0 mol % $K_2O$. In some embodiments, the alkali aluminosilicate glass comprises less than 1 mol % $B_2O_3$. In some embodiments, the alkali aluminosilicate glass comprises 0 mol % $B_2O_3$. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO.

In some embodiments, the alkali aluminosilicate glasses described above are ion exchanged to a depth of layer of at least about 20 μm. In some embodiments, the glasses are ion exchanged to a depth of layer of at least about 40 μm. In some embodiments, the alkali aluminosilicate glasses have a compressive layer extending from a surface of the glass to the depth of layer, and wherein the compressive layer is under a compressive stress of at least 500 MPa. In some embodiments, the compressive stress is at least 750 MPa. In some embodiments, the compressive stress layer is from about 500 MPa to about 2000 MPa. In some embodiments, the ion exchanged alkali aluminosilicate glasses have a Vickers indentation crack initiation load of at least about 8 kgf. In some embodiments, the ion exchanged alkali aluminosilicate glasses have a Vickers indentation crack initiation load of at least about 12 kgf.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. An alkali aluminosilicate glass comprising at least about 4% $P_2O_5$ and from 0 mol % to about 4 mol % $B_2O_3$, wherein the alkali aluminosilicate glass is $Li_2O$-free and wherein:

$$1.3<[(P_2O_5+R_2O)/M_2O_3]\leq 2.3; \quad \text{ii.}$$

where $M_2O_3=Al_2O_3+B_2O_3$, and $R_2O$ is the sum of monovalent cation oxides present in the alkali aluminosilicate glass.

2. The alkali aluminosilicate glass of claim 1, wherein the glass satisfies:

$$1.5<[(P_2O_5+R_2O)/M_2O_3]\leq 2.0.$$

3. The alkali aluminosilicate glass of claim 1, wherein the glass comprises less than 1 mol % $K_2O$.

4. The alkali aluminosilicate glass of claim 3, wherein the alkali aluminosilicate glass comprises 0 mol % $K_2O$.

5. The alkali aluminosilicate glass of claim 1, wherein the glass comprises less than 1 mol % $B_2O_3$.

6. The alkali aluminosilicate glass of claim 5, wherein the alkali aluminosilicate glass comprises 0 mol % $B_2O_3$.

7. The alkali aluminosilicate glass of claim 1, wherein the glass is ion exchanged to a depth of layer of at least about 10 μm.

8. The alkali aluminosilicate glass of claim 7, wherein the glass is ion exchanged to a depth of layer of at least about 30 μm.

9. The alkali aluminosilicate glass of claim 7, wherein the alkali aluminosilicate glass has a compressive layer extending from a surface of the glass to the depth of layer, and wherein the compressive layer is under a compressive stress of at least about 300 MPa.

10. The alkali aluminosilicate glass of claim 9, wherein the compressive stress is at least about 500 MPa.

11. The alkali aluminosilicate glass of claim 7, wherein the ion exchanged alkali aluminosilicate glass has a Vickers indentation crack initiation load of at least about 7 kgf.

12. The alkali aluminosilicate glass of claim 11, wherein the ion exchanged alkali aluminosilicate glass has a Vickers indentation crack initiation load of at least about 12 kgf.

13. The alkali aluminosilicate glass of claim 1, wherein the monovalent and divalent cation oxides are selected from the group consisting of $Na_2O$, $K_2O$, $Rb_2O$, $Cs_2O$, MgO, CaO, SrO, BaO, and ZnO.

14. The alkali aluminosilicate glass of claim 1, wherein the alkali aluminosilicate glass comprises from about 40 mol % to about 70 mol % $SiO_2$; from about 11 mol % to about 25 mol % $Al_2O_3$; from about 4 mol % to about 15 mol % $P_2O_5$; and from about 13 mol % to about 25 mol % $Na_2O$.

15. The alkali aluminosilicate glass of claim 14, wherein the alkali aluminosilicate glass comprises from about 50 mol % to about 65 mol % $SiO_2$; from about 14 mol % to about 20 mol % $Al_2O_3$; from about 4 mol % to about 10 mol % $P_2O_5$; and from about 14 mol % to about 20 mol % $Na_2O$.

16. The alkali aluminosilicate glass of claim 14, wherein the alkali aluminosilicate glass comprises less than 1 mol % $K_2O$.

17. The alkali aluminosilicate glass of claim 16, wherein the alkali aluminosilicate glass comprises 0 mol % $K_2O$.

18. The alkali aluminosilicate glass of claim 14, wherein the alkali aluminosilicate glass comprises less than 1 mol % $B_2O_3$.

19. The alkali aluminosilicate glass of claim 16, wherein the alkali aluminosilicate glass comprises 0 mol % $B_2O_3$.

20. The alkali aluminosilicate glass of claim 1, wherein the alkali aluminosilicate glass has a potassium/sodium interdiffusion coefficient of at least about $2.4\times10^{-10}$ $cm^2$/s at 410° C.

21. The alkali aluminosilicate glass of claim 20, wherein the potassium/sodium interdiffusion coefficient is in a range from about $2.4\times10^{-10}$ $cm^2$/s up to about $1.5\times10^{-9}$ $cm^2$/s at 410° C.

* * * * *